US009516064B2

(12) United States Patent
Lietz et al.

(10) Patent No.: US 9,516,064 B2
(45) Date of Patent: *Dec. 6, 2016

(54) METHOD AND SYSTEM FOR DYNAMIC AND COMPREHENSIVE VULNERABILITY MANAGEMENT

(71) Applicant: Intuit Inc., Mountain View, CA (US)

(72) Inventors: M. Shannon Lietz, San Marcos, CA (US); Luis Felipe Cabrera, Bellevue, WA (US); Barry J. Nisly, San Diego, CA (US); Ted R. Neher, III, Poway, CA (US); Javier Godinez, Bonita, CA (US); Ankur Jain, Redwood City, CA (US)

(73) Assignee: Intuit Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/969,617

(22) Filed: Dec. 15, 2015

(65) Prior Publication Data

US 2016/0112457 A1 Apr. 21, 2016

Related U.S. Application Data

(63) Continuation of application No. 14/052,971, filed on Oct. 14, 2013, now Pat. No. 9,246,935.

(51) Int. Cl.
*H04L 29/06* (2006.01)
(52) U.S. Cl.
CPC .......... *H04L 63/20* (2013.01); *H04L 63/1433* (2013.01); *H04L 63/1441* (2013.01)
(58) Field of Classification Search
CPC ... H04L 63/1433; H04L 63/1441; H04L 63/20
See application file for complete search history.

(56) References Cited

U.S. PATENT DOCUMENTS 5,712,641 A * 1/1998 Casabona ............... G01S 19/21
  342/362
5,731,991 A 3/1998 Kinra et al.
(Continued)

FOREIGN PATENT DOCUMENTS

EP 2 541 420 1/2013
WO WO 02/091182 11/2002
(Continued)

OTHER PUBLICATIONS

Lietz et al., "Method and System for Creating and Dynamically Deploying Resource Specific Discovery Agents for Determining the State of a Cloud Computing Environment," U.S. Appl. No. 14/079,425, filed Nov. 13, 2013.
(Continued)

*Primary Examiner* — Dao Ho
*Assistant Examiner* — Cheng-Feng Huang
(74) *Attorney, Agent, or Firm* — Hawley Troxell Ennis & Hawley LLP; Philip McKay

(57) ABSTRACT

One or more relevant scanners used to identify asset vulnerabilities are identified, obtained, and logically arranged for deployment on an asset in accordance with a vulnerability management policy and a scanner deployment policy such that the relevant scanners are deployed at, or before, a determined ideal time to minimize the resources necessary to correct the vulnerabilities, if found. The relevant scanners are then automatically deployed in accordance with the scanner deployment policy and, if a vulnerability is identified, one or more associated remedies or remedy procedures are applied to the asset. At least one of the one or more relevant scanners are then re-deployed on the asset to determine if the identified vulnerability has been corrected and, if the vulnerability is not corrected at, or before, a defined time, protective measures are automatically taken.

30 Claims, 5 Drawing Sheets

(56) References Cited

U.S. PATENT DOCUMENTS

| | | | |
|---|---|---|---|
| 6,085,224 A | 7/2000 | Wagner | |
| 6,205,552 B1 | 3/2001 | Fudge | |
| 6,343,236 B1 | 1/2002 | Gibson et al. | |
| 6,549,932 B1 | 4/2003 | McNally et al. | |
| 6,651,183 B1 | 11/2003 | Gensler et al. | |
| 7,114,183 B1 | 9/2006 | Joiner | |
| 7,296,261 B2 | 11/2007 | Witchel et al. | |
| 7,373,524 B2 | 5/2008 | Motsinger et al. | |
| 7,426,745 B2 | 9/2008 | McCarty | |
| 7,506,371 B1 | 3/2009 | Ben-Natan | |
| 7,552,424 B1 | 6/2009 | Bischof et al. | |
| 7,640,458 B2 | 12/2009 | Rao et al. | |
| 7,761,923 B2 | 7/2010 | Khuti et al. | |
| 7,788,235 B1 | 8/2010 | Yeo | |
| 7,792,256 B1 | 9/2010 | Arledge et al. | |
| 7,831,570 B2 | 11/2010 | Sack et al. | |
| 7,925,527 B1 | 4/2011 | Flam | |
| 7,944,355 B2 | 5/2011 | Kumar et al. | |
| 7,996,836 B1 | 8/2011 | McCorkendale et al. | |
| 8,001,422 B1 | 8/2011 | Sun et al. | |
| 8,095,962 B2 | 1/2012 | Condon | |
| 8,171,485 B2 | 5/2012 | Muller | |
| 8,171,554 B2 | 5/2012 | Elovici et al. | |
| 8,181,036 B1 | 5/2012 | Nachenberg | |
| 8,281,399 B1 | 10/2012 | Chen et al. | |
| 8,312,516 B1 | 11/2012 | Malatesta | |
| 8,438,643 B2 * | 5/2013 | Wiemer | G06F 21/577 380/250 |
| 8,510,821 B1 | 8/2013 | Brandwine et al. | |
| 8,555,388 B1 | 10/2013 | Wang et al. | |
| 8,561,126 B2 | 10/2013 | Ananthanarayanan et al. | |
| 8,561,127 B1 | 10/2013 | Agrawal et al. | |
| 8,572,733 B1 | 10/2013 | Rockwood | |
| 8,615,785 B2 | 12/2013 | Elrod et al. | |
| 8,621,618 B1 | 12/2013 | Ramsey et al. | |
| 8,683,585 B1 | 3/2014 | Chen et al. | |
| 8,688,820 B1 | 4/2014 | Bhogi et al. | |
| 8,726,383 B2 | 5/2014 | Blackwell | |
| 8,776,050 B2 | 7/2014 | Plouffe et al. | |
| 8,813,225 B1 | 8/2014 | Fuller et al. | |
| 8,990,935 B1 | 3/2015 | Cutts | |
| 9,047,582 B2 * | 6/2015 | Hutchinson | G06Q 10/10 |
| 9,049,105 B1 | 6/2015 | Feinstein et al. | |
| 9,112,841 B1 | 8/2015 | Brandwine et al. | |
| 9,246,935 B2 * | 1/2016 | Lietz | H04L 63/1433 |
| 9,270,690 B2 * | 2/2016 | Kraitsman | H04L 63/1408 |
| 2002/0066034 A1 | 5/2002 | Schlossberg et al. | |
| 2002/0099992 A1 | 7/2002 | Distler et al. | |
| 2002/0116404 A1 | 8/2002 | Cha et al. | |
| 2002/0138416 A1 * | 9/2002 | Lovejoy | G06Q 10/06 705/38 |
| 2002/0147803 A1 * | 10/2002 | Dodd | G06F 21/577 709/223 |
| 2003/0046128 A1 * | 3/2003 | Heinrich | G06Q 40/08 705/7.28 |
| 2003/0051154 A1 | 3/2003 | Barton et al. | |
| 2003/0084327 A1 | 5/2003 | Lingafelt et al. | |
| 2003/0088791 A1 | 5/2003 | Porras et al. | |
| 2003/0110392 A1 | 6/2003 | Aucsmith et al. | |
| 2003/0188191 A1 | 10/2003 | Aaron et al. | |
| 2003/0195959 A1 | 10/2003 | Labadie et al. | |
| 2003/0233438 A1 * | 12/2003 | Hutchinson | G06Q 10/10 709/223 |
| 2004/0006704 A1 | 1/2004 | Dahlstrom et al. | |
| 2004/0181775 A1 | 9/2004 | Anonsen et al. | |
| 2004/0237093 A1 | 11/2004 | Sluiman et al. | |
| 2004/0249973 A1 | 12/2004 | Alkhatib et al. | |
| 2004/0249974 A1 | 12/2004 | Alkhatib et al. | |
| 2005/0018618 A1 | 1/2005 | Mualem et al. | |
| 2005/0066309 A1 | 3/2005 | Creamer et al. | |
| 2005/0091304 A1 | 4/2005 | Trayler | |
| 2005/0114836 A1 | 5/2005 | Fu | |
| 2005/0155013 A1 | 7/2005 | Carrigan | |
| 2005/0172162 A1 | 8/2005 | Takahashi et al. | |
| 2005/0182969 A1 | 8/2005 | Ginter et al. | |
| 2005/0188222 A1 | 8/2005 | Motsinger et al. | |
| 2005/0193231 A1 | 9/2005 | Scheuren | |
| 2005/0193269 A1 | 9/2005 | Haswell et al. | |
| 2005/0204151 A1 | 9/2005 | Fang et al. | |
| 2005/0278790 A1 | 12/2005 | Birk et al. | |
| 2006/0031407 A1 | 2/2006 | Dispensa et al. | |
| 2006/0037077 A1 | 2/2006 | Gadde et al. | |
| 2006/0090206 A1 | 4/2006 | Ladner et al. | |
| 2006/0101520 A1 | 5/2006 | Schumaker et al. | |
| 2006/0184838 A1 | 8/2006 | Singonahalli et al. | |
| 2006/0203739 A1 | 9/2006 | Padmanabhan et al. | |
| 2006/0293940 A1 | 12/2006 | Tsyganskiy et al. | |
| 2007/0027999 A1 | 2/2007 | Allen et al. | |
| 2007/0079168 A1 | 4/2007 | Sivakumar et al. | |
| 2007/0094711 A1 | 4/2007 | Corley et al. | |
| 2007/0180509 A1 | 8/2007 | Swartz et al. | |
| 2007/0185875 A1 | 8/2007 | Chang et al. | |
| 2007/0250424 A1 | 10/2007 | Kothari | |
| 2008/0016570 A1 | 1/2008 | Capalik | |
| 2008/0025288 A1 | 1/2008 | Benner et al. | |
| 2008/0044018 A1 | 2/2008 | Scrimsher et al. | |
| 2008/0141332 A1 | 6/2008 | Treinen | |
| 2008/0148398 A1 | 6/2008 | Mezack et al. | |
| 2008/0177691 A1 | 7/2008 | Alperovitch et al. | |
| 2008/0262990 A1 | 10/2008 | Kapoor et al. | |
| 2008/0263670 A1 | 10/2008 | Stavrica | |
| 2008/0295076 A1 | 11/2008 | McKain et al. | |
| 2009/0007264 A1 | 1/2009 | Chatterjee et al. | |
| 2009/0089682 A1 | 4/2009 | Baier et al. | |
| 2009/0106838 A1 | 4/2009 | Clark et al. | |
| 2009/0199273 A1 | 8/2009 | Yalamanchi | |
| 2009/0228973 A1 | 9/2009 | Kumar et al. | |
| 2009/0254970 A1 | 10/2009 | Agarwal et al. | |
| 2009/0254990 A1 | 10/2009 | McGee | |
| 2009/0288078 A1 | 11/2009 | Makonahalli et al. | |
| 2009/0300045 A1 | 12/2009 | Chaudhry et al. | |
| 2009/0300423 A1 | 12/2009 | Ferris | |
| 2009/0319527 A1 | 12/2009 | King et al. | |
| 2010/0020700 A1 | 1/2010 | Kailash et al. | |
| 2010/0030544 A1 | 2/2010 | Gopalan et al. | |
| 2010/0070964 A1 | 3/2010 | Blumfield et al. | |
| 2010/0077203 A1 | 3/2010 | Ogawa et al. | |
| 2010/0122317 A1 | 5/2010 | Yadav | |
| 2010/0192220 A1 | 7/2010 | Heizmann et al. | |
| 2010/0212010 A1 | 8/2010 | Stringer et al. | |
| 2010/0217850 A1 | 8/2010 | Ferris | |
| 2010/0251363 A1 | 9/2010 | Todorovic | |
| 2010/0257580 A1 | 10/2010 | Zhao | |
| 2010/0257599 A1 | 10/2010 | Gleichauf | |
| 2010/0269121 A1 | 10/2010 | Montesissa et al. | |
| 2010/0306354 A1 | 12/2010 | DeHaan et al. | |
| 2010/0318481 A1 | 12/2010 | Feynman | |
| 2011/0029957 A1 | 2/2011 | Shufer et al. | |
| 2011/0034182 A1 | 2/2011 | Issa et al. | |
| 2011/0047621 A1 | 2/2011 | Brando et al. | |
| 2011/0055921 A1 | 3/2011 | Narayanaswamy et al. | |
| 2011/0101109 A1 * | 5/2011 | Bona | G06K 19/07709 235/492 |
| 2011/0138382 A1 | 6/2011 | Hauser et al. | |
| 2011/0138469 A1 | 6/2011 | Ye et al. | |
| 2011/0145657 A1 | 6/2011 | Bishop et al. | |
| 2011/0154324 A1 | 6/2011 | Pagan et al. | |
| 2011/0208677 A1 | 8/2011 | Zhou et al. | |
| 2011/0208797 A1 | 8/2011 | Kim | |
| 2011/0238855 A1 | 9/2011 | Korsunsky et al. | |
| 2012/0005750 A1 | 1/2012 | Satish | |
| 2012/0039336 A1 | 2/2012 | Richmond et al. | |
| 2012/0072985 A1 | 3/2012 | Davne et al. | |
| 2012/0110672 A1 | 5/2012 | Judge et al. | |
| 2012/0117654 A1 | 5/2012 | Yalakanti | |
| 2012/0137367 A1 | 5/2012 | Dupont et al. | |
| 2012/0151488 A1 | 6/2012 | Arcese et al. | |
| 2012/0185390 A1 | 7/2012 | Palnitkar et al. | |
| 2012/0185913 A1 | 7/2012 | Martinez et al. | |
| 2012/0209947 A1 | 8/2012 | Glaser et al. | |
| 2012/0210437 A1 | 8/2012 | Karande et al. | |
| 2012/0233668 A1 | 9/2012 | Leafe et al. | |
| 2012/0303776 A1 | 11/2012 | Ferris | |

(56) References Cited

U.S. PATENT DOCUMENTS

| | | |
|---|---|---|
| 2012/0304300 A1 | 11/2012 | LaBumbard |
| 2012/0311016 A1 | 12/2012 | DeAnna et al. |
| 2012/0311157 A1 | 12/2012 | Erickson et al. |
| 2012/0311387 A1 | 12/2012 | Santhosh et al. |
| 2012/0324572 A1 | 12/2012 | Gordon et al. |
| 2012/0324576 A1 | 12/2012 | Clark et al. |
| 2013/0019242 A1 | 1/2013 | Chen et al. |
| 2013/0046667 A1 | 2/2013 | Hill et al. |
| 2013/0054792 A1 | 2/2013 | Sharaf |
| 2013/0055398 A1 | 2/2013 | Li et al. |
| 2013/0067067 A1 | 3/2013 | Miri et al. |
| 2013/0091376 A1 | 4/2013 | Raspudic et al. |
| 2013/0097316 A1 | 4/2013 | Bender et al. |
| 2013/0104237 A1 | 4/2013 | Riley et al. |
| 2013/0117809 A1 | 5/2013 | McDougal et al. |
| 2013/0117852 A1 | 5/2013 | Stute |
| 2013/0125121 A1 | 5/2013 | White |
| 2013/0132854 A1 | 5/2013 | Raleigh et al. |
| 2013/0133072 A1* | 5/2013 | Kraitsman ............ G06F 21/554 726/23 |
| 2013/0160072 A1 | 6/2013 | Reus et al. |
| 2013/0174259 A1 | 7/2013 | Pearcy et al. |
| 2013/0185795 A1 | 7/2013 | Winn et al. |
| 2013/0227695 A1* | 8/2013 | Shankar ............... G06F 21/577 726/25 |
| 2013/0238786 A1 | 9/2013 | Khesin |
| 2013/0247135 A1 | 9/2013 | Kundu et al. |
| 2013/0276108 A1 | 10/2013 | Blackwell |
| 2013/0276152 A1 | 10/2013 | Hirsch et al. |
| 2013/0291068 A1 | 10/2013 | Huang et al. |
| 2013/0291087 A1 | 10/2013 | Kailash et al. |
| 2013/0305357 A1 | 11/2013 | Ayyagari et al. |
| 2013/0305369 A1 | 11/2013 | Karta et al. |
| 2013/0305371 A1 | 11/2013 | Figlin et al. |
| 2013/0339514 A1 | 12/2013 | Crank et al. |
| 2013/0346596 A1 | 12/2013 | Balakrishnan et al. |
| 2013/0347131 A1 | 12/2013 | Mooring et al. |
| 2014/0013452 A1 | 1/2014 | Aissi et al. |
| 2014/0026122 A1 | 1/2014 | Markande et al. |
| 2014/0026179 A1 | 1/2014 | Devarajan et al. |
| 2014/0068784 A1 | 3/2014 | Merkow et al. |
| 2014/0074799 A1 | 3/2014 | Karampuri et al. |
| 2014/0082621 A1 | 3/2014 | Fitzgerald et al. |
| 2014/0089204 A1 | 3/2014 | Spies et al. |
| 2014/0096134 A1 | 4/2014 | Barak et al. |
| 2014/0165130 A1 | 6/2014 | Zaitsev |
| 2014/0173738 A1 | 6/2014 | Condry et al. |
| 2014/0189680 A1 | 7/2014 | Kripalani |
| 2014/0214460 A1 | 7/2014 | Rahnama |
| 2014/0258446 A1 | 9/2014 | Bursell |
| 2014/0258715 A1 | 9/2014 | Rodniansky |
| 2014/0259169 A1 | 9/2014 | Harrison |
| 2014/0282840 A1 | 9/2014 | Guinan |
| 2014/0289854 A1 | 9/2014 | Mahvi |
| 2014/0317737 A1 | 10/2014 | Shin et al. |
| 2014/0344933 A1 | 11/2014 | Huh et al. |
| 2015/0032587 A1 | 1/2015 | Broom et al. |
| 2015/0033340 A1 | 1/2015 | Giokas |
| 2015/0052108 A1 | 2/2015 | Volk et al. |
| 2015/0052402 A1 | 2/2015 | Gurumurthy et al. |
| 2015/0095691 A1 | 4/2015 | Edwards |
| 2015/0106939 A1* | 4/2015 | Lietz .................. H04L 63/1433 726/25 |
| 2015/0128246 A1 | 5/2015 | Feghali et al. |
| 2015/0128274 A1 | 5/2015 | Giokas |
| 2015/0150123 A1 | 5/2015 | Be'ery |
| 2015/0186641 A1 | 7/2015 | Cabrera et al. |
| 2015/0215327 A1 | 7/2015 | Cabrera et al. |
| 2015/0222647 A1 | 8/2015 | Lietz et al. |
| 2015/0222653 A1 | 8/2015 | Cabrera et al. |
| 2015/0229661 A1 | 8/2015 | Balabine et al. |
| 2015/0269064 A1 | 9/2015 | Bishop et al. |
| 2015/0278517 A1 | 10/2015 | Weaver et al. |
| 2015/0278523 A1 | 10/2015 | Brinkley et al. |
| 2015/0288708 A1 | 10/2015 | Lietz et al. |
| 2015/0304343 A1 | 10/2015 | Cabrera et al. |
| 2015/0312274 A1 | 10/2015 | Bishop et al. |
| 2015/0319177 A1 | 11/2015 | Lietz et al. |
| 2015/0319186 A1 | 11/2015 | Lietz et al. |
| 2015/0347759 A1 | 12/2015 | Cabrera et al. |
| 2015/0347773 A1 | 12/2015 | Bonney et al. |
| 2015/0371044 A1 | 12/2015 | Horne et al. |

FOREIGN PATENT DOCUMENTS

| | | |
|---|---|---|
| WO | WO 2012/135192 | 10/2012 |
| WO | WO 2013/067404 | 5/2013 |
| WO | WO 2015/102776 | 7/2015 |

OTHER PUBLICATIONS

Lietz et al., "Method and System for Creating Enriched Log Data," U.S. Appl. No. 14/139,449, filed Dec. 23, 2013.

Lietz et al., "Method and System for Secure Delivery of Information to Computing Environments," U.S. Appl. No. 14/319,286, filed Jun. 30, 2014.

Cabrera et al., "Method and System for Efficient Management of Security Threats in a Distributed Computing Environment," U.S. Appl. No. 14/319,352, filed Jun. 30, 2014.

Lietz et al., "Method and System for Providing a Virtual Asset Perimeter," U.S. Appl. No. 14/448,281, filed Jul. 31, 2014.

Cabrera et al., "Method and System for Providing Automated Self-Healing Virtual Assets," U.S. Appl. No. 14/448,326, filed Jul. 31, 2014.

\* cited by examiner

METHOD AND SYSTEM FOR DYNAMIC AND COMPREHENSIVE VULNERABILITY MANAGEMENT

RELATED APPLICATIONS

This application is a continuation of Lietz, et al., U.S. patent application Ser. No. 14/052,971, filed on Oct. 14, 2013, entitled "METHOD AND SYSTEM FOR DYNAMIC AND COMPREHENSIVE VULNERABILITY MANAGEMENT", which is herein incorporated by reference in its entirety.

BACKGROUND

As various forms of distributed computing, such as cloud computing, have come to dominate the computing landscape, security has become a bottleneck issue that currently prevents the complete migration of various capabilities and systems associated with sensitive data, such as financial data, to cloud-based infrastructures, and/or other distributive computing models. This is because any vulnerability in any of the often numerous assets provided and/or utilized in a cloud-based infrastructure, such as operating systems, virtual machine and server instances, processing power, hardware, storage, applications, connectivity, etc., represents a potential vulnerability. Consequently, the number, and variety, of potential vulnerabilities can be overwhelming and many currently available vulnerability management approaches lack the ability to track and control these potentially numerous vulnerabilities in any reasonably comprehensive or tailored manner.

As noted above, the situation is particularly problematic in cases where sensitive data, such as financial data, is being provided to, processed by, utilized by, and/or distributed by, the various assets within the cloud. This is largely because exploitation of certain vulnerabilities in some asset can yield devastating results to the owners of the data, even if the breach is an isolated occurrence and is of limited duration. That is to say, with sensitive data, developing or deploying a remedy for a vulnerability after that vulnerability has been exploited is no solution at all because irreparable damage may have already been done.

Consequently, the historic, and largely current, approaches to vulnerability management that typically involve addressing vulnerabilities on an ad-hoc basis as they arise, or in a simplistic, uncoordinated, static, and largely manual, manner are no longer acceptable. Indeed, in order for applications and systems that process sensitive data to fully migrate to a cloud-based infrastructure, security issues and vulnerabilities must be addressed in a proactive, anticipatory, and comprehensive manner, well before any potential attack can possibly occur, e.g. before deployment and publishing. However, currently, this type of comprehensive approach to vulnerability management is largely unavailable, or is prohibitively resource intensive, often requiring significant amounts of dedicated hardware, software, and human administrators that are often used in a largely reactive and ad-hoc manner.

As a specific example, application development within a cloud infrastructure provides numerous opportunities for the introduction of vulnerabilities into the application and/or infrastructure. These vulnerabilities typically take the form of weaknesses within the assets used at various stages of the application development process that make the application development process, the application, and/or infrastructure, susceptible to various attacks and/or result in violations of defined security policies or procedures. The types of vulnerabilities of concern vary widely from asset-to asset, application-to-application, development platform-to-development platform, and deployment platform-to-deployment platform. For instance, as an illustrative example, vulnerabilities can take the form of a software flaw, or software created in a known vulnerable version of a language. As another example, vulnerabilities can include one or more of a lack of proper authentication, an unacceptable level of access, or other insufficient security measures, required to meet the security policies and/or parameters associated with the application, the application development platform, and/or the application deployment platform.

In addition, vulnerabilities, and application characteristics, of particular interest, are not necessarily static, and are therefore subject to change based on new data from the field, the type of application being developed, the version of the application being developed, changes in the application developer platform, and/or changes in the application deployment platform. Consequently, even in the case where "all" vulnerabilities associated with an application development process are believed to be known, the list of vulnerabilities is dynamic and highly dependent on other, often currently unknown, parameters and/or characteristics.

In addition, if certain vulnerabilities are not identified at specific critical stages in the application/asset development process, e.g., at a critical stage of the application development pipeline, these vulnerabilities can propagate, and become so embedded in the application and infrastructure, that a single vulnerability in a single asset used in the application development process can result in a chain of vulnerabilities that extend beyond the application and can result in significant portions of infrastructure associated with the application being vulnerable to attack. Once this happens, the process for removing the vulnerability, and/or chain of resulting vulnerabilities, can become more difficult by orders of magnitude and can eventually consume unacceptable amounts of time and energy to correct.

Despite the situation described above, vulnerability management currently consists largely of the uncoordinated deployment/application of single vulnerability scans, often preformed after the vulnerability has been provided the opportunity to propagate through an asset and the infrastructure to become a chained vulnerability. Therefore, currently, many vulnerability management issues are ignored, or vulnerability remediation is performed in a reactive, piecemeal and incomplete manner. As a result, current levels of security are unacceptable for some systems and an unacceptable amount of resources are currently devoted to removing chained vulnerabilities that could have been removed with much less effort had they been identified earlier in the application development pipeline.

SUMMARY

In accordance with one embodiment, a method and system for dynamic and comprehensive vulnerability management includes obtaining vulnerability management data representing one or more potentially dynamic vulnerability management policies and vulnerability characteristics of assets to be monitored. In one embodiment, scanner data representing one or more vulnerability scanners and scanner tests for discovering associated vulnerabilities in an asset is generated or obtained from various sources. In one embodiment, remedy data representing one or more remedies or remedy procedures associated with vulnerabilities scanned for by the one or more scanner tests is also generated or obtained, and the remedy data is correlated with the scanner data and the vulnerabilities scanned for by the one or more scanner tests.

In one embodiment, asset data associated with an asset is obtained indicating the type of asset and operational characteristics associated with the asset. In one embodiment, the asset data is analyzed to identify asset vulnerability characteristics data indicating potential vulnerabilities associated with the asset. The vulnerability management data and the vulnerability characteristics data associated with the asset are then processed to select one or more relevant scanner tests represented in the scanner data to be applied to the asset.

In one embodiment, scanner deployment procedure data is then generated indicating when the one or more scanner tests are to be applied to the asset. The one or more relevant scanner tests are then applied to the asset in accordance with the scanner deployment procedure data. In one embodiment, if a vulnerability is indicated in results data from at least one of the one or more relevant scanner tests, the remedy or remedy procedure represented in the remedy data associated with the identified vulnerability is identified and implemented.

In one embodiment, at least the relevant scanner tests associated with the identified vulnerability are re-deployed to the asset to determine if the identified vulnerability has been corrected. In one embodiment, if the identified vulnerability is present after the application of one or more remedies or remedy procedures associated with the identified vulnerability, or after a defined vulnerability correction time period has elapsed, protective action to mitigate the vulnerability of the asset and the infrastructure is automatically taken.

Figure 1:
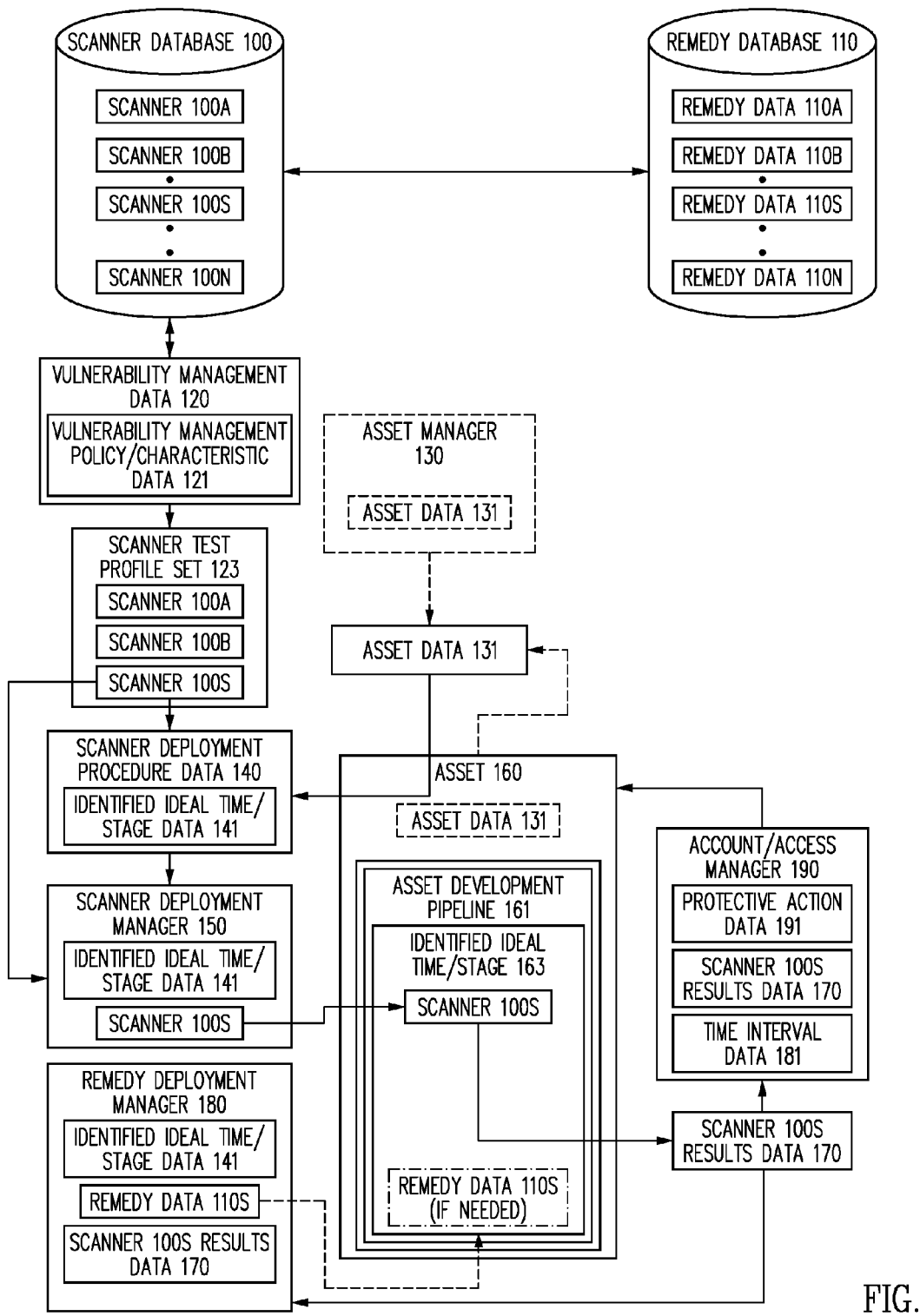
FIG. 1 is a functional block diagram showing the interaction of various elements for implementing one embodiment.

Common reference numerals are used throughout the FIG.s and the detailed description to indicate like elements. One skilled in the art will readily recognize that the above FIG.s are examples and that other architectures, modes of operation, orders of operation and elements/functions can be provided and implemented without departing from the characteristics and features of the invention, as set forth in the claims.

DETAILED DESCRIPTION

Embodiments will now be discussed with reference to the accompanying FIG.s, which depict one or more exemplary embodiments. Embodiments may be implemented in many different forms and should not be construed as limited to the embodiments set forth herein, shown in the FIG.s, and/or described below. Rather, these exemplary embodiments are provided to allow a complete disclosure that conveys the principles of the invention, as set forth in the claims, to those of skill in the art.

In accordance with one embodiment, a method and system for dynamic and comprehensive vulnerability management includes a process for dynamic and comprehensive vulnerability management whereby vulnerability management data is obtained from one or more sources.

In one embodiment, the vulnerability management data includes data indicating a vulnerability management policy, specified vulnerabilities, and vulnerability characteristics to be identified and monitored. In one embodiment, the vulnerability management policy and vulnerability characteristics are directed to specific vulnerabilities potentially associated with one or more assets used to develop, deploy, or operate one or more applications, or other assets, in a cloud-based, or other distributed computing, environment.

In various embodiments, the vulnerabilities and vulnerability characteristics included in the vulnerability management data are openly defined, i.e., are open-ended, and include any vulnerabilities and vulnerability characteristics desired by the owner of an asset, such as an application developer, and/or by the provider of the process for dynamic and comprehensive vulnerability management, and/or by a provider of a distributed computing network, such as a cloud, and/or any other parties or entities associated with the security of a distributed computing network, such as a cloud.

In various embodiments, the vulnerabilities and vulnerability characteristics included in the vulnerability management data can be open-endedly defined as any vulnerability or characteristic that a user considers a security risk if present, or not present, and that were historically defined as different classes of vulnerabilities. For instance, in one embodiment, a vulnerability management policy may include elements directed to levels of security to be associated with various accounts such as, but not limited to, a requirement that Multi-Factor Authentication (MFA) be associated with an account and/or asset, or a requirement of specific lengths and content of passwords associated with an account or asset. In one embodiment, if one or more of these security controls are not present, then the absence of the one or more security controls is defined as a vulnerability.

As another example, the presence of code in a software stack associated with an asset written in designated programming languages, or versions of programming languages, is defined as a vulnerability. Consequently, in various embodiments, very different historical classes of vulnerabilities can be accommodated through one set of vulnerability management data and a single process for dynamic and comprehensive vulnerability management.

Specific illustrative examples of vulnerabilities and vulnerability characteristics included in the vulnerability management data obtained in various embodiments, can include, but are not limited to, the existence of a known weakness pattern in the asset; a non-existent or incorrect buffer length; the inability of the asset vulnerability to be successfully remediated; a lack of security requirements, or insufficient security requirements associated with the asset; the existence of a known vulnerable version of software or code; code written in a language, or version of a language, known to be vulnerable to attack; lack of encryption, or the proper level of encryption; no checks of buffer lengths; no checks of the integrity of arguments; and/or any other vulnerabilities and vulnerability characteristics as open-endedly defined by any parties and, as discussed herein, and/or as known in the art at the time of filing, and/or as become known after the time of filing.

As noted above, vulnerabilities, and vulnerability characteristics of particular interest, are not necessarily static, and are often subject to change based on new data from the field;

the type of application or other asset being developed, or version of the application or asset being developed; changes in the asset developer platform, and/or changes in the asset deployment platform and/or infrastructure. Consequently, even in the highly dubious case where "all" vulnerabilities associated with an asset, and/or that asset's development, are believed to be known, the list of vulnerabilities is dynamic and highly dependent on other, often currently unknown, parameters and/or characteristics. Consequently, in one embodiment, the vulnerability management data, i.e., the vulnerability management policies and/or specified vulnerability characteristics, obtained by the process for dynamic and comprehensive vulnerability management is "open-ended" so that the vulnerability management policies and/or specified vulnerability characteristics can be defined, redefined, removed, added, and/or modified, as needed or desired.

In one embodiment, the vulnerability management data is obtained from, and/or modified by, one or more parties associated with the asset being vulnerability managed. In one embodiment, the vulnerability management data is obtained from, and/or modified by, a provider of the process for dynamic and comprehensive vulnerability management. In one embodiment, the vulnerability management data is obtained from, and/or modified by, third parties, and/or any parties authorized by the owner of the asset. In one embodiment, the vulnerability management data is obtained, and/or modified, through one or more user interfaces.

FIG. 1 is a functional diagram of the interaction of various elements associated with one embodiment of the method and system for dynamic and comprehensive vulnerability management discussed herein. Of particular note, and as indicated by the lack of association of the elements in FIG. 1 with any specific architecture and/or infrastructure components, any individual element shown in FIG. 1, or combination of elements shown in FIG. 1, can be implemented and/or deployed on any of one or more various architectural or infrastructure components, such as one or more hardware systems, one or more software systems, one or more data centers, one or more clouds or cloud types, one or more third party service capabilities, or any other one or more architectural and/or infrastructure components as discussed herein, and/or as known in the art at the time of filing, and/or as developed/made available after the time of filing.

In addition, the elements shown in FIG. 1, and/or the architectural and/or infrastructure components deploying the elements shown in FIG. 1, can be under the control of, or otherwise associated with, various parties or entities, or multiple parties or entities, such as, but not limited to, a provider of the process for dynamic and comprehensive vulnerability management, an owner or other party, parties, and/or entities associated with an asset being vulnerability managed, a party, parties, and/or entities providing all or a portion of a cloud-based environment, a party, parties, and/or entities providing one or more services, and/or any other party, parties, and/or entities, as discussed herein, and/or as known in the art at the time of filing, and/or as made known after the time of filing.

As seen in FIG. 1, vulnerability management policy and/or vulnerability characteristic data is included in FIG. 1 as vulnerability management policy/characteristic data 121 of vulnerability management data 120.

In one embodiment, once vulnerability management data is obtained indicating the vulnerability management policies, vulnerabilities, and vulnerability characteristics to be used with the process for dynamic and comprehensive vulnerability management, scanner data composed of one or more vulnerability scanners, referred to herein as "scanners", capable of detecting and monitoring the vulnerabilities and vulnerability characteristics associated the vulnerability management data is generated or obtained.

In various embodiments, the scanners included in the scanner data are comprised of code designed to monitor or check various assets to determine if specific vulnerabilities discoverable with the scanners are present. In many cases, the scanners are actually sets of scanner tests with each scanner test being associated with, i.e. capable of detecting, a specific vulnerability or vulnerability characteristic.

Given the variety of assets to be vulnerability managed, and the open-ended composition of the vulnerability management data, it follows that scanner data including numerous types and classes of scanners and scanner tests is used with various embodiments of the process for dynamic and comprehensive vulnerability management discussed herein. Typically, scanners can be classified in several ways including, but not limited to, the type of scanner; the vulnerabilities scanned for by the scanner, i.e., scanner tests included in the scanner; desirable scanning tests included in the scanner; the deployment profile/time for the scanner, e.g., how long it take to schedule and/or deploy the scanner and receive scanner results data; whether the scanner is a continuously deployed scanner or another type of scanner; whether the scanner is synchronous or asynchronous; and/or any other scanner parameters, as discussed herein, and/or as known in the art at the time of filing, and/or as developed after the time of filing.

As noted above, vulnerabilities, and vulnerability characteristics, included in the obtained vulnerability management data are open-endedly defined and subject to change. Consequently, the scanners and scanner tests desirable and/or necessary to ensure compliance with the vulnerability management policies indicated in the vulnerability management data are likely to change over time as well. In addition, new scanners and scanner tests may be required and/or become available, existing scanners and scanner tests may be updated and/or improved, and/or new combinations of desirable scanner tests may become available.

To address this need, in one embodiment, the scanner data obtained, representing the collection scanners and scanner tests to be used with process for dynamic and comprehensive vulnerability management, is open-endedly defined to allow the scanning capabilities provided by the scanner data to be tailored to meet particular defined needs and to allow for the addition of new scanners and scanner tests, and/or modified scanners and scanner tests, as defined, or redefined, by one or more parties associated with vulnerability management and/or the one or more assets being vulnerability managed.

In various embodiments, the collection of scanners and scanner tests included in the scanner data includes individual scanners obtained from multiple, and often very diverse, sources and/or parties including, but not limited to, third party vendors who generate scanners and scanner tests and then sell them, or otherwise provide the scanners and scanner tests; owners, or other parties, associated with the assets being vulnerability managed; various parties involved in the development of the assets being vulnerability managed; providers of all, or part of, a cloud-based infrastructure; third party service providers associated with the assets, and/or asset develop processes; and/or any other sources, parties, or entities capable of providing one or more scanners and/or scanner tests, as discussed herein, and/or as known in the art at the time of filing, and/or as become known after the time of filing.

In various embodiments, the multiple scanners and scanner tests included in a single example of scanner data can each come from a different one of the scanner and scanner test sources discussed herein. Consequently, scanners and scanner tests obtained from, and generated by, very diverse sources, having very different scanning/testing capabilities, and being of very diverse structure, operation, and classification, can be included in a single set of scanners and scanner tests included in a single example of scanner data obtained, and used, by the process for dynamic and comprehensive vulnerability management.

In various embodiments, updates and additions to the scanner data, i.e., updates and additions to the scanners and scanner tests comprising the scanner data, are performed automatically as these updates and additions become available. In various embodiments, these updates and additions are provided automatically by any of the parties, and/or sources, of scanner and scanner tests, discussed herein, and/or as known in the art at the time of filing, and/or as become known after the time of filing. Consequently, the scanner data associated with the process for dynamic and comprehensive vulnerability management discussed herein is open-endedly defined, dynamic and diverse in its composition and operation, and is updated as needed, in one embodiment, automatically. Therefore, using the process for dynamic and comprehensive vulnerability management discussed herein, scanner data is provided that represents a more comprehensive, dynamic, diverse, and individually tailored, scanning and testing capability than is available using any current vulnerability management methods and systems.

Referring back to FIG. 1, the scanner data including one or more scanners and scanner tests obtained by the process for dynamic and comprehensive vulnerability management is represented generically by scanner 100A, scanner 100B, scanner 100S, through scanner 100N.

In one embodiment, the scanners and scanner tests represented in the scanner data obtained are classified according to the parameters discussed above and are de-duplicated.

As noted above, each of the scanners obtained can include multiple scanner tests. As a result, when multiple scanners are obtained it is often the case that duplicate scanner tests, i.e., scanner tests directed to the same vulnerability or vulnerability characteristic are obtained. In accordance with one embodiment, duplicate scanner tests are identified. The duplicate scanner tests are then analyzed to identify the scanner test in the set of duplicate scanner tests that is most compatible with the desired result. In short, in one embodiment, the scanner test in the set of duplicate scanner tests that is determined to be the best scanner test is selected. As a specific illustrative example, in one embodiment, the scanner test in the set of duplicate scanner tests that historically yields the least number of false positive results is selected.

In one embodiment, the scanner data representing the scanners, and selected de-duplicated scanner tests, and the classification data associated with each of the selected scanners and scanner tests, is stored in a scanner database.

As used herein, the term "database" includes, but is not limited to, any data storage mechanism known at the time of filing, or as developed thereafter, such as, but not limited to, a hard drive or memory; a designated server system or computing system, or a designated portion of one or more server systems or computing systems; a server system network; a distributed database; or an external and/or portable hard drive. Herein, the term "database" can refer to a dedicated mass storage device implemented in software, hardware, or a combination of hardware and software. Herein, the term "database" can refer to a web-based function. Herein, the term "database" can refer to any data storage means that is part of, or under the control of, any computing system, as discussed herein, known at the time of filing, or as developed thereafter.

Referring back to FIG. 1, scanner database 100 is shown as including scanner data in the form of scanner 100A, scanner 100B, scanner 100S, through scanner 100N.

In one embodiment, remedy data associated with the vulnerabilities and vulnerability characteristics scanned for by the scanners and scanner tests represented in the scanner data is obtained.

In various embodiments, the remedy data includes remedies or remedy procedures to be implemented on an asset being vulnerability managed once the vulnerability or vulnerability characteristic associated with the remedy or remedy procedure is identified by the one or more scanners and scanner tests. To this end, each of the remedies or remedy procedures indicated in the remedy data is correlated with an associated vulnerability or vulnerability characteristic to which the remedy or remedy procedure applies, and/or the scanner or scanner test used to identify the associated vulnerability or vulnerability characteristic.

In one embodiment, data representing the correlated remedies or remedy procedures indicated in the remedy data, the associated vulnerability or vulnerability characteristics addressed by the remedies or remedy procedures, and/or the scanner or scanner tests used to identify the associated vulnerability or vulnerability characteristics, is stored in a remedy database.

Referring to FIG. 1, remedy data representing the remedies and/or procedures associated with the vulnerabilities and vulnerability characteristics is represented in FIG. 1 as remedy data 110A, remedy data 110B, remedy data 110S, through remedy data 110N stored in remedy database 110.

In various embodiments, the remedy data includes remedies, i.e., mechanisms for actually correcting the identified vulnerability, and remedy procedures, i.e., procedures for ensuring that the vulnerability is corrected, i.e., is closed.

In one embodiment, when actual remedies are available, these remedies are automatically applied to the asset being vulnerability managed once the associated vulnerability, or vulnerability characteristic, is identified by a scanner or scanner test. Consequently, in these instances, the remedy is applied as part of a self-healing process through which assets being vulnerability managed become self-healing assets and/or asset systems.

Examples of remedies that are used as part of the self-healing asset system disclosed herein include but are not limited to, automatic application of a software patch; automatic installation of a software version update; automatic deletion of an asset component; automatic replacement of an asset component; an automatic change to a configuration; automatic re-sizing of buffers and buffer pools; automatic re-setting or changing a response time; and/or any other remedy capable of being obtained, stored, and automatically applied to an asset, as discussed herein, and/or as known in the art at the time of filing, and/or as developed after the time of filing.

In other examples, the remedy associated with an identified vulnerability or vulnerability characteristic does not lend itself to being automatically corrected without some form of input and/or interaction with the owner of the asset being vulnerability managed. To address these cases, the remedy data also includes remedy procedure data indicating a procedure to be implemented that includes input and/or interaction from the owner of the asset being vulnerability managed.

As a specific illustrative example, in one embodiment, if a vulnerability is discovered that needs to be addressed by the owner of the asset having the vulnerability, the remedy procedure includes instructions and mechanisms for contacting a designated contact entity, e.g., the asset owner, or any other authorized and/or designated party associated with the asset, and informing the contact entity of the discovered vulnerability and the need to correct, or close, the discovered vulnerability.

In various embodiments, the remedy procedures include data indicating a vulnerability correction time period/timeframe in which the vulnerability must be addressed. In various embodiments, the vulnerability correction time period/timeframe is determined based on the perceived security risk associated with the identified vulnerability.

In one embodiment, if the vulnerability is not closed within the associated vulnerability correction period/timeframe, further protective action is automatically taken to isolate the asset, and/or protect the infrastructure, and to mitigate the vulnerability.

In one embodiment, as part of the remedy procedure associated with the identified vulnerability, the contact entity is informed of the vulnerability correction time period/timeframe, and the associated protective action that will be taken if the vulnerability is not addressed in the vulnerability correction time period/timeframe.

In various embodiments, the remedy procedures associated with a given vulnerability can include any other procedures and/or actions as desired/required by the asset owner, a provider of the process for dynamic and comprehensive vulnerability management, a provider of a distributed computing system, such as a cloud, and/or any other party associated with the asset, as discussed herein, and/or as known in the art at the time of filing, and/or as becomes known after the time of filing.

Once again, as noted above, vulnerabilities, and vulnerability characteristics included in the obtained vulnerability management data are open-endedly defined and subject to change. Consequently, in one embodiment, the scanner data obtained representing the one or more scanners and scanner tests to be deployed in various embodiments of the process for dynamic and comprehensive vulnerability management is open-ended so that new scanners and scanner tests, and/or improved/modified scanners and scanner tests can be added to the scanner data by one or more parties. Likewise, in various embodiments, the remedies or remedy procedures included in the remedy data obtained by the process for dynamic and comprehensive vulnerability management is also open-ended and allows for updates and additions to the remedies or remedy procedures as needed. Consequently, using the method and system for dynamic and comprehensive vulnerability management disclosed herein, the vulnerability policies and vulnerability characteristics to be monitored, the scanners and scanner tests used, and the remedies and remedy procedures applied, are all open-endedly defined and dynamic to provide a level of flexibility, comprehensiveness, and diversity of application, unknown and unavailable through currently available vulnerability management systems.

In one embodiment, once the vulnerability management data, scanner data, and remedy data are obtained, these data and mechanisms are then applied to one or more assets to be vulnerability managed using the process for dynamic and comprehensive vulnerability management.

As used herein, the term "asset" includes but is not limited to, any logical or physical entity or object, and/or grouping of objects, that can potentially contain a weakness, or weak points in their design, are subject to attack or failure, and/or potentially include one or more vulnerabilities which are subject to such attack or failure. As specific illustrative examples, assets can include, but are not limited to, a file; an application; an application development pipeline or process; any asset development pipeline; a virtual machine; an instance of a virtual machine or virtual server in a cloud; an operating system; storage capability allocated to an instance in a cloud infrastructure; processing capability allocated to an instance in a cloud infrastructure; hardware allocated to an instance in a cloud infrastructure; software allocated to an instance in a cloud infrastructure; a service provided through a cloud infrastructure; a cloud infrastructure access system; any process and/or design process for designing and/or producing a physical item, and/or the physical item itself; and/or any combination of the items, and entities listed above, and/or any other items and entities as discussed herein, and/or as known in the art at the time of filing, and/or as made available after the time of filing.

In addition, the term "asset" can refer to an entity or logical and/or physical object that itself is composed of, and/or associated with, one or more assets. As a specific illustrative example, an application development process, and/or an application, would be considered an asset in accordance with the definition provided above, and as the term "asset" is commonly used in the art. However, the application development processes, and/or applications, themselves may include, and/or be associated with, various other assets such as, but not limited to, one or more instances of a virtual machine or virtual server in a cloud; one or more operating systems; one or more storage capabilities allocated to an instance in a cloud infrastructure; processing capability allocated to an instance in a cloud infrastructure; hardware allocated to an instance in a cloud infrastructure; software allocated to an instance in a cloud infrastructure; one or more services provided through a cloud infrastructure; one or more cloud infrastructure access systems; etc.

Referring to FIG. 1, the asset to be vulnerability managed is represented by asset 160 that includes, in one embodiment, asset data 131.

In one embodiment, in order to apply the vulnerability management data, scanner data, and remedy data of the process for dynamic and comprehensive vulnerability management, asset data associated with an asset to be vulnerability managed is obtained indicating the asset type and various operational characteristics associated with the asset that may represent vulnerabilities.

In one embodiment, the process for dynamic and comprehensive vulnerability management is a component of a larger asset verification system, such as an application, or application development, verification system. In these embodiments, the asset data is obtained from an asset management system associated with the asset verification system.

Returning to FIG. 1, the asset data 131 is shown as being obtained optionally from asset 160 directly or from optional asset manager 130.

In one embodiment, the obtained asset data is analyzed to identify vulnerability characteristics associated with the asset and, in particular, any vulnerability characteristics associated with the asset which are also indicated in the vulnerability management policies and/or the vulnerability characteristics in the vulnerability management data.

In one embodiment, the vulnerability management data and the data indicating the asset vulnerability characteristics is analyzed to identify one or more relevant scanners and scanner tests from the scanner database to be applied to the asset.

Referring to FIG. 1, the one or more relevant scanners and scanner tests are represented by scanner 100A, scanner 100B, and scanner 100S.

As noted above, in one embodiment, the scanner test data includes data representing scanner tests selected as the best scanner test for their associated vulnerability. Consequently, in one embodiment, based on the analysis of the vulnerability management data and the asset vulnerability characteristics data associated with a specific asset, data representing various scanners and scanner tests is transformed into scanner test profile set data specifically tailored to the asset under consideration and including the identified best scanner tests for identifying the vulnerabilities and vulnerability characteristics indicated in the vulnerability management data. Therefore, the result is a scanner test profile set customized to both the needs of the user, as indicated in the vulnerability management data, and the specific asset being vulnerability managed, as indicated in the asset data and asset vulnerability characteristics data.

Referring to FIG. 1, a scanner test profile set specifically tailored to asset 160 is represented as scanner test profile set 123 including the one or more relevant scanners and scanner tests represented by scanner 100A, scanner 100B, and scanner 100S.

In one embodiment, a scanner deployment procedure for the scanners and scanner tests included in the scanner test profile set for the asset is then generated indicating an order, time, and/or stage in the asset, when the various scanners and scanner tests included in the scanner test profile set are to be deployed on the asset.

Referring to FIG. 1, a scanner deployment procedure for the scanners and scanner tests represented by scanner 100A, scanner 100B, and scanner 100S included in the scanner test profile set 123 for the asset 160 is represented as scanner deployment procedure data 140.

In various embodiments, the scanner deployment procedure is generated to deploy the scanners and scanner tests in an indicated order, and at a time and/or stage where the vulnerabilities associated with each of the scanners and scanner tests can be corrected/closed using the minimal number of resources and at a point in the asset where there is minimal possibility of the vulnerabilities becoming embedded and/or chained in the process, and/or affecting other components and/or parts of the infrastructure.

Herein, the time and/or stage where the vulnerabilities associated with an asset can be corrected using the minimal number of resources, and where there is minimal possibility of the vulnerabilities becoming chained vulnerabilities, is referred to as the "ideal" time and/or stage.

Referring to FIG. 1, for selected scanner 100S, the "ideal" time and/or stage is represented as identified ideal time/stage data 141.

In one embodiment, the scanners and scanner tests included in the scanner test profile set are then deployed on the asset in accordance with the scanner deployment procedure. In one embodiment, the scanners and scanner tests included in the scanner test profile set are deployed on the asset in accordance with the scanner deployment procedure using a scanner deployment manager.

Referring to FIG. 1, scanner deployment manager 150 is shown including identified ideal time/stage data 141 and scanner 100S. As also seen in FIG. 1, scanner 100S is shown as deployed at identified ideal time/stage 163 of asset development pipeline 161 of asset 160 in accordance with scanner deployment procedure data 140, identified ideal time/stage data 141, and by scanner deployment manager 150.

In one embodiment, results data is then received from the scanners and scanner tests indicating whether one or more vulnerabilities have been found.

Referring to FIG. 1, results data associated with scanner 100S, shown as scanner 100S results data 170 in FIG. 1, is received from the scanners and scanner tests represented by scanner 100S indicating whether one or more vulnerabilities have been found.

In various embodiments, if no vulnerabilities are indicated in the results data, the scanners and scanner tests included in the scanner test profile set continue to be deployed in accordance with the scanner deployment procedure. However, if at least one vulnerability is indicated in the results data, data indicating the vulnerability identified, and/or the scanner or scanner test discovering the vulnerability, is recorded along with, in one embodiment, the time at which the vulnerability was identified.

In various embodiments, duplicate indications of a vulnerability can arise in the scanner/scanner test results data. This is particularly true when, as discussed below, the remedy or remedy procedure associated with the vulnerability identified either cannot be scheduled and/or applied immediately, and/or the vulnerability is not closed immediately by the asset owner. In these cases, in the timeframe between when the vulnerability is first identified and the remedy, or remedy procedure, is implemented, continuing applications of the scanners and scanner tests of the scanner test profile set associated with the asset may result in further indications of the vulnerability in the scanner results data. Consequently, without some form of de-duplication process, multiple vulnerability alerts associated with a single vulnerability in a single asset could be processed resulting in inefficiency and attempted redundant application of remedies and/or scheduling of remedies. In one embodiment, to avoid this situation, various types of de-duplication processes are performed including, as an illustrative example, merging all indications of a vulnerability associated with a specific asset within a defined timeframe into a single vulnerability report to be addressed with a single application of a remedy or remedy procedure.

In one embodiment, once the results data are analyzed to eliminate duplicate vulnerability indications, the de-duplicated results data are analyzed to determine the vulnerability/vulnerabilities indicated and the associated remedy(s) and/or remedy procedure(s) in the remedy database associated with the indicated vulnerability/vulnerabilities.

Referring to FIG. 1, for selected scanner 100S and scanner 100S results data 170, scanner 100S results data 170 is provided to remedy deployment manager 180 where the remedy(s) and/or remedy procedure(s) in remedy database 110 associated any vulnerability indicated in scanner 100S results data 170 are identified and obtained as remedy data 110S.

In one embodiment, once the associated remedy(s) and/or remedy procedure(s) are identified and obtained, the application of the associated remedy(s) and/or remedy procedure(s) is either scheduled to be performed, if scheduling is necessary, or are applied to the asset, at an ideal time or stage consistent with the scanner deployment procedure.

Referring to FIG. 1, for selected scanner 100S and scanner 100S results data 170, remedy deployment manager 180 includes scanner 100S results data 170, identified ideal time/stage data 141, and remedy data 110S. As also seen in FIG. 1, if needed, i.e., if scanner 100S results data 170 indicates an identified vulnerability, remedy data 110S is applied to the identified ideal time/stage 163 of asset development pipeline 161 of asset 160.

In one embodiment, at least the scanners and scanner tests that identified the vulnerability/vulnerabilities are re-deployed to the asset to determine if the vulnerability/vulnerabilities have been corrected.

Referring to FIG. 1 at least the scanner or scanner test, e.g., scanner 100S, that identified the vulnerability/vulnerabilities is re-deployed to asset 160 to determine if the vulnerability/vulnerabilities have been corrected.

In one embodiment, as noted above, in the time period between the identification of a vulnerability and the application of the associated remedy or remedy procedure, re-deployment of the scanners and scanner tests in the scanner test profile set associated with the asset may occur. However, as noted above, in one embodiment vulnerabilities indicated in the results data from these re-deployments are grouped together into a single vulnerability report for the asset.

As also noted above, in some embodiments, particularly in cases where a remedy procedure is applied that grants the asset owner a vulnerability correction timeframe in which to close a vulnerability, there may also be a delay between when the vulnerabilities are identified and when the vulnerability is corrected. As a result, there may be re-deployments of the scanners and scanner tests during this time period.

In either the case, when the scanners and scanner tests are re-deployed before the remedy or remedy procedure has been implemented and completed, if the scanner or scanner test results indicate the presence of the vulnerability, a determination is made as to whether any time intervals, such as a vulnerability correction timeframe or a remedy application scheduling timeframe, associated with the applied remedies or remedy procedures has elapsed. In instances where the time interval associated with the one or more applied remedies or remedy procedures has not elapsed, no further action is taken and scanning continues in accordance with the scanner deployment procedure.

However, in one embodiment, if the scanners and scanner tests are re-deployed and data indicating the identified vulnerability/vulnerabilities is/are still present, and the time interval associated with the one or more applied remedies or remedy procedures has elapsed, then protective action is taken to mitigate the potential adverse effects of the vulnerability.

In various embodiments, the protective actions taken can include but are not limited to, closing an account associated with the asset; automatically upgrading the asset; removing the asset or a component of the asset; replacing the asset or a component of the asset; shutting down an asset; shutting down multiple assets; deleting an instance of a virtual machine/server; deleting a database; and/or any action capable of isolating the asset, isolating portions of the asset, and/or protecting other assets and/or infrastructure as discussed herein, and/or as known in the art/available at the time of filing, and/or as developed/made available after the time of filing.

Referring to FIG. 1, if account/access manager 190 receives scanner 100S results data 170 from a re-deployment of scanner 100S, and time interval data 181 indicates the time interval associated with the one or more applied remedies or remedy procedures, i.e., associated with remedy data 110S, has elapsed, then protective actions are applied to asset 160 in accordance with protective action data 191 to mitigate the potential adverse effects of the vulnerability.

In one embodiment, once protective action is taken, the scanners and scanner tests included in the scanner test profile set associated with the asset continue to be deployed in accordance with the scanner deployment procedure until another vulnerability is found.

In various embodiments, the process for dynamic and comprehensive vulnerability management discussed above is continuously applied and/or repeated. In other embodiments, the process for dynamic and comprehensive vulnerability management discussed above is applied at critical points and/or on-demand. For instance, as one specific illustrative example, the process for dynamic and comprehensive vulnerability management is applied as part of an application development process before the application is published and/or otherwise pushed to the cloud. Then, in one illustrative example, the process for dynamic and comprehensive vulnerability management is applied on a periodic basis to ensure that no actions have been taken to introduce, or reintroduce, vulnerabilities and vulnerability characteristics into the application once the application is live in the cloud.

In the discussion above, certain aspects of one embodiment include processes, sub-processes, steps, operations and/or instructions described herein for illustrative purposes in a particular order and/or grouping. However, the particular order and/or grouping shown and discussed herein are illustrative only and not limiting. Those of skill in the art will recognize that other orders and/or grouping of the processes, sub-processes, steps, operations and/or instructions are possible and, in some embodiments, one or more of the processes, sub-processes, steps, operations and/or instructions discussed above can be combined and/or deleted. In addition, portions of one or more of the processes, sub-processes, steps, operations and/or instructions can be re-grouped as portions of one or more other of processes, sub-processes, steps, operations and/or instructions discussed herein. Consequently, the particular order and/or grouping of the processes, sub-processes, steps, operations and/or instructions discussed herein do not limit the scope of the invention as claimed below.

Using the system and method for dynamic and comprehensive vulnerability management discussed herein, the vulnerability policies and vulnerability characteristics to be monitored, the scanners and scanner tests used, and the remedies and remedy procedures applied, are all open-endedly defined and dynamic to provide a level of flexibility, comprehensiveness, and diversity of application, unknown and unavailable through currently available vulnerability management systems.

In addition, using the system and method for dynamic and comprehensive vulnerability management discussed herein, scanner test data is obtained representing scanner tests selected as the best scanner tests for their associated vulnerability. Then data representing these best scanner tests is transformed into scanner test profile set data specifically tailored to the asset under consideration and including the identified best scanner tests for identifying the vulnerabilities and vulnerability characteristics indicated in the vulnerability management data. Therefore, the result is a scanner test profile set customized to both the needs of the user, as indicated in the vulnerability management data, and the specific asset being vulnerability managed, as indicated in the asset data and asset vulnerability characteristics data.

In addition, using the system and method for dynamic and comprehensive vulnerability management discussed herein, a scanner deployment procedure is generated to deploy the scanners and scanner tests in the scanner test profile set at a time and/or stage where the vulnerabilities associated with each of the scanners and scanner tests can be corrected/closed using the minimal number of resources, and at a point in the asset where there is minimal possibility of the vulnerabilities becoming embedded and/or chained and/or affecting other components and/or parts of the infrastructure.

Finally, using the system and method for dynamic and comprehensive vulnerability management discussed herein, when actual remedies are available, these remedies are automatically applied to the asset being vulnerability managed once the associated vulnerability, or vulnerability characteristic, is identified by a scanner or scanner test. Consequently, in these instances, the remedy is applied as part of a self-healing process through which assets being vulnerability managed become self-healing assets and/or asset systems.

As a result of these and other features, the system and method for dynamic and comprehensive vulnerability management discussed herein provides a vulnerability management mechanism that is more flexible, comprehensive, and automated than any currently available vulnerability management system or method, and which operates to implement a proactive and anticipatory vulnerability management approach rather than the reactive and ad-hoc vulnerability management approaches that are currently available.

Process

Figure 2A:
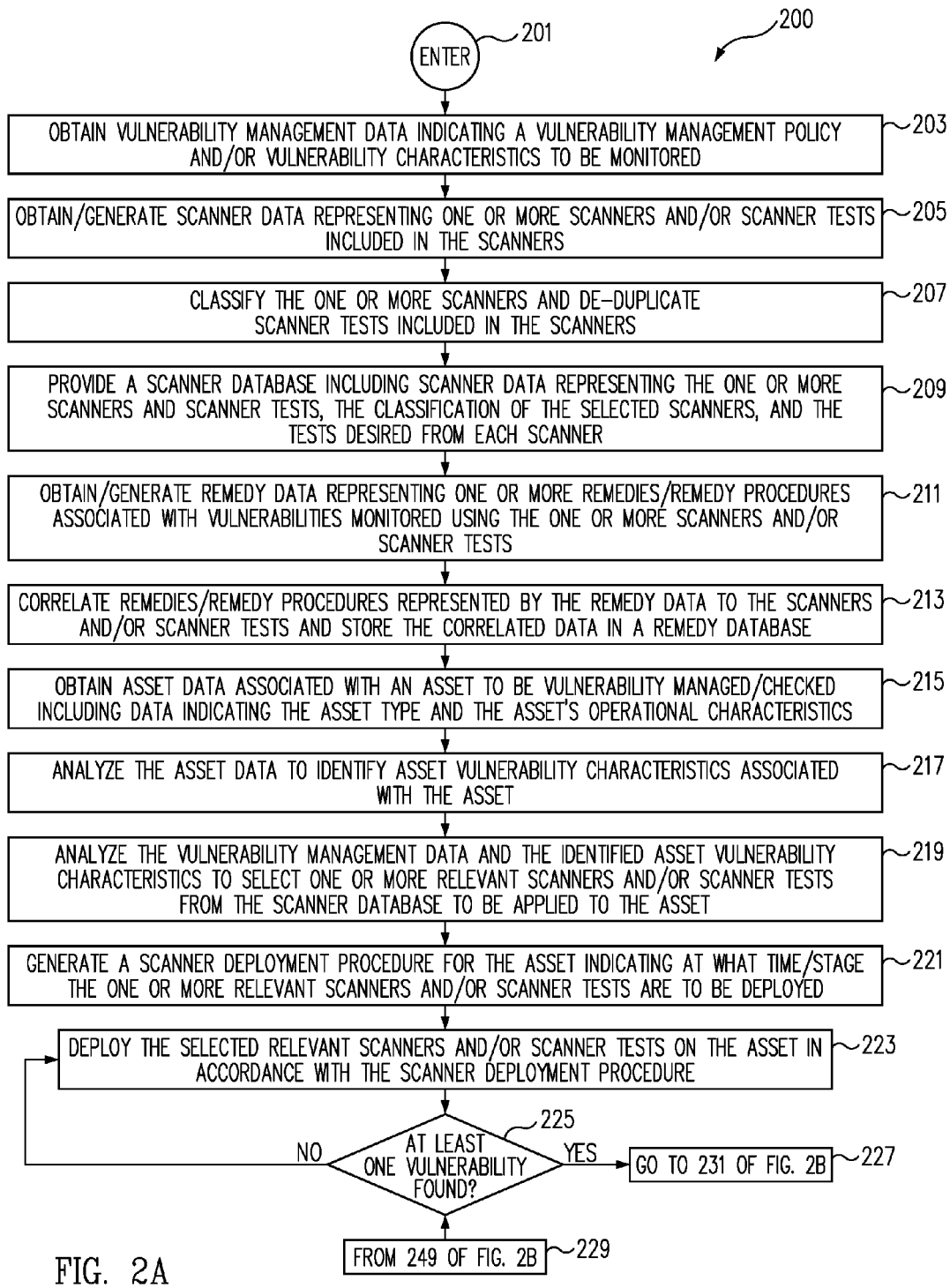
FIG. 2A and FIG. 2B together make up a flow chart depicting a process for dynamic and comprehensive vulnerability management in accordance with one embodiment.
Figure 2B:
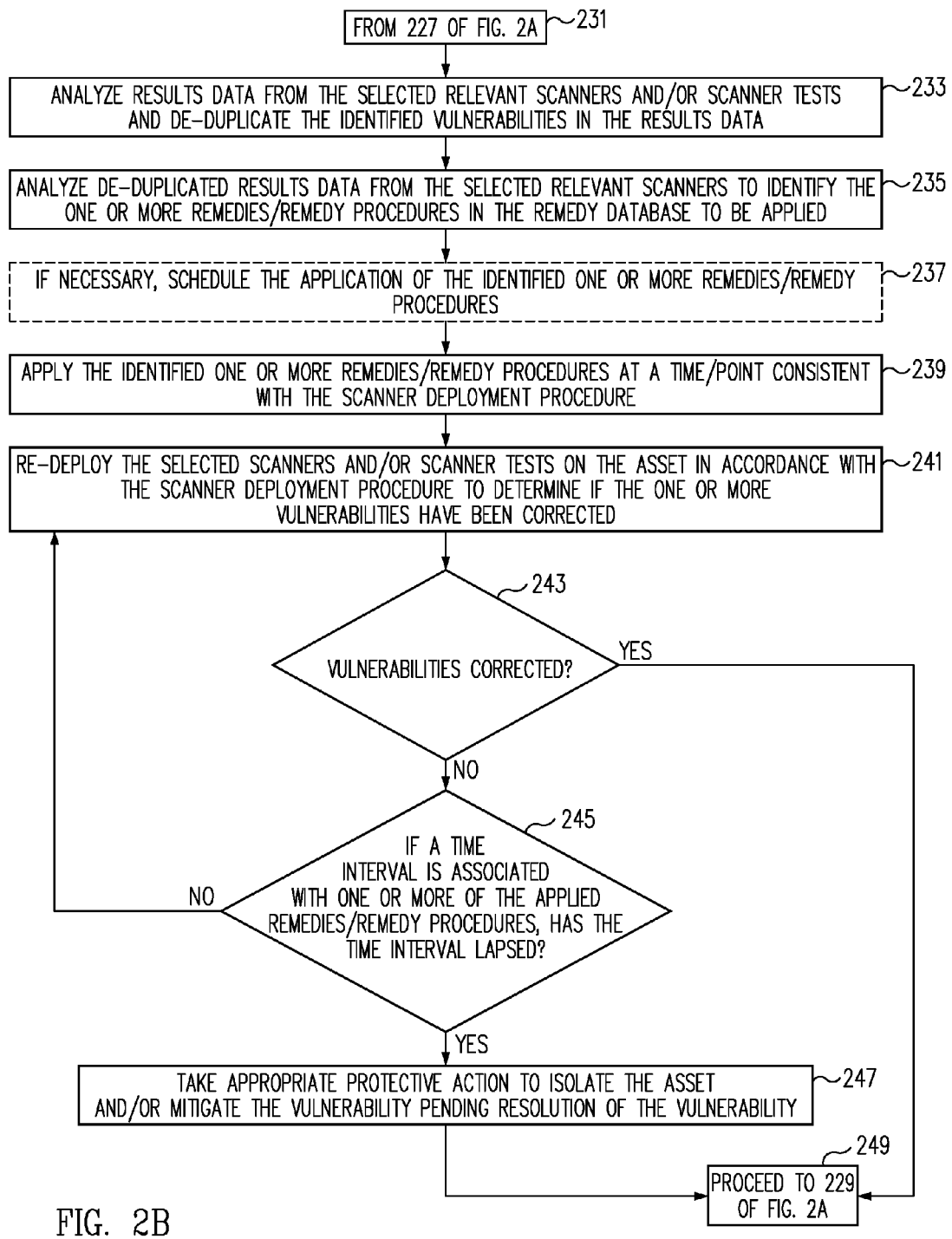

FIG. 2A and FIG. 2B combined are a flow chart of a process 200 for dynamic and comprehensive vulnerability management.

In one embodiment, process 200 begins at ENTER OPERATION 201 of FIG. 2A and process flow proceeds to OBTAIN VULNERABILITY MANAGEMENT DATA INDICATING A VULNERABILITY MANAGEMENT POLICY AND/OR VULNERABILITY CHARACTERISTICS TO BE MONITORED OPERATION 203.

In one embodiment, at OBTAIN VULNERABILITY MANAGEMENT DATA INDICATING A VULNERABILITY MANAGEMENT POLICY AND/OR VULNERABILITY CHARACTERISTICS TO BE MONITORED OPERATION 203 vulnerability management data is obtained from one or more sources.

In one embodiment, the vulnerability management data of OBTAIN VULNERABILITY MANAGEMENT DATA INDICATING A VULNERABILITY MANAGEMENT POLICY AND/OR VULNERABILITY CHARACTERISTICS TO BE MONITORED OPERATION 203 includes data indicating a vulnerability management policy, specified vulnerabilities, and vulnerability characteristics to be identified and monitored.

In one embodiment, the vulnerability management policy and vulnerability characteristics of OBTAIN VULNERABILITY MANAGEMENT DATA INDICATING A VULNERABILITY MANAGEMENT POLICY AND/OR VULNERABILITY CHARACTERISTICS TO BE MONITORED OPERATION 203 are directed to specific vulnerabilities potentially associated with one or more assets used to develop, deploy, or operate one or more applications, or other assets, in a cloud-based, or other distributed computing, environment.

In various embodiments, the vulnerabilities and vulnerability characteristics included in the vulnerability management data of OBTAIN VULNERABILITY MANAGEMENT DATA INDICATING A VULNERABILITY MANAGEMENT POLICY AND/OR VULNERABILITY CHARACTERISTICS TO BE MONITORED OPERATION 203 include any vulnerabilities and vulnerability characteristics desired by the owner of an asset, such as an application developer, and/or by the provider of process 200 for dynamic and comprehensive vulnerability management, and/or by a provider of a distributed computing network, such as a cloud, and/or any other parties or entities associated with the security of a distributed computing network, such as a cloud.

In various embodiments, the vulnerabilities and vulnerability characteristics included in the vulnerability management data of OBTAIN VULNERABILITY MANAGEMENT DATA INDICATING A VULNERABILITY MANAGEMENT POLICY AND/OR VULNERABILITY CHARACTERISTICS TO BE MONITORED OPERATION 203 can be defined by a user as any vulnerability or characteristic that the user considers a vulnerability risk if present, or not present, and that are historically defined as different classes of vulnerabilities.

For instance, in one embodiment, a vulnerability management policy may include elements directed to levels of security to be associated with various accounts such as, but not limited to, a requirement that Multi-Factor Authentication (MFA) be associated with an account and/or asset, or a requirement of specific lengths and content of passwords associated with an account or asset. In one embodiment, if these levels of security are not present, then this is defined as a vulnerability in the vulnerability management data of OBTAIN VULNERABILITY MANAGEMENT DATA INDICATING A VULNERABILITY MANAGEMENT POLICY AND/OR VULNERABILITY CHARACTERISTICS TO BE MONITORED OPERATION 203.

As another example, the presence of code in a software stack associated with an asset written in designated programming languages, or versions of programming languages, may be defined as a vulnerability in the vulnerability management data of OBTAIN VULNERABILITY MANAGEMENT DATA INDICATING A VULNERABILITY MANAGEMENT POLICY AND/OR VULNERABILITY CHARACTERISTICS TO BE MONITORED OPERATION 203.

Consequently, using process 200 for dynamic and comprehensive vulnerability management, very different classes of vulnerabilities can be accommodated through the single set of vulnerability management data of OBTAIN VULNERABILITY MANAGEMENT DATA INDICATING A VULNERABILITY MANAGEMENT POLICY AND/OR VULNERABILITY CHARACTERISTICS TO BE MONITORED OPERATION 203 and through a single process 200 for dynamic and comprehensive vulnerability management. This in turn provides a flexibility and adaptability unknown with currently available vulnerability management methods and systems.

Specific illustrative examples of vulnerabilities and vulnerability characteristics included in the vulnerability management data obtained in various embodiments, can include, but are not limited to, the existence of a known weakness pattern in the asset; a non-existent or incorrect buffer length; the inability of the asset to patch correctly; a lack of security requirements, or insufficient security requirements associated with the asset; the existence of a known vulnerable version of software or code; code written in a language, or version of a language, known to be vulnerable to attack; lack of encryption, or the proper level of encryption; no checks of buffer lengths; no checks of the integrity of arguments; and/or any other vulnerabilities and vulnerability characteristics as open-endedly defined by any parties and, as discussed herein, and/or as known in the art at the time of filing, and/or as become known after the time of filing.

As noted above, vulnerabilities, and vulnerability characteristics of particular interest, are not necessarily static, and are often subject to change based on new data from the field; the type of application or other asset being developed, or version of the application or asset being developed; changes in the asset developer platform, and/or changes in the asset deployment platform and/or infrastructure.

Consequently, even in the unlikely case where "all" vulnerabilities associated with an asset, and/or that asset's development, are believed to be known, the list of vulnerabilities is dynamic and highly dependent on other, often currently unknown, parameters and/or characteristics.

To address this issue, the vulnerability management data of OBTAIN VULNERABILITY MANAGEMENT DATA INDICATING A VULNERABILITY MANAGEMENT POLICY AND/OR VULNERABILITY CHARACTERISTICS TO BE MONITORED OPERATION 203, i.e., the vulnerability management policies and/or specified vulnerability characteristics, obtained by process 200 for dynamic and comprehensive vulnerability management, is "open-ended" so that the vulnerability management policies and/or specified vulnerability characteristics can be defined, redefined, removed, added, and/or modified, as needed or desired.

In one embodiment, at least part of the vulnerability management data of OBTAIN VULNERABILITY MANAGEMENT DATA INDICATING A VULNERABILITY MANAGEMENT POLICY AND/OR VULNERABILITY CHARACTERISTICS TO BE MONITORED OPERATION 203 is obtained from, and/or modified by, one or more parties associated with the asset being vulnerability managed. In one embodiment, at least part of the vulnerability management data of OBTAIN VULNERABILITY MANAGEMENT DATA INDICATING A VULNERABILITY MANAGEMENT POLICY AND/OR VULNERABILITY CHARACTERISTICS TO BE MONITORED OPERATION 203 is obtained from, and/or modified by, a provider of the process for dynamic and comprehensive vulnerability management. In one embodiment, at least part of the vulnerability management data of OBTAIN VULNERABILITY MANAGEMENT DATA INDICATING A VULNERABILITY MANAGEMENT POLICY AND/OR VULNERABILITY CHARACTERISTICS TO BE MONITORED OPERATION 203 is obtained from, and/or modified by, third parties, and/or any parties authorized by the owner of the asset.

In one embodiment, at least part of the vulnerability management data of OBTAIN VULNERABILITY MANAGEMENT DATA INDICATING A VULNERABILITY MANAGEMENT POLICY AND/OR VULNERABILITY CHARACTERISTICS TO BE MONITORED OPERATION 203 is obtained, and/or modified, through one or more user interfaces provided through, and/or associated with, process 200 for dynamic and comprehensive vulnerability management.

In one embodiment, once vulnerability management data is obtained from one or more sources at OBTAIN VULNERABILITY MANAGEMENT DATA INDICATING A VULNERABILITY MANAGEMENT POLICY AND/OR VULNERABILITY CHARACTERISTICS TO BE MONITORED OPERATION 203, process flow proceeds to OBTAIN/GENERATE SCANNER DATA REPRESENTING ONE OR MORE SCANNERS AND SCANNER TESTS INCLUDED IN THE SCANNERS OPERATION 205.

In one embodiment, once vulnerability management data is obtained indicating the vulnerability management policies, vulnerabilities, and vulnerability characteristics to be used with process 200 for dynamic and comprehensive vulnerability management at OBTAIN VULNERABILITY MANAGEMENT DATA INDICATING A VULNERABILITY MANAGEMENT POLICY AND/OR VULNERABILITY CHARACTERISTICS TO BE MONITORED OPERATION 203, scanner data representing one or more vulnerability scanners capable of detecting and monitoring the vulnerabilities and vulnerability characteristics associated the vulnerability management data of OBTAIN VULNERABILITY MANAGEMENT DATA INDICATING A VULNERABILITY MANAGEMENT POLICY AND/OR VULNERABILITY CHARACTERISTICS TO BE MONITORED OPERATION 203 is generated or obtained at OBTAIN/GENERATE SCANNER DATA REPRESENTING ONE OR MORE SCANNERS AND SCANNER TESTS INCLUDED IN THE SCANNERS OPERATION 205.

In various embodiments, the scanners in the scanner data of OBTAIN/GENERATE SCANNER DATA REPRESENTING ONE OR MORE SCANNERS AND SCANNER TESTS INCLUDED IN THE SCANNERS OPERATION 205 are comprised of code designed to monitor or check various assets to determine if specific vulnerabilities discoverable with the scanners are present. In many cases, the scanners are actually sets of scanner tests with each scanner test being associated with, i.e. capable of detecting, a specific vulnerability or vulnerability characteristic included in the vulnerability management data of OBTAIN VULNERABILITY MANAGEMENT DATA INDICATING A VULNERABILITY MANAGEMENT POLICY AND/OR VULNERABILITY CHARACTERISTICS TO BE MONITORED OPERATION 203.

Given the variety of assets to be vulnerability managed, and the open-ended composition of the vulnerability management data of OBTAIN VULNERABILITY MANAGEMENT DATA INDICATING A VULNERABILITY MANAGEMENT POLICY AND/OR VULNERABILITY CHARACTERISTICS TO BE MONITORED OPERATION 203, it follows that numerous types and classes of scanners and scanner tests are used with various embodiments of process 200 for dynamic and comprehensive vulnerability management discussed herein. Typically, scanners can be classified in several ways including, but not limited to, the type of scanner; the vulnerabilities scanned for by the scanner, i.e., scanner tests included in the scanner; desirable scanning tests included in the scanner; the deployment profile/time for the scanner, i.e., how long does it take to schedule and/or deploy the scanner and receive scanner results data; whether the scanner is a continuously deployed scanner or another type of scanner; whether the scanner is synchronous or asynchronous; and/or any other scanner parameters, as discussed herein, and/or as known in the art at the time of filing, and/or as developed after the time of filing.

As noted above, vulnerabilities, and vulnerability characteristics included in the obtained vulnerability management data of OBTAIN VULNERABILITY MANAGEMENT DATA INDICATING A VULNERABILITY MANAGEMENT POLICY AND/OR VULNERABILITY CHARACTERISTICS TO BE MONITORED OPERATION 203 are open-endedly defined and subject to change. Consequently, the scanners and scanner tests of the scanner data of OBTAIN/GENERATE SCANNER DATA REPRESENTING ONE OR MORE SCANNERS AND SCANNER TESTS INCLUDED IN THE SCANNERS OPERATION 205 that are desirable and/or necessary to ensure compliance with the vulnerability management policies indicated in the vulnerability management data of OBTAIN VULNERABILITY MANAGEMENT DATA INDICATING A VULNERABILITY MANAGEMENT POLICY AND/OR VULNERABILITY CHARACTERISTICS TO BE MONITORED OPERATION 203 are likely to change over time as well. In addition, new scanners and scanner tests may be required and/or become available, existing scanners and scanner tests may be updated and/or improved, and/or new combinations of desirable scanner tests may become available.

To address this need, in one embodiment, the scanner data obtained at OBTAIN/GENERATE SCANNER DATA REPRESENTING ONE OR MORE SCANNERS AND SCANNER TESTS INCLUDED IN THE SCANNERS OPERATION 205, representing the collection scanners and scanner tests to be used with process 200 for dynamic and comprehensive vulnerability management, is open-endedly defined to allow the scanning capabilities provided by the scanner data to be tailored to meet particular defined needs and to allow for the addition of new scanners and scanner tests, and/or modified scanners and scanner tests, as defined, or redefined, by one or more parties associated with vulnerability management and/or one or more assets being vulnerability managed.

In various embodiments, the collection of scanners and scanner tests included in the scanner data of OBTAIN/GENERATE SCANNER DATA REPRESENTING ONE OR MORE SCANNERS AND SCANNER TESTS INCLUDED IN THE SCANNERS OPERATION 205 includes individual scanners obtained from multiple, and often very diverse, sources and/or parties including, but not limited to, third party vendors who generate scanners and scanner tests and then sell them, or otherwise provide the scanners and scanner tests; owners, or other parties, associated with the assets being vulnerability managed; various parties involved in the development of the assets being vulnerability managed; providers of all, or part of, a cloud-based infrastructure; third party service providers associated with the assets, and/or asset develop processes; and/or any other sources, parties, or entities capable of providing one or more scanners and/or scanner tests, as discussed herein, and/or as known in the art at the time of filing, and/or as become known after the time of filing.

In various embodiments, the multiple scanners and scanner tests included in a single example of scanner data of OBTAIN/GENERATE SCANNER DATA REPRESENTING ONE OR MORE SCANNERS AND SCANNER TESTS INCLUDED IN THE SCANNERS OPERATION 205 can each come from a different one of the scanner and scanner test sources discussed herein. Consequently, scanners and scanner tests obtained from, and generated by, very diverse sources, having very different scanning/testing capabilities, and being of very diverse structure, operation, and classification, can be included in a single set of scanners and scanner tests included in a single example of scanner data obtained at OBTAIN/GENERATE SCANNER DATA REPRESENTING ONE OR MORE SCANNERS AND SCANNER TESTS INCLUDED IN THE SCANNERS OPERATION 205, and used, by process 200 for dynamic and comprehensive vulnerability management.

In various embodiments, updates and additions to the scanner data, i.e., updates and additions to the scanners and scanner tests comprising the scanner data of OBTAIN/GENERATE SCANNER DATA REPRESENTING ONE OR MORE SCANNERS AND SCANNER TESTS INCLUDED IN THE SCANNERS OPERATION 205, are performed automatically as these updates and additions become available. In various embodiments, these updates and additions are provided automatically by any of the parties, and/or sources, of scanner and scanner tests, discussed herein, and/or as known in the art at the time of filing, and/or as become known after the time of filing. Consequently, the scanner data of OBTAIN/GENERATE SCANNER DATA REPRESENTING ONE OR MORE SCANNERS AND SCANNER TESTS INCLUDED IN THE SCANNERS OPERATION 205 associated with process 200 for dynamic and comprehensive vulnerability management discussed herein is open-endedly defined, dynamic and diverse in its composition and operation, and is updated as needed, in one embodiment, automatically. Therefore, using process 200 for dynamic and comprehensive vulnerability management, scanner data is provided that represents a more comprehensive, dynamic, diverse, and individually tailored, scanning and testing capability than is available using any current vulnerability management methods and systems.

In one embodiment, once scanner data representing one or more vulnerability scanners capable of detecting and monitoring the vulnerabilities and vulnerability characteristics associated the vulnerability management data of OBTAIN VULNERABILITY MANAGEMENT DATA INDICATING A VULNERABILITY MANAGEMENT POLICY AND/OR VULNERABILITY CHARACTERISTICS TO BE MONITORED OPERATION 203 are generated or obtained at OBTAIN/GENERATE SCANNER DATA REPRESENTING ONE OR MORE SCANNERS AND SCANNER TESTS INCLUDED IN THE SCANNERS OPERATION 205, process flow proceeds to CLASSIFY THE ONE OR MORE SCANNERS AND DE-DUPLICATE SCANNER TESTS INCLUDED IN THE SCANNERS OPERATION 207.

In one embodiment, at CLASSIFY THE ONE OR MORE SCANNERS AND DE-DUPLICATE SCANNER TESTS INCLUDED IN THE SCANNERS OPERATION 207 the scanners and scanner tests represented in the scanner data of OBTAIN/GENERATE SCANNER DATA REPRESENTING ONE OR MORE SCANNERS AND SCANNER TESTS INCLUDED IN THE SCANNERS OPERATION 205 are classified according to the scanner classification parameters discussed above and are de-duplicated.

As noted above, each of the scanners obtained at OBTAIN/GENERATE SCANNER DATA REPRESENTING ONE OR MORE SCANNERS AND SCANNER TESTS INCLUDED IN THE SCANNERS OPERATION 205 can include multiple scanner tests. As a result, when multiple scanners are obtained at OBTAIN/GENERATE SCANNER DATA REPRESENTING ONE OR MORE SCANNERS AND SCANNER TESTS INCLUDED IN THE SCANNERS OPERATION 205 it is often the case that duplicate scanner tests, i.e., scanner tests directed to the same vulnerability or vulnerability characteristic are obtained.

In accordance with one embodiment, at CLASSIFY THE ONE OR MORE SCANNERS AND DE-DUPLICATE SCANNER TESTS INCLUDED IN THE SCANNERS OPERATION 207 duplicate scanner tests are identified. The duplicate scanner tests are then analyzed at CLASSIFY THE ONE OR MORE SCANNERS AND DE-DUPLICATE SCANNER TESTS INCLUDED IN THE SCANNERS OPERATION 207 to identify the scanner test in the set of duplicate scanner tests that is most compatible with the desired result. In short, in one embodiment, at CLASSIFY THE ONE OR MORE SCANNERS AND DE-DUPLICATE SCANNER TESTS INCLUDED IN THE SCANNERS OPERATION 207 the scanner test in the set of duplicate scanner tests that is determined to be the best scanner test is selected.

As a specific illustrative example, in one embodiment, at CLASSIFY THE ONE OR MORE SCANNERS AND DE-DUPLICATE SCANNER TESTS INCLUDED IN THE SCANNERS OPERATION 207 the scanner test in the set of duplicate scanner tests that historically yields the least number of false positive results is selected. In other embodiments, other factors are used to determine the scanner test in the set of duplicate scanner tests that is the best scanner test.

In one embodiment, once the scanners and scanner tests represented in the scanner data of OBTAIN/GENERATE SCANNER DATA REPRESENTING ONE OR MORE SCANNERS AND SCANNER TESTS INCLUDED IN THE SCANNERS OPERATION 205 are classified according to the parameters discussed above and de-duplicated at CLASSIFY THE ONE OR MORE SCANNERS AND DE-DUPLICATE SCANNER TESTS INCLUDED IN THE SCANNERS OPERATION 207, process flow proceeds to PROVIDE A SCANNER DATABASE INCLUDING SCANNER DATA REPRESENTING THE ONE OR MORE SCANNERS AND SCANNER TESTS, THE CLASSIFICATION OF THE SELECTED SCANNERS, AND THE TESTS DESIRED FROM EACH SCANNER OPERATION 209.

In one embodiment, at PROVIDE A SCANNER DATABASE INCLUDING SCANNER DATA REPRESENTING THE ONE OR MORE SCANNERS AND SCANNER TESTS, THE CLASSIFICATION OF THE SELECTED SCANNERS, AND THE TESTS DESIRED FROM EACH SCANNER OPERATION 209 the scanner data representing the selected scanners, and selected de-duplicated scanner tests, of OBTAIN/GENERATE SCANNER DATA REPRESENTING ONE OR MORE SCANNERS AND SCANNER TESTS INCLUDED IN THE SCANNERS OPERATION 205 and the classification data associated with each of the selected scanners and scanner tests of CLASSIFY THE ONE OR MORE SCANNERS AND DE-DUPLICATE SCANNER TESTS INCLUDED IN THE SCANNERS OPERATION 207 is stored in a scanner database.

In one embodiment, once the scanner data representing the selected scanners, and selected de-duplicated scanner tests and the classification data associated with each of the selected scanners and scanner tests is stored in a scanner database at PROVIDE A SCANNER DATABASE INCLUDING SCANNER DATA REPRESENTING THE ONE OR MORE SCANNERS AND SCANNER TESTS, THE CLASSIFICATION OF THE SELECTED SCANNERS, AND THE TESTS DESIRED FROM EACH SCANNER OPERATION 209, process flow proceeds to OBTAIN/GENERATE REMEDY DATA REPRESENTING ONE OR MORE REMEDIES/REMEDY PROCEDURES ASSOCIATED WITH VULNERABILITIES MONITORED USING THE ONE OR MORE SCANNERS AND SCANNER TESTS OPERATION 211.

In one embodiment, at OBTAIN/GENERATE REMEDY DATA REPRESENTING ONE OR MORE REMEDIES/REMEDY PROCEDURES ASSOCIATED WITH VULNERABILITIES MONITORED USING THE ONE OR MORE SCANNERS AND SCANNER TESTS OPERATION 211 remedy data associated with the vulnerabilities and vulnerability characteristics of the vulnerability management data of OBTAIN VULNERABILITY MANAGEMENT DATA INDICATING A VULNERABILITY MANAGEMENT POLICY AND/OR VULNERABILITY CHARACTERISTICS TO BE MONITORED OPERATION 203, scanned for by the scanners and scanner tests represented in the scanner data of OBTAIN/GENERATE SCANNER DATA REPRESENTING ONE OR MORE SCANNERS AND SCANNER TESTS INCLUDED IN THE SCANNERS OPERATION 205 is obtained.

In various embodiments, the remedy data of OBTAIN/GENERATE REMEDY DATA REPRESENTING ONE OR MORE REMEDIES/REMEDY PROCEDURES ASSOCIATED WITH VULNERABILITIES MONITORED USING THE ONE OR MORE SCANNERS AND SCANNER TESTS OPERATION 211 includes remedies or remedy procedures to be implemented on an asset being vulnerability managed once the vulnerability or vulnerability characteristic associated with the remedy or remedy procedure is identified by the one or more scanners and scanner tests.

To this end, each of the remedies or remedy procedures indicated in the remedy data of OBTAIN/GENERATE REMEDY DATA REPRESENTING ONE OR MORE REMEDIES/REMEDY PROCEDURES ASSOCIATED WITH VULNERABILITIES MONITORED USING THE ONE OR MORE SCANNERS AND SCANNER TESTS OPERATION 211 is correlated with an associated vulnerability or vulnerability characteristic of OBTAIN VULNERABILITY MANAGEMENT DATA INDICATING A VULNERABILITY MANAGEMENT POLICY AND/OR VULNERABILITY CHARACTERISTICS TO BE MONITORED OPERATION 203 to which the remedy or remedy procedure applies, and/or the scanner or scanner test of OBTAIN/GENERATE SCANNER DATA REPRESENTING ONE OR MORE SCANNERS AND SCANNER TESTS INCLUDED IN THE SCANNERS OPERATION 205 used to identify the associated vulnerability or vulnerability characteristic.

In various embodiments, the remedy data of OBTAIN/GENERATE REMEDY DATA REPRESENTING ONE OR MORE REMEDIES/REMEDY PROCEDURES ASSOCIATED WITH VULNERABILITIES MONITORED USING THE ONE OR MORE SCANNERS AND SCANNER TESTS OPERATION 211 includes remedies, i.e., mechanisms for actually correcting the identified vulnerability, and remedy procedures, i.e., procedures for ensuring that the vulnerability is corrected, i.e., is closed.

As discussed below, in one embodiment, when actual remedies are available and/or included in the remedy data of OBTAIN/GENERATE REMEDY DATA REPRESENTING ONE OR MORE REMEDIES/REMEDY PROCEDURES ASSOCIATED WITH VULNERABILITIES MONITORED USING THE ONE OR MORE SCANNERS AND SCANNER TESTS OPERATION 211, these remedies are automatically applied to the asset being vulnerability managed once the associated vulnerability, or vulnerability characteristic, is identified by a scanner or scanner test. Consequently, in these embodiments, the remedy is applied as part of a self-healing process through which assets being vulnerability managed become self-healing assets and/or asset systems.

Examples of remedies included in the remedy data of OBTAIN/GENERATE REMEDY DATA REPRESENTING ONE OR MORE REMEDIES/REMEDY PROCEDURES ASSOCIATED WITH VULNERABILITIES MONITORED USING THE ONE OR MORE SCANNERS AND SCANNER TESTS OPERATION 211 that are used as part of the self-healing asset system disclosed herein include but are not limited to, automatic application of a software patch; automatic installation of a software version update; automatic deletion of an asset component; automatic replacement of an asset component; an automatic change to a configuration; automatic re-sizing of buffers and buffer pools; automatic re-setting or changing a response time; and/or any other remedy capable of being obtained, stored, and automatically applied to an asset, as discussed herein, and/or as known in the art at the time of filing, and/or as developed after the time of filing.

In other examples, the remedy associated with an identified vulnerability or vulnerability characteristic does not lend itself to being automatically corrected without some form of input and/or interaction with the owner, or other contact entity, of the asset being vulnerability managed. To address these cases, the remedy data of OBTAIN/GENERATE REMEDY DATA REPRESENTING ONE OR MORE REMEDIES/REMEDY PROCEDURES ASSOCIATED WITH VULNERABILITIES MONITORED USING THE ONE OR MORE SCANNERS AND SCANNER TESTS OPERATION 211 also includes remedy procedure data indicating a procedure to be implemented that includes input and/or interaction from the owner of the asset being vulnerability managed.

As a specific illustrative example, in one embodiment, if a vulnerability is discovered that needs to be addressed by the owner of the asset having the vulnerability, the remedy procedure of the remedy of OBTAIN/GENERATE REMEDY DATA REPRESENTING ONE OR MORE REMEDIES/REMEDY PROCEDURES ASSOCIATED WITH VULNERABILITIES MONITORED USING THE ONE OR MORE SCANNERS AND SCANNER TESTS OPERATION 211 includes instructions and mechanisms for contacting a designated contact entity, e.g., the asset owner, or any other authorized and/or designated party associated with the asset, and informing the contact entity of the discovered vulnerability and the need to correct, or close, the discovered vulnerability.

In various embodiments, the remedy procedures in the remedy data of OBTAIN/GENERATE REMEDY DATA REPRESENTING ONE OR MORE REMEDIES/REMEDY PROCEDURES ASSOCIATED WITH VULNERABILITIES MONITORED USING THE ONE OR MORE SCANNERS AND SCANNER TESTS OPERATION 211 include data indicating a vulnerability correction time period/timeframe in which the vulnerability must be addressed. In various embodiments, the vulnerability correction time period/timeframe is determined based on the perceived security risk associated with the identified vulnerability.

As discussed below, in one embodiment, if the vulnerability is not closed within the associated vulnerability correction period/timeframe, further protective action is automatically taken to isolate the asset, and/or protect the infrastructure, and to mitigate the vulnerability.

In one embodiment, as part of the remedy procedure associated with the identified vulnerability in the remedy data of OBTAIN/GENERATE REMEDY DATA REPRESENTING ONE OR MORE REMEDIES/REMEDY PROCEDURES ASSOCIATED WITH VULNERABILITIES MONITORED USING THE ONE OR MORE SCANNERS AND SCANNER TESTS OPERATION 211, the contact entity is informed of the vulnerability correction time period/timeframe, and the associated protective action that will be taken if the vulnerability is not addressed in the vulnerability correction time period/timeframe.

In various embodiments, the remedy procedures associated with a given vulnerability of the remedy data of OBTAIN/GENERATE REMEDY DATA REPRESENTING ONE OR MORE REMEDIES/REMEDY PROCEDURES ASSOCIATED WITH VULNERABILITIES MONITORED USING THE ONE OR MORE SCANNERS AND SCANNER TESTS OPERATION 211 can include any other procedures and/or actions as desired/required by the asset owner, a provider of process 200 for dynamic and comprehensive vulnerability management, a provider of a distributed computing system, such as a cloud, and/or any other party associated with the asset, as discussed herein, and/or as known in the art at the time of filing, and/or as becomes known after the time of filing.

Once again, as noted above, vulnerabilities, and vulnerability characteristics of the vulnerability management data of OBTAIN VULNERABILITY MANAGEMENT DATA INDICATING A VULNERABILITY MANAGEMENT POLICY AND/OR VULNERABILITY CHARACTERISTICS TO BE MONITORED OPERATION 203 are open-endedly defined and subject to change. Consequently, in one embodiment, the scanner data obtained representing the one or more scanners and scanner tests of OBTAIN/GENERATE SCANNER DATA REPRESENTING ONE OR MORE SCANNERS AND SCANNER TESTS INCLUDED IN THE SCANNERS OPERATION 205 is open-ended so that new scanners and scanner tests, and/or improved/modified scanners and scanner tests can be added to the scanner data by one or more parties.

It follows that, in various embodiments, the remedies or remedy procedures included in the remedy data of OBTAIN/GENERATE REMEDY DATA REPRESENTING ONE OR MORE REMEDIES/REMEDY PROCEDURES ASSOCIATED WITH VULNERABILITIES MONITORED USING THE ONE OR MORE SCANNERS AND SCANNER TESTS OPERATION 211 are also open-ended to allow for updates and additions to the remedies or remedy procedures as needed.

As a result, using process 200 for dynamic and comprehensive vulnerability management, the vulnerability policies and vulnerability characteristics to be monitored, the scanners and scanner tests used, and the remedies and remedy procedures applied, are all open-endedly defined and dynamic to provide a level of flexibility, comprehensiveness, and diversity of application, unknown and unavailable through currently available vulnerability management systems.

In one embodiment, once remedy data associated with the vulnerabilities and vulnerability characteristics of the vulnerability management data scanned for by the scanners and scanner tests represented in the scanner data is obtained at OBTAIN/GENERATE REMEDY DATA REPRESENTING ONE OR MORE REMEDIES/REMEDY PROCEDURES ASSOCIATED WITH VULNERABILITIES MONITORED USING THE ONE OR MORE SCANNERS AND SCANNER TESTS OPERATION 211, process flow proceeds to CORRELATE REMEDIES/REMEDY PROCEDURES REPRESENTED BY THE REMEDY DATA TO THE SCANNERS AND SCANNER TESTS AND STORE THE CORRELATED DATA IN A REMEDY DATABASE OPERATION 213.

In one embodiment, at CORRELATE REMEDIES/REMEDY PROCEDURES REPRESENTED BY THE REMEDY DATA TO THE SCANNERS AND SCANNER TESTS AND STORE THE CORRELATED DATA IN A REMEDY DATABASE OPERATION 213 data representing the correlated remedies or remedy procedures indicated in the remedy data of OBTAIN/GENERATE REMEDY DATA REPRESENTING ONE OR MORE REMEDIES/REMEDY PROCEDURES ASSOCIATED WITH VULNERABILITIES MONITORED USING THE ONE OR MORE SCANNERS AND SCANNER TESTS OPERATION 211;

the associated vulnerability or vulnerability characteristics addressed by the remedies or remedy procedures of OBTAIN VULNERABILITY MANAGEMENT DATA INDICATING A VULNERABILITY MANAGEMENT POLICY AND/OR VULNERABILITY CHARACTERISTICS TO BE MONITORED OPERATION 203; and/or the scanner or scanner tests used to identify the associated vulnerability or vulnerability characteristics included in the scanner data of OBTAIN/GENERATE SCANNER DATA REPRESENTING ONE OR MORE SCANNERS AND SCANNER TESTS INCLUDED IN THE SCANNERS OPERATION 205, is stored in a remedy database.

In one embodiment, once data representing the correlated remedies or remedy procedures indicated in the remedy data; the associated vulnerability or vulnerability characteristics addressed by the remedies or remedy procedures; and/or the scanner or scanner tests used to identify the associated vulnerability or vulnerability characteristics included in the scanner data, is stored in a remedy database at CORRELATE REMEDIES/REMEDY PROCEDURES REPRESENTED BY THE REMEDY DATA TO THE SCANNERS AND SCANNER TESTS AND STORE THE CORRELATED DATA IN A REMEDY DATABASE OPERATION 213, process flow proceeds to OBTAIN ASSET DATA ASSOCIATED WITH AN ASSET TO BE VULNERABILITY MANAGED/CHECKED INCLUDING DATA INDICATING THE ASSET TYPE AND THE ASSET'S OPERATIONAL CHARACTERISTICS OPERATION 215.

In one embodiment, once the vulnerability management data, scanner data, and remedy data are obtained, these data and mechanisms are then applied to one or more assets to be vulnerability managed using process 200 for dynamic and comprehensive vulnerability management.

As used herein, the term "asset" includes but is not limited to, any logical or physical entity or object, and/or grouping of objects, that can potentially contain a weakness, or weak points in their design, are subject to attack or failure, and/or potentially include one or more vulnerabilities which are subject to such attack or failure. As specific illustrative examples, assets can include, but are not limited to, a file; an application; an application development pipeline or process; any asset development pipeline; a virtual machine; an instance of a virtual machine or virtual server in a cloud; an operating system; storage capability allocated to an instance in a cloud infrastructure; processing capability allocated to an instance in a cloud infrastructure; hardware allocated to an instance in a cloud infrastructure; software allocated to an instance in a cloud infrastructure; a service provided through a cloud infrastructure; a cloud infrastructure access system; any process and/or design process for designing and/or producing a physical item, and/or the physical item itself; and/or any combination of the items, and entities listed above, and/or any other items and entities as discussed herein, and/or as known in the art at the time of filing, and/or as made available after the time of filing.

In addition, the term "asset" can refer to an entity or logical and/or physical object that itself is composed of, and/or associated with, one or more assets. As a specific illustrative example, an application development process, and/or an application, would be considered an asset in accordance with the definition provided above, and as the term "asset" is commonly used in the art. However, the application development processes, and/or applications, themselves may include, and/or be associated with, various other assets such as, but not limited to, one or more instances of a virtual machine or virtual server in a cloud; one or more operating systems; one or more storage capabilities allocated to an instance in a cloud infrastructure; processing capability allocated to an instance in a cloud infrastructure; hardware allocated to an instance in a cloud infrastructure; software allocated to an instance in a cloud infrastructure; one or more services provided through a cloud infrastructure; one or more cloud infrastructure access systems; etc.

In one embodiment, in order to apply the vulnerability management data, scanner data, and remedy data of process 200 for dynamic and comprehensive vulnerability management, asset data associated with an asset to be vulnerability managed is obtained at OBTAIN ASSET DATA ASSOCIATED WITH AN ASSET TO BE VULNERABILITY MANAGED/CHECKED INCLUDING DATA INDICATING THE ASSET TYPE AND THE ASSET'S OPERATIONAL CHARACTERISTICS OPERATION 215 indicating the asset type and various operational characteristics associated with the asset that may represent vulnerabilities.

In one embodiment, the process for dynamic and comprehensive vulnerability management is a component of a larger asset verification system, such as an application, or application development, verification system. In these embodiments, the asset data is obtained from an asset management system associated with the asset verification system.

In one embodiment, once asset data associated with an asset to be vulnerability managed is obtained, including data indicating the asset type and various operational characteristics associated with the asset that may represent vulnerabilities, at OBTAIN ASSET DATA ASSOCIATED WITH AN ASSET TO BE VULNERABILITY MANAGED/CHECKED INCLUDING DATA INDICATING THE ASSET TYPE AND THE ASSET'S OPERATIONAL CHARACTERISTICS OPERATION 215, process flow proceeds to ANALYZE THE ASSET DATA TO IDENTIFY ASSET VULNERABILITY CHARACTERISTICS ASSOCIATED WITH THE ASSET OPERATION 217.

In one embodiment, at ANALYZE THE ASSET DATA TO IDENTIFY ASSET VULNERABILITY CHARACTERISTICS ASSOCIATED WITH THE ASSET OPERATION 217 the asset data obtained at OBTAIN ASSET DATA ASSOCIATED WITH AN ASSET TO BE VULNERABILITY MANAGED/CHECKED INCLUDING DATA INDICATING THE ASSET TYPE AND THE ASSET'S OPERATIONAL CHARACTERISTICS OPERATION 215 is analyzed to identify vulnerability characteristics associated with the asset and, in particular, any vulnerability characteristics associated with the asset which are also indicated in the vulnerability management policies and/or the vulnerability characteristics in the vulnerability management data of OBTAIN VULNERABILITY MANAGEMENT DATA INDICATING A VULNERABILITY MANAGEMENT POLICY AND/OR VULNERABILITY CHARACTERISTICS TO BE MONITORED OPERATION 203.

In one embodiment, once the asset data is analyzed to identify vulnerability characteristics associated with the asset at ANALYZE THE ASSET DATA TO IDENTIFY ASSET VULNERABILITY CHARACTERISTICS ASSOCIATED WITH THE ASSET OPERATION 217, process flow proceeds to ANALYZE THE VULNERABILITY MANAGEMENT DATA AND THE IDENTIFIED ASSET VULNERABILITY CHARACTERISTICS TO SELECT ONE OR MORE RELEVANT SCANNERS AND SCANNER TESTS FROM THE SCANNER DATABASE TO BE APPLIED TO THE ASSET OPERATION 219.

In one embodiment, at ANALYZE THE VULNERABILITY MANAGEMENT DATA AND THE IDENTIFIED ASSET VULNERABILITY CHARACTERISTICS TO SELECT ONE OR MORE RELEVANT SCANNERS AND SCANNER TESTS FROM THE SCANNER DATABASE TO BE APPLIED TO THE ASSET OPERATION 219 the vulnerability management data of OBTAIN VULNERABILITY MANAGEMENT DATA INDICATING A VULNERABILITY MANAGEMENT POLICY AND/OR VULNERABILITY CHARACTERISTICS TO BE MONITORED OPERATION 203 and the data indicating the asset vulnerability characteristics of ANALYZE THE ASSET DATA TO IDENTIFY ASSET VULNERABILITY CHARACTERISTICS ASSOCIATED WITH THE ASSET OPERATION 217 are analyzed to identify one or more relevant scanners and scanner tests from the scanner database of PROVIDE A SCANNER DATABASE INCLUDING SCANNER DATA REPRESENTING THE ONE OR MORE SCANNERS AND SCANNER TESTS, THE CLASSIFICATION OF THE SELECTED SCANNERS, AND THE TESTS DESIRED FROM EACH SCANNER OPERATION 209 to be applied to the asset.

As noted above, in one embodiment, the scanner test data in the scanner database of PROVIDE A SCANNER DATABASE INCLUDING SCANNER DATA REPRESENTING THE ONE OR MORE SCANNERS AND SCANNER TESTS, THE CLASSIFICATION OF THE SELECTED SCANNERS, AND THE TESTS DESIRED FROM EACH SCANNER OPERATION 209 includes data representing scanner tests selected as the best scanner test for their associated vulnerability at CLASSIFY THE ONE OR MORE SCANNERS AND DE-DUPLICATE SCANNER TESTS INCLUDED IN THE SCANNERS OPERATION 207. Consequently, in one embodiment, based on the analysis of the vulnerability management data and the asset vulnerability characteristics data associated with a specific asset performed at ANALYZE THE VULNERABILITY MANAGEMENT DATA AND THE IDENTIFIED ASSET VULNERABILITY CHARACTERISTICS TO SELECT ONE OR MORE RELEVANT SCANNERS AND SCANNER TESTS FROM THE SCANNER DATABASE TO BE APPLIED TO THE ASSET OPERATION 219, data representing various scanners and scanner tests is transformed into scanner test profile set data specifically tailored to the asset under consideration and including the identified best scanner tests for identifying the vulnerabilities and vulnerability characteristics indicated in the vulnerability management data.

Therefore, the result at ANALYZE THE VULNERABILITY MANAGEMENT DATA AND THE IDENTIFIED ASSET VULNERABILITY CHARACTERISTICS TO SELECT ONE OR MORE RELEVANT SCANNERS AND SCANNER TESTS FROM THE SCANNER DATABASE TO BE APPLIED TO THE ASSET OPERATION 219 is a scanner test profile set customized to both the needs of the user, as indicated in the vulnerability management data of OBTAIN VULNERABILITY MANAGEMENT DATA INDICATING A VULNERABILITY MANAGEMENT POLICY AND/OR VULNERABILITY CHARACTERISTICS TO BE MONITORED OPERATION 203, and the specific asset being vulnerability managed, as indicated in the asset data of OBTAIN ASSET DATA ASSOCIATED WITH AN ASSET TO BE VULNERABILITY MANAGED/CHECKED INCLUDING DATA INDICATING THE ASSET TYPE AND THE ASSET'S OPERATIONAL CHARACTERISTICS OPERATION 215 and the asset vulnerability characteristics data of ANALYZE THE ASSET DATA TO IDENTIFY ASSET VULNERABILITY CHARACTERISTICS ASSOCIATED WITH THE ASSET OPERATION 217.

In one embodiment, once the vulnerability management data and the data indicating the asset vulnerability characteristics is analyzed to identify one or more relevant scanners and scanner tests from the scanner database to be applied to the asset at ANALYZE THE VULNERABILITY MANAGEMENT DATA AND THE IDENTIFIED ASSET VULNERABILITY CHARACTERISTICS TO SELECT ONE OR MORE RELEVANT SCANNERS AND SCANNER TESTS FROM THE SCANNER DATABASE TO BE APPLIED TO THE ASSET OPERATION 219, process flow proceeds to GENERATE A SCANNER DEPLOYMENT PROCEDURE FOR THE ASSET INDICATING AT WHAT TIME/STAGE THE ONE OR MORE RELEVANT SCANNERS AND SCANNER TESTS ARE TO BE DEPLOYED OPERATION 221.

In one embodiment, at GENERATE A SCANNER DEPLOYMENT PROCEDURE FOR THE ASSET INDICATING AT WHAT TIME/STAGE THE ONE OR MORE RELEVANT SCANNERS AND SCANNER TESTS ARE TO BE DEPLOYED OPERATION 221 a scanner deployment procedure for the scanners and scanner tests included in the scanner test profile set of ANALYZE THE VULNERABILITY MANAGEMENT DATA AND THE IDENTIFIED ASSET VULNERABILITY CHARACTERISTICS TO SELECT ONE OR MORE RELEVANT SCANNERS AND SCANNER TESTS FROM THE SCANNER DATABASE TO BE APPLIED TO THE ASSET OPERATION 219 for the asset of OBTAIN ASSET DATA ASSOCIATED WITH AN ASSET TO BE VULNERABILITY MANAGED/CHECKED INCLUDING DATA INDICATING THE ASSET TYPE AND THE ASSET'S OPERATIONAL CHARACTERISTICS OPERATION 215 is generated indicating an order, time, and/or stage in the asset, when the various scanners and scanner tests included in the scanner test profile set are to be deployed on the asset.

In various embodiments, the scanner deployment procedure is generated at GENERATE A SCANNER DEPLOYMENT PROCEDURE FOR THE ASSET INDICATING AT WHAT TIME/STAGE THE ONE OR MORE RELEVANT SCANNERS AND SCANNER TESTS ARE TO BE DEPLOYED OPERATION 221 to deploy the scanners and scanner tests in an indicated order, and at a time and/or stage where the vulnerabilities associated with each of the scanners and scanner tests can be corrected/closed using the minimal number of resources and at a point in the asset where there is minimal possibility of the vulnerabilities becoming embedded and/or chained in the process and/or affecting other components and/or parts of the infrastructure.

Herein, the time and/or stage where the vulnerabilities associated with an asset can be corrected using the minimal number of resources, and where there is minimal possibility of the vulnerabilities becoming chained vulnerabilities, is referred to as the "ideal" time and/or stage.

In one embodiment, once a scanner deployment procedure for the scanners and scanner tests included in the scanner test profile set for the asset is generated at GENERATE A SCANNER DEPLOYMENT PROCEDURE FOR THE ASSET INDICATING AT WHAT TIME/STAGE THE ONE OR MORE RELEVANT SCANNERS AND SCANNER TESTS ARE TO BE DEPLOYED OPERATION 221, process flow proceeds to DEPLOY THE SELECTED RELEVANT SCANNERS AND SCANNER TESTS ON THE ASSET IN ACCORDANCE WITH THE SCANNER DEPLOYMENT PROCEDURE OPERATION 223.

In one embodiment, at DEPLOY THE SELECTED RELEVANT SCANNERS AND SCANNER TESTS ON THE ASSET IN ACCORDANCE WITH THE SCANNER DEPLOYMENT PROCEDURE OPERATION 223 the scanners and scanner tests included in the scanner test profile set of ANALYZE THE VULNERABILITY MANAGEMENT DATA AND THE IDENTIFIED ASSET VULNERABILITY CHARACTERISTICS TO SELECT ONE OR MORE RELEVANT SCANNERS AND SCANNER TESTS FROM THE SCANNER DATABASE TO BE APPLIED TO THE ASSET OPERATION 219 are deployed on the asset of OBTAIN ASSET DATA ASSOCIATED WITH AN ASSET TO BE VULNERABILITY MANAGED/CHECKED INCLUDING DATA INDICATING THE ASSET TYPE AND THE ASSET'S OPERATIONAL CHARACTERISTICS OPERATION 215 in accordance with the scanner deployment procedure of GENERATE A SCANNER DEPLOYMENT PROCEDURE FOR THE ASSET INDICATING AT WHAT TIME/STAGE THE ONE OR MORE RELEVANT SCANNERS AND SCANNER TESTS ARE TO BE DEPLOYED OPERATION 221.

In one embodiment, at DEPLOY THE SELECTED RELEVANT SCANNERS AND SCANNER TESTS ON THE ASSET IN ACCORDANCE WITH THE SCANNER DEPLOYMENT PROCEDURE OPERATION 223 the scanners and scanner tests included in the scanner test profile set are deployed on the asset in accordance with the scanner deployment procedure using a scanner deployment manager.

In one embodiment, once the scanners and scanner tests included in the scanner test profile set are deployed on the asset in accordance with the scanner deployment procedure at DEPLOY THE SELECTED RELEVANT SCANNERS AND SCANNER TESTS ON THE ASSET IN ACCORDANCE WITH THE SCANNER DEPLOYMENT PROCEDURE OPERATION 223, process flow proceeds to AT LEAST ONE VULNERABILITY FOUND? OPERATION 225.

In one embodiment, at AT LEAST ONE VULNERABILITY FOUND? OPERATION 225 results data is received from the scanners and scanner tests of DEPLOY THE SELECTED RELEVANT SCANNERS AND SCANNER TESTS ON THE ASSET IN ACCORDANCE WITH THE SCANNER DEPLOYMENT PROCEDURE OPERATION 223 indicating whether one or more vulnerabilities have been found.

In one embodiment, if at AT LEAST ONE VULNERABILITY FOUND? OPERATION 225 results data is received from the scanners and scanner tests of DEPLOY THE SELECTED RELEVANT SCANNERS AND SCANNER TESTS ON THE ASSET IN ACCORDANCE WITH THE SCANNER DEPLOYMENT PROCEDURE OPERATION 223 indicating no vulnerabilities have been found, i.e., a "NO" result is obtained, process flow proceeds to DEPLOY THE SELECTED RELEVANT SCANNERS AND SCANNER TESTS ON THE ASSET IN ACCORDANCE WITH THE SCANNER DEPLOYMENT PROCEDURE OPERATION 223 where the scanners and scanner tests included in the scanner test profile set of ANALYZE THE VULNERABILITY MANAGEMENT DATA AND THE IDENTIFIED ASSET VULNERABILITY CHARACTERISTICS TO SELECT ONE OR MORE RELEVANT SCANNERS AND SCANNER TESTS FROM THE SCANNER DATABASE TO BE APPLIED TO THE ASSET OPERATION 219 are deployed on the asset of OBTAIN ASSET DATA ASSOCIATED WITH AN ASSET TO BE VULNERABILITY MANAGED/CHECKED INCLUDING DATA INDICATING THE ASSET TYPE AND THE ASSET'S OPERATIONAL CHARACTERISTICS OPERATION 215 in accordance with the scanner deployment procedure of GENERATE A SCANNER DEPLOYMENT PROCEDURE FOR THE ASSET INDICATING AT WHAT TIME/STAGE THE ONE OR MORE RELEVANT SCANNERS AND SCANNER TESTS ARE TO BE DEPLOYED OPERATION 221 until one or more vulnerabilities are found.

On the other hand, in one embodiment, if at AT LEAST ONE VULNERABILITY FOUND? OPERATION 225 results data is received from the scanners and scanner tests of DEPLOY THE SELECTED RELEVANT SCANNERS AND SCANNER TESTS ON THE ASSET IN ACCORDANCE WITH THE SCANNER DEPLOYMENT PROCEDURE OPERATION 223 indicating one or more vulnerabilities have been found, i.e., a "YES" result is obtained, data indicating the vulnerability identified, and/or the scanner or scanner test discovering the vulnerability, is recorded along with, in one embodiment, the time at which the vulnerability was identified and process flow proceeds to GO TO 231 OF FIG. 2B OPERATION 227 and through FROM 227 OF FIG. 2A OPERATION 231, to ANALYZE RESULTS DATA FROM THE SELECTED RELEVANT SCANNERS AND SCANNER TESTS AND DE-DUPLICATE THE IDENTIFIED VULNERABILITIES IN THE RESULTS DATA OPERATION 233.

In various embodiments, duplicate indications of a vulnerability can arise in the scanner/scanner test result data. This is particularly true when, as discussed below, the remedy or remedy procedure associated with the vulnerability identified either cannot be scheduled and/or applied immediately, and/or the vulnerability is not closed immediately by the asset owner.

In these cases, in the timeframe between when the vulnerability is first identified and the remedy, or remedy procedure, is implemented, further and/or continuing applications of the scanners and scanner tests of the scanner test profile set associated with the asset, performed in accordance with the scanner deployment procedure, may result in further indications of a vulnerability in the scanner results data.

Consequently, without some form of de-duplication process, multiple vulnerability alerts associated with a single vulnerability in a single asset could be processed resulting in inefficiency and attempted redundant application of remedies and/or scheduling of remedies.

In one embodiment, to avoid this situation, various types of de-duplication processes are performed at ANALYZE RESULTS DATA FROM THE SELECTED RELEVANT SCANNERS AND SCANNER TESTS AND DE-DUPLICATE THE IDENTIFIED VULNERABILITIES IN THE RESULTS DATA OPERATION 233.

As an illustrative example, at ANALYZE RESULTS DATA FROM THE SELECTED RELEVANT SCANNERS AND SCANNER TESTS AND DE-DUPLICATE THE IDENTIFIED VULNERABILITIES IN THE RESULTS DATA OPERATION 233 all indications of a vulnerability associated with a specific asset within a defined timeframe are mapped into a single vulnerability report to be addressed with a single application of a remedy or remedy procedure.

In one embodiment once various types of de-duplication processes are performed at ANALYZE RESULTS DATA FROM THE SELECTED RELEVANT SCANNERS AND SCANNER TESTS AND DE-DUPLICATE THE IDENTIFIED VULNERABILITIES IN THE RESULTS DATA OPERATION 233, process flow proceeds to ANALYZE DE-DUPLICATED RESULTS DATA FROM THE SELECTED RELEVANT SCANNERS TO IDENTIFY THE ONE OR MORE REMEDIES/REMEDY PROCEDURES IN THE REMEDY DATABASE TO BE APPLIED OPERATION 235.

In one embodiment, at ANALYZE DE-DUPLICATED RESULTS DATA FROM THE SELECTED RELEVANT SCANNERS TO IDENTIFY THE ONE OR MORE REMEDIES/REMEDY PROCEDURES IN THE REMEDY DATABASE TO BE APPLIED OPERATION 235 the de-duplicated results data of ANALYZE RESULTS DATA FROM THE SELECTED RELEVANT SCANNERS AND SCANNER TESTS AND DE-DUPLICATE THE IDENTIFIED VULNERABILITIES IN THE RESULTS DATA OPERATION 233 is analyzed to determine the vulnerability/vulnerabilities indicated and the associated remedy(s) and/or remedy procedure(s) in the remedy database of CORRELATE REMEDIES/REMEDY PROCEDURES REPRESENTED BY THE REMEDY DATA TO THE SCANNERS AND SCANNER TESTS AND STORE THE CORRELATED DATA IN A REMEDY DATABASE OPERATION 213 associated with the indicated vulnerability/vulnerabilities.

In one embodiment, once the de-duplicated results data is analyzed to determine the vulnerability/vulnerabilities indicated and the associated remedy(s) and/or remedy procedure(s) in the remedy database associated with the indicated vulnerability/vulnerabilities at ANALYZE DE-DUPLICATED RESULTS DATA FROM THE SELECTED RELEVANT SCANNERS TO IDENTIFY THE ONE OR MORE REMEDIES/REMEDY PROCEDURES IN THE REMEDY DATABASE TO BE APPLIED OPERATION 235, process flow proceeds to IF NECESSARY, SCHEDULE THE APPLICATION OF THE IDENTIFIED ONE OR MORE REMEDIES/REMEDY PROCEDURES OPERATION 237.

In one embodiment, at IF NECESSARY, SCHEDULE THE APPLICATION OF THE IDENTIFIED ONE OR MORE REMEDIES/REMEDY PROCEDURES OPERATION 237 if the application of the associated remedy(s) and/or remedy procedure(s) in the remedy database associated with the indicated vulnerability/vulnerabilities of ANALYZE DE-DUPLICATED RESULTS DATA FROM THE SELECTED RELEVANT SCANNERS TO IDENTIFY THE ONE OR MORE REMEDIES/REMEDY PROCEDURES IN THE REMEDY DATABASE TO BE APPLIED OPERATION 235 require scheduling, the associated remedy(s) and/or remedy procedure(s) are scheduled. In one embodiment, the date and time of the scheduling request is recorded along with the estimated date and time of the application of the associated remedy(s) and/or remedy procedure(s), if known.

In one embodiment, once the application of the associated remedy(s) and/or remedy procedure(s) in the remedy database associated with the indicated vulnerability/vulnerabilities is scheduled, if necessary, at IF NECESSARY, SCHEDULE THE APPLICATION OF THE IDENTIFIED ONE OR MORE REMEDIES/REMEDY PROCEDURES OPERATION 237, process flow proceeds to APPLY THE IDENTIFIED ONE OR MORE REMEDIES/REMEDY PROCEDURES AT A TIME/POINT CONSISTENT WITH THE SCANNER DEPLOYMENT PROCEDURE OPERATION 239.

In one embodiment, at APPLY THE IDENTIFIED ONE OR MORE REMEDIES/REMEDY PROCEDURES AT A TIME/POINT CONSISTENT WITH THE SCANNER DEPLOYMENT PROCEDURE OPERATION 239 the associated remedy(s) and/or remedy procedure(s) identified and obtained at ANALYZE DE-DUPLICATED RESULTS DATA FROM THE SELECTED RELEVANT SCANNERS TO IDENTIFY THE ONE OR MORE REMEDIES/REMEDY PROCEDURES IN THE REMEDY DATABASE TO BE APPLIED OPERATION 235 are applied to the asset of OBTAIN ASSET DATA ASSOCIATED WITH AN ASSET TO BE VULNERABILITY MANAGED/CHECKED INCLUDING DATA INDICATING THE ASSET TYPE AND THE ASSET'S OPERATIONAL CHARACTERISTICS OPERATION 215, either immediately, or in accordance with the scheduling of IF NECESSARY, SCHEDULE THE APPLICATION OF THE IDENTIFIED ONE OR MORE REMEDIES/REMEDY PROCEDURES OPERATION 237.

In one embodiment, at APPLY THE IDENTIFIED ONE OR MORE REMEDIES/REMEDY PROCEDURES AT A TIME/POINT CONSISTENT WITH THE SCANNER DEPLOYMENT PROCEDURE OPERATION 239 the associated remedy(s) and/or remedy procedure(s) are applied to the asset, at an ideal time or stage consistent with the scanner deployment procedure of GENERATE A SCANNER DEPLOYMENT PROCEDURE FOR THE ASSET INDICATING AT WHAT TIME/STAGE THE ONE OR MORE RELEVANT SCANNERS AND SCANNER TESTS ARE TO BE DEPLOYED OPERATION 221.

As noted above, in various embodiments, the remedy data of CORRELATE REMEDIES/REMEDY PROCEDURES REPRESENTED BY THE REMEDY DATA TO THE SCANNERS AND SCANNER TESTS AND STORE THE CORRELATED DATA IN A REMEDY DATABASE OPERATION 213 includes remedies, i.e., mechanisms for actually correcting the identified vulnerability, and remedy procedures, i.e., procedures for ensuring that the vulnerability is corrected, i.e., is closed.

In one embodiment, when actual remedies are available and/or included in the remedy data of CORRELATE REMEDIES/REMEDY PROCEDURES REPRESENTED BY THE REMEDY DATA TO THE SCANNERS AND SCANNER TESTS AND STORE THE CORRELATED DATA IN A REMEDY DATABASE OPERATION 213, these remedies are automatically applied at APPLY THE IDENTIFIED ONE OR MORE REMEDIES/REMEDY PROCEDURES AT A TIME/POINT CONSISTENT WITH THE SCANNER DEPLOYMENT PROCEDURE OPERATION 239 to the asset being vulnerability managed once the associated vulnerability, or vulnerability characteristic, is identified by a scanner or scanner test. Consequently, in these embodiments, the remedy is applied at APPLY THE IDENTIFIED ONE OR MORE REMEDIES/REMEDY PROCEDURES AT A TIME/POINT CONSISTENT WITH THE SCANNER DEPLOYMENT PROCEDURE OPERATION 239 as part of a self-healing process through which assets being vulnerability managed become self-healing assets and/or asset systems.

In other examples, the remedy in the remedy data of CORRELATE REMEDIES/REMEDY PROCEDURES REPRESENTED BY THE REMEDY DATA TO THE SCANNERS AND SCANNER TESTS AND STORE THE CORRELATED DATA IN A REMEDY DATABASE OPERATION 213 associated with an identified vulnerability or vulnerability characteristic does not lend itself to being automatically corrected without some form of input and/or interaction with the owner, or other contact entity, of the asset being vulnerability managed.

To address these cases, the remedy data of CORRELATE REMEDIES/REMEDY PROCEDURES REPRESENTED BY THE REMEDY DATA TO THE SCANNERS AND SCANNER TESTS AND STORE THE CORRELATED DATA IN A REMEDY DATABASE OPERATION 213 also includes remedy procedure data indicating a procedure to be implemented that includes input and/or interaction from the owner of the asset being vulnerability managed.

As a specific illustrative example, in one embodiment, if a vulnerability is discovered that needs to be addressed by the owner of the asset having the vulnerability, the remedy procedure applied at APPLY THE IDENTIFIED ONE OR MORE REMEDIES/REMEDY PROCEDURES AT A TIME/POINT CONSISTENT WITH THE SCANNER DEPLOYMENT PROCEDURE OPERATION 239 includes instructions and mechanisms for contacting a designated contact entity, e.g., the asset owner, or any other authorized and/or designated party associated with the asset, and informing the contact entity of the discovered vulnerability and the need to correct, or close, the discovered vulnerability.

In various embodiments, the remedy procedures applied at APPLY THE IDENTIFIED ONE OR MORE REMEDIES/REMEDY PROCEDURES AT A TIME/POINT CONSISTENT WITH THE SCANNER DEPLOYMENT PROCEDURE OPERATION 239 include data indicating a vulnerability correction time period/timeframe in which the vulnerability must be addressed. In various embodiments, the vulnerability correction time period/timeframe is determined based on the perceived security risk associated with the identified vulnerability.

As discussed below, in one embodiment, if the vulnerability is not closed within the associated vulnerability correction period/timeframe, further protective action is automatically taken to isolate the asset, and/or protect the infrastructure, and to mitigate the vulnerability.

In one embodiment, as part of the remedy procedure applied at APPLY THE IDENTIFIED ONE OR MORE REMEDIES/REMEDY PROCEDURES AT A TIME/POINT CONSISTENT WITH THE SCANNER DEPLOYMENT PROCEDURE OPERATION 239, the contact entity is informed of the vulnerability correction time period/timeframe, and the associated protective action that will be taken if the vulnerability is not addressed in the vulnerability correction time period/timeframe.

In various embodiments, the remedy procedures the remedy procedures applied at APPLY THE IDENTIFIED ONE OR MORE REMEDIES/REMEDY PROCEDURES AT A TIME/POINT CONSISTENT WITH THE SCANNER DEPLOYMENT PROCEDURE OPERATION 239 can include any other procedures and/or actions as desired/required by the asset owner, a provider of process 200 for dynamic and comprehensive vulnerability management, a provider of a distributed computing system, such as a cloud, and/or any other party associated with the asset, as discussed herein, and/or as known in the art at the time of filing, and/or as becomes known after the time of filing.

In one embodiment, once the associated remedy(s) and/or remedy procedure(s) are applied to the asset at an ideal time or stage consistent with the scanner deployment procedure at APPLY THE IDENTIFIED ONE OR MORE REMEDIES/REMEDY PROCEDURES AT A TIME/POINT CONSISTENT WITH THE SCANNER DEPLOYMENT PROCEDURE OPERATION 239, process flow proceeds to RE-DEPLOY THE SELECTED SCANNERS AND SCANNER TESTS ON THE ASSET IN ACCORDANCE WITH THE SCANNER DEPLOYMENT PROCEDURE TO DETERMINE IF THE ONE OR MORE VULNERABILITIES HAVE BEEN CORRECTED OPERATION.

In one embodiment, at RE-DEPLOY THE SELECTED SCANNERS AND SCANNER TESTS ON THE ASSET IN ACCORDANCE WITH THE SCANNER DEPLOYMENT PROCEDURE TO DETERMINE IF THE ONE OR MORE VULNERABILITIES HAVE BEEN CORRECTED OPERATION 241 at least the scanners and scanner tests that identified the vulnerability/vulnerabilities at AT LEAST ONE VULNERABILITY FOUND? OPERATION 225 are re-deployed to the asset to determine if the vulnerability/vulnerabilities have been corrected.

In one embodiment, once at least the scanners and scanner tests that identified the vulnerability/vulnerabilities are re-deployed to the asset to determine if the vulnerability/vulnerabilities have been corrected at RE-DEPLOY THE SELECTED SCANNERS AND SCANNER TESTS ON THE ASSET IN ACCORDANCE WITH THE SCANNER DEPLOYMENT PROCEDURE TO DETERMINE IF THE ONE OR MORE VULNERABILITIES HAVE BEEN CORRECTED OPERATION 241, process flow proceeds to VULNERABILITIES CORRECTED? OPERATION 243.

In one embodiment, at VULNERABILITIES CORRECTED? OPERATION 243 results data is received from the re-deployment of the scanners and scanner tests of RE-DEPLOY THE SELECTED SCANNERS AND SCANNER TESTS ON THE ASSET IN ACCORDANCE WITH THE SCANNER DEPLOYMENT PROCEDURE TO DETERMINE IF THE ONE OR MORE VULNERABILITIES HAVE BEEN CORRECTED OPERATION 241 indicating whether the one or more vulnerabilities have been found again or have been corrected/closed.

In one embodiment, if at VULNERABILITIES CORRECTED? OPERATION 243 results data is received from the scanners and scanner tests of RE-DEPLOY THE SELECTED SCANNERS AND SCANNER TESTS ON THE ASSET IN ACCORDANCE WITH THE SCANNER DEPLOYMENT PROCEDURE TO DETERMINE IF THE ONE OR MORE VULNERABILITIES HAVE BEEN CORRECTED OPERATION 241 indicating the one or more vulnerabilities have been corrected, i.e., a "YES" result is obtained, process flow proceeds to PROCEED TO 229 OF FIG. 2A OPERATION 249, through FROM 249 OF FIG. 2B OPERATION 229, to DEPLOY THE SELECTED RELEVANT SCANNERS AND SCANNER TESTS ON THE ASSET IN ACCORDANCE WITH THE SCANNER DEPLOYMENT PROCEDURE OPERATION 223 where the scanners and scanner tests included in the scanner test profile set of ANALYZE THE VULNERABILITY MANAGEMENT DATA AND THE IDENTIFIED ASSET VULNERABILITY CHARACTERISTICS TO SELECT ONE OR MORE RELEVANT SCANNERS AND SCANNER TESTS FROM THE SCANNER DATABASE TO BE APPLIED TO THE ASSET OPERATION 219 are deployed on the asset of OBTAIN ASSET DATA ASSOCIATED WITH AN ASSET TO BE VULNERABILITY MANAGED/CHECKED INCLUDING DATA INDICATING THE ASSET TYPE AND THE ASSET'S OPERATIONAL CHARACTERISTICS OPERATION 215 in accordance with the scanner deployment procedure of GENERATE A SCANNER DEPLOYMENT PROCEDURE FOR THE ASSET INDICATING AT WHAT TIME/STAGE THE ONE OR MORE RELEVANT SCANNERS AND SCANNER TESTS ARE TO BE DEPLOYED OPERATION 221 until one or more vulnerabilities are found.

On the other hand, in one embodiment, if at VULNERABILITIES CORRECTED? OPERATION 243 results data is received from the scanners and scanner tests of RE-DEPLOY THE SELECTED SCANNERS AND SCANNER TESTS ON THE ASSET IN ACCORDANCE WITH THE SCANNER DEPLOYMENT PROCEDURE TO DETERMINE IF THE ONE OR MORE VULNERABILITIES HAVE BEEN CORRECTED OPERATION 241 indicating one or more or the one or more vulnerabilities persist, i.e., a "NO" result is obtained, process flow proceeds IF A TIME INTERVAL IS ASSOCIATED WITH ONE OR MORE OF THE APPLIED REMEDIES/REMEDY PROCEDURES, HAS THE TIME INTERVAL LAPSED? OPERATION 245.

As noted above, in the time period between the identification of a vulnerability and the application of the associated remedy or remedy procedure, re-deployment of the scanners and scanner tests in the scanner test profile set associated with the asset may occur. However, as noted above, in one embodiment, vulnerabilities indicated in the results data from these re-deployments are grouped together into a single vulnerability report for the asset.

As also noted above, in some embodiments, particularly in cases where a remedy procedure is applied that grants the asset owner a vulnerability correction timeframe in which to close a vulnerability, there may also be a delay between when the vulnerabilities are identified and when the vulnerability is corrected. As a result, there may be re-deployments of the scanners and scanner tests during this time period.

In either the case, when the scanners and scanner tests are re-deployed before the remedy or remedy procedure has been implemented and completed, if the scanner or scanner test results indicate the continued presence of the vulnerability, a determination is made as to whether any time intervals, such as a vulnerability correction timeframe or a remedy application scheduling timeframe, associated with the applied remedies or remedy procedures has elapsed at IF A TIME INTERVAL IS ASSOCIATED WITH ONE OR MORE OF THE APPLIED REMEDIES/REMEDY PROCEDURES, HAS THE TIME INTERVAL LAPSED? OPERATION 245.

In cases where the time interval associated with the one or more applied remedies or remedy procedures has not elapsed, i.e., a "NO" result is obtained at IF A TIME INTERVAL IS ASSOCIATED WITH ONE OR MORE OF THE APPLIED REMEDIES/REMEDY PROCEDURES, HAS THE TIME INTERVAL LAPSED? OPERATION 245, no further action is taken.

However, in one embodiment, if the scanners and scanner tests are re-deployed and data indicating the identified vulnerability/vulnerabilities is/are still present, and the time interval associated with the one or more applied remedies or remedy procedures has elapsed, i.e., a "YES" result is obtained at IF A TIME INTERVAL IS ASSOCIATED WITH ONE OR MORE OF THE APPLIED REMEDIES/REMEDY PROCEDURES, HAS THE TIME INTERVAL LAPSED? OPERATION 245, process flow proceeds to TAKE APPROPRIATE PROTECTIVE ACTION TO ISOLATE THE ASSET AND/OR MITIGATE THE VULNERABILITY PENDING RESOLUTION OF THE VULNERABILITY OPERATION 247.

In one embodiment at TAKE APPROPRIATE PROTECTIVE ACTION TO ISOLATE THE ASSET AND/OR MITIGATE THE VULNERABILITY PENDING RESOLUTION OF THE VULNERABILITY OPERATION 247 protective action is taken to mitigate the potential adverse effects of the vulnerability.

In various embodiments, the protective actions taken at TAKE APPROPRIATE PROTECTIVE ACTION TO ISOLATE THE ASSET AND/OR MITIGATE THE VULNERABILITY PENDING RESOLUTION OF THE VULNERABILITY OPERATION 247 can include but are not limited to, closing an account associated with the asset; automatically upgrading the asset; removing the asset or a component of the asset; replacing the asset or a component of the asset; shutting down an asset; shutting down multiple assets; deleting an instance of a virtual machine/server; deleting a database; and/or any action capable of isolating the asset, isolating portions of the asset, and/or protecting other assets and/or infrastructure as discussed herein, and/or as known in the art/available at the time of filing, and/or as developed/made available after the time of filing.

In one embodiment, once protective action is taken TAKE APPROPRIATE PROTECTIVE ACTION TO ISOLATE THE ASSET AND/OR MITIGATE THE VULNERABILITY PENDING RESOLUTION OF THE VULNERABILITY OPERATION 247, the scanners and scanner tests included in the scanner test profile set associated with the asset of ANALYZE THE VULNERABILITY MANAGEMENT DATA AND THE IDENTIFIED ASSET VULNERABILITY CHARACTERISTICS TO SELECT ONE OR MORE RELEVANT SCANNERS AND SCANNER TESTS FROM THE SCANNER DATABASE TO BE APPLIED TO THE ASSET OPERATION 219 continue to be deployed in accordance with the scanner deployment procedure of GENERATE A SCANNER DEPLOYMENT PROCEDURE FOR THE ASSET INDICATING AT WHAT TIME/STAGE THE ONE OR MORE RELEVANT SCANNERS AND SCANNER TESTS ARE TO BE DEPLOYED OPERATION 221 until another vulnerability is found.

In various embodiments, process 200 for dynamic and comprehensive vulnerability management discussed above is continuously applied and/or repeated. In other embodiments, process for dynamic and comprehensive vulnerability management discussed above is applied at critical points and/or on-demand.

For instance, as one specific illustrative example, process 200 for dynamic and comprehensive vulnerability management is applied as part of an application development process before the application is published and/or otherwise pushed to the cloud. Then, in one illustrative example, process 200 for dynamic and comprehensive vulnerability management is applied on a periodic basis to ensure that no actions have been taken to introduce, or reintroduce, vulnerabilities and vulnerability characteristics into the application once the application is live in the cloud.

In various embodiments, the process for dynamic and comprehensive vulnerability management is applied to application development.

Figure 3A:
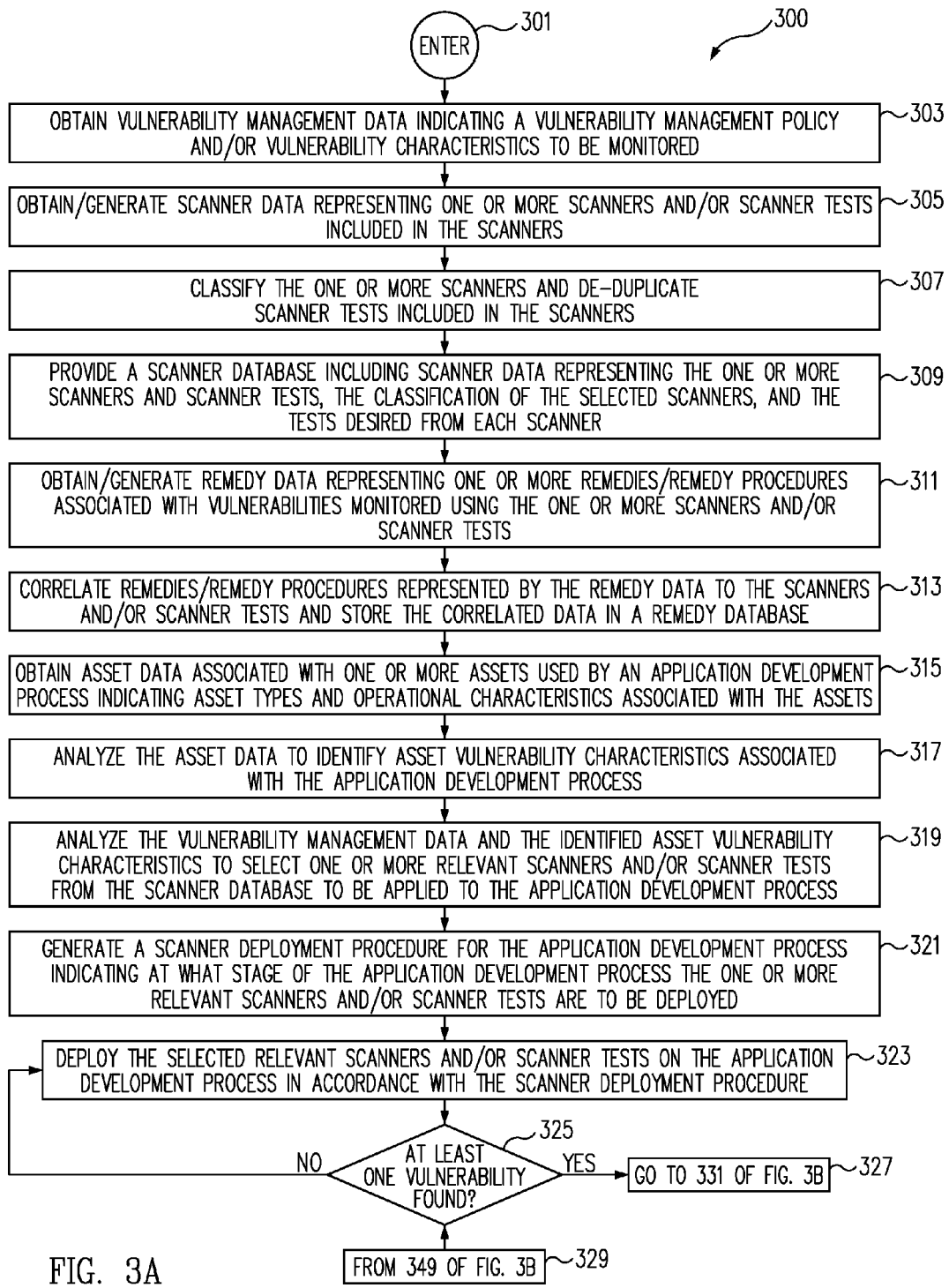
FIG. 3A and FIG. 3B together make up a flow chart depicting a process for dynamic and comprehensive application development vulnerability management in accordance with one embodiment.
Figure 3B:
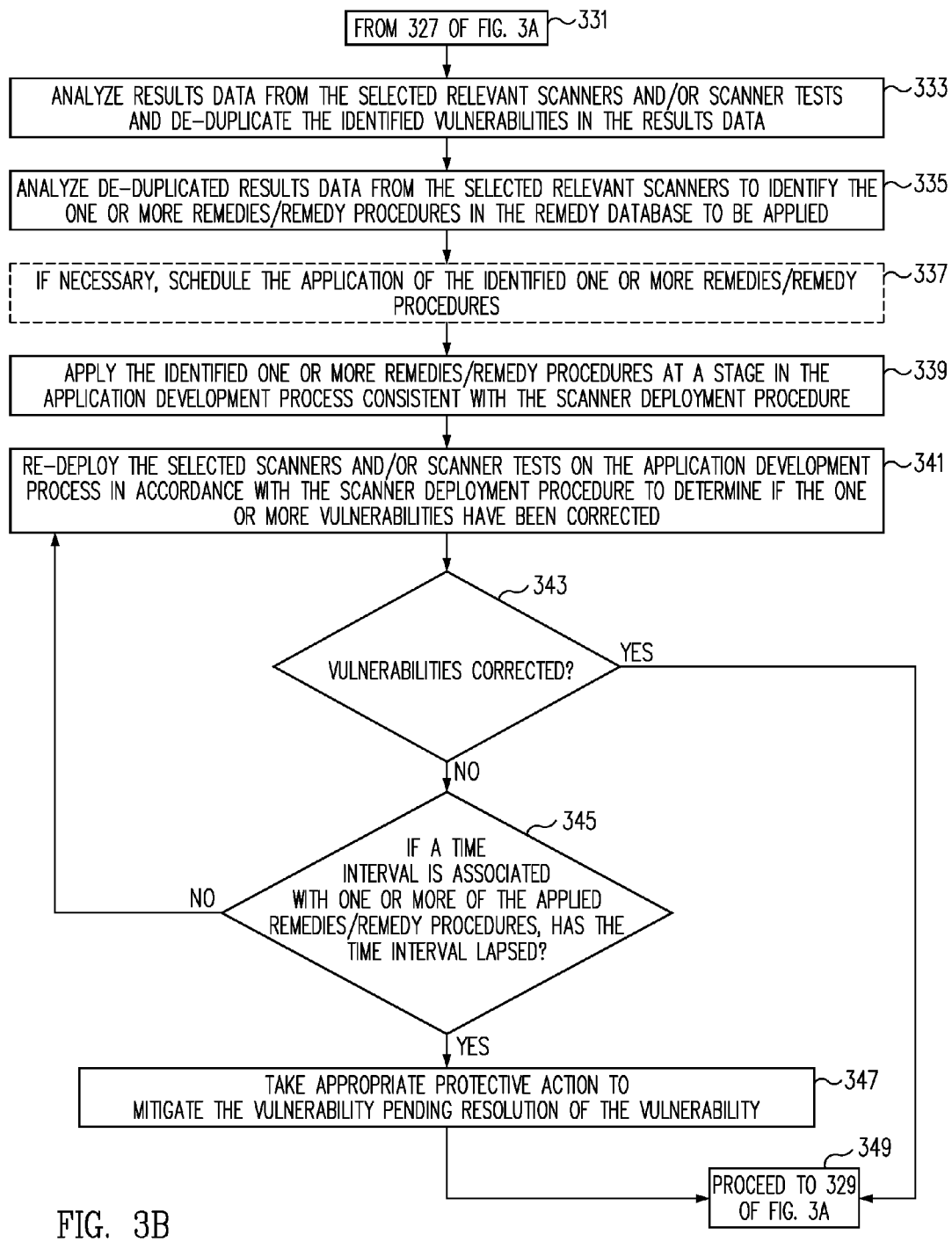

FIG. 3A and FIG. 3B combined are a flow chart of a process 300 for dynamic and comprehensive application development vulnerability management.

In one embodiment, process 300 begins at ENTER OPERATION 301 of FIG. 3A and process flow proceeds to OBTAIN VULNERABILITY MANAGEMENT DATA INDICATING A VULNERABILITY MANAGEMENT POLICY AND/OR VULNERABILITY CHARACTERISTICS TO BE MONITORED OPERATION 303.

In one embodiment, at OBTAIN VULNERABILITY MANAGEMENT DATA INDICATING A VULNERABILITY MANAGEMENT POLICY AND/OR VULNERABILITY CHARACTERISTICS TO BE MONITORED OPERATION 303 vulnerability management data is obtained from one or more sources.

In one embodiment, the vulnerability management data of OBTAIN VULNERABILITY MANAGEMENT DATA INDICATING A VULNERABILITY MANAGEMENT POLICY AND/OR VULNERABILITY CHARACTERISTICS TO BE MONITORED OPERATION 303 includes data indicating a vulnerability management policy, specified vulnerabilities, and vulnerability characteristics to be identified and monitored.

In one embodiment, the vulnerability management policy and vulnerability characteristics of OBTAIN VULNERABILITY MANAGEMENT DATA INDICATING A VULNERABILITY MANAGEMENT POLICY AND/OR VULNERABILITY CHARACTERISTICS TO BE MONITORED OPERATION 303 are directed to specific vulnerabilities potentially associated with one or more assets used to develop, deploy, or operate one or more applications, or other assets, in a cloud-based, or other distributed computing, environment.

In various embodiments, the vulnerabilities and vulnerability characteristics included in the vulnerability management data of OBTAIN VULNERABILITY MANAGEMENT DATA INDICATING A VULNERABILITY MANAGEMENT POLICY AND/OR VULNERABILITY CHARACTERISTICS TO BE MONITORED OPERATION 303 include any vulnerabilities and vulnerability characteristics desired by the owner of an asset, such as an application developer, and/or by the provider of process 300 for dynamic and comprehensive application development vulnerability management, and/or by a provider of a distributed computing network, such as a cloud, and/or any other parties or entities associated with the security of a distributed computing network, such as a cloud.

As with process 200 for dynamic and comprehensive vulnerability management discussed above, using process 300 for dynamic and comprehensive application development vulnerability management, very different classes of vulnerabilities can be accommodated through the single set of vulnerability management data of OBTAIN VULNERABILITY MANAGEMENT DATA INDICATING A VULNERABILITY MANAGEMENT POLICY AND/OR VULNERABILITY CHARACTERISTICS TO BE MONITORED OPERATION 303 and through a single process 300 for dynamic and comprehensive application development vulnerability management. This in turn provides a flexibility and adaptability unknown with currently available vulnerability management methods and systems and the vulnerability management data of OBTAIN VULNERABILITY MANAGEMENT DATA INDICATING A VULNERABILITY MANAGEMENT POLICY AND/OR VULNERABILITY CHARACTERISTICS TO BE MONITORED OPERATION 303 is "open-ended" so that the vulnerability management policies and/or specified vulnerability characteristics can be defined, redefined, removed, added, and/or modified, as needed or desired.

In one embodiment, at least part of the vulnerability management data of OBTAIN VULNERABILITY MANAGEMENT DATA INDICATING A VULNERABILITY MANAGEMENT POLICY AND/OR VULNERABILITY CHARACTERISTICS TO BE MONITORED OPERATION 303 is obtained, and/or modified, through one or more user interfaces provided through, and/or associated with, process 300 for dynamic and comprehensive application development vulnerability management.

In one embodiment, once vulnerability management data is obtained from one or more sources at OBTAIN VULNERABILITY MANAGEMENT DATA INDICATING A VULNERABILITY MANAGEMENT POLICY AND/OR VULNERABILITY CHARACTERISTICS TO BE MONITORED OPERATION 303, process flow proceeds to OBTAIN/GENERATE SCANNER DATA REPRESENTING ONE OR MORE SCANNERS AND SCANNER TESTS INCLUDED IN THE SCANNERS OPERATION 305.

In one embodiment, once vulnerability management data is obtained indicating the vulnerability management policies, vulnerabilities, and vulnerability characteristics to be used with process 300 for dynamic and comprehensive application development vulnerability management at OBTAIN VULNERABILITY MANAGEMENT DATA INDICATING A VULNERABILITY MANAGEMENT POLICY AND/OR VULNERABILITY CHARACTERISTICS TO BE MONITORED OPERATION 303, scanner data representing one or more vulnerability scanners capable of detecting and monitoring the vulnerabilities and vulnerability characteristics associated the vulnerability management data of OBTAIN VULNERABILITY MANAGEMENT DATA INDICATING A VULNERABILITY MANAGEMENT POLICY AND/OR VULNERABILITY CHARACTERISTICS TO BE MONITORED OPERATION 303 is generated or obtained at OBTAIN/GENERATE SCANNER DATA REPRESENTING ONE OR MORE SCANNERS AND SCANNER TESTS INCLUDED IN THE SCANNERS OPERATION 305.

In various embodiments, the scanners in the scanner data of OBTAIN/GENERATE SCANNER DATA REPRESENTING ONE OR MORE SCANNERS AND SCANNER TESTS INCLUDED IN THE SCANNERS OPERATION 305 are comprised of code designed to monitor or check various assets of the application development process to determine if specific vulnerabilities discoverable with the scanners are present. In many cases, the scanners are actually sets of scanner tests with each scanner test being associated with, i.e. capable of detecting, a specific vulnerability or vulnerability characteristic included in the vulnerability management data of OBTAIN VULNERABILITY MANAGEMENT DATA INDICATING A VULNERABILITY MANAGEMENT POLICY AND/OR VULNERABILITY CHARACTERISTICS TO BE MONITORED OPERATION 303.

Given the variety of assets to be vulnerability managed, and the open-ended composition of the vulnerability management data of OBTAIN VULNERABILITY MANAGEMENT DATA INDICATING A VULNERABILITY MANAGEMENT POLICY AND/OR VULNERABILITY CHARACTERISTICS TO BE MONITORED OPERATION 303, it follows that numerous types and classes of scanners and scanner tests are used with various embodiments of process 300 for dynamic and comprehensive application development vulnerability management discussed herein. Typically, scanners can be classified in several ways including, but not limited to, the type of scanner; the vulnerabilities scanned for by the scanner, i.e., scanner tests included in the scanner; desirable scanning tests included in the scanner; the deployment profile/time for the scanner, i.e., how long does it take to schedule and/or deploy the scanner and receive scanner results data; whether the scanner is a continuously deployed scanner or another type of scanner; whether the scanner is synchronous or asynchronous; and/or any other scanner parameters, as discussed herein, and/or as known in the art at the time of filing, and/or as developed after the time of filing.

As noted above, vulnerabilities, and vulnerability characteristics included in the obtained vulnerability management data of OBTAIN VULNERABILITY MANAGEMENT DATA INDICATING A VULNERABILITY MANAGEMENT POLICY AND/OR VULNERABILITY CHARACTERISTICS TO BE MONITORED OPERATION 303 are open-endedly defined and subject to change. Consequently, the scanners and scanner tests of the scanner data of OBTAIN/GENERATE SCANNER DATA REPRESENTING ONE OR MORE SCANNERS AND SCANNER TESTS INCLUDED IN THE SCANNERS OPERATION 305 that are desirable and/or necessary to ensure compliance with the vulnerability management policies indicated in the vulnerability management data of OBTAIN VULNERABILITY MANAGEMENT DATA INDICATING A VULNERABILITY MANAGEMENT POLICY AND/OR VULNERABILITY CHARACTERISTICS TO BE MONITORED OPERATION 303 are likely to change over time as well. In addition, new scanners and scanner tests may be required and/or become available, existing scanners and scanner tests may be updated and/or improved, and/or new combinations of desirable scanner tests may become available.

To address this need, in one embodiment, the scanner data obtained at OBTAIN/GENERATE SCANNER DATA REPRESENTING ONE OR MORE SCANNERS AND SCANNER TESTS INCLUDED IN THE SCANNERS OPERATION 305, representing the collection scanners and scanner tests to be used with process 300 for dynamic and comprehensive application development vulnerability management, is open-endedly defined to allow the scanning capabilities provided by the scanner data to be tailored to meet particular defined needs and to allow for the addition of new scanners and scanner tests, and/or modified scanners and scanner tests, as defined, or redefined, by one or more parties associated with vulnerability management and/or one or more assets being vulnerability managed.

In various embodiments, the collection of scanners and scanner tests included in the scanner data of OBTAIN/GENERATE SCANNER DATA REPRESENTING ONE OR MORE SCANNERS AND SCANNER TESTS INCLUDED IN THE SCANNERS OPERATION 305 includes individual scanners obtained from multiple, and often very diverse, sources and/or parties including, but not limited to, third party vendors who generate scanners and scanner tests and then sell them, or otherwise provide the scanners and scanner tests; owners, or other parties, associated with the assets being vulnerability managed; various parties involved in the development of the assets being vulnerability managed; providers of all, or part of, a cloud-based infrastructure; third party service providers associated with the assets, and/or application develop processes; and/or any other sources, parties, or entities capable of providing one or more scanners and/or scanner tests, as discussed herein, and/or as known in the art at the time of filing, and/or as become known after the time of filing.

In various embodiments, the multiple scanners and scanner tests included in a single example of scanner data of OBTAIN/GENERATE SCANNER DATA REPRESENTING ONE OR MORE SCANNERS AND SCANNER TESTS INCLUDED IN THE SCANNERS OPERATION 305 can each come from a different one of the scanner and scanner test sources discussed herein. Consequently, scanners and scanner tests obtained from, and generated by, very diverse sources, having very different scanning/testing capabilities, and being of very diverse structure, operation, and classification, can be included in a single set of scanners and scanner tests included in a single example of scanner data obtained at OBTAIN/GENERATE SCANNER DATA REPRESENTING ONE OR MORE SCANNERS AND SCANNER TESTS INCLUDED IN THE SCANNERS OPERATION 305, and used, by process 300 for dynamic and comprehensive vulnerability management.

In various embodiments, updates and additions to the scanner data, i.e., updates and additions to the scanners and scanner tests comprising the scanner data of OBTAIN/GENERATE SCANNER DATA REPRESENTING ONE OR MORE SCANNERS AND SCANNER TESTS INCLUDED IN THE SCANNERS OPERATION 305, are performed automatically as these updates and additions become available. In various embodiments, these updates and additions are provided automatically by any of the parties, and/or sources, of scanner and scanner tests, discussed herein, and/or as known in the art at the time of filing, and/or as become known after the time of filing. Consequently, the scanner data of OBTAIN/GENERATE SCANNER DATA REPRESENTING ONE OR MORE SCANNERS AND SCANNER TESTS INCLUDED IN THE SCANNERS OPERATION 305 associated with process 300 for dynamic and comprehensive application development vulnerability management discussed herein is open-endedly defined, dynamic and diverse in its composition and operation, and is updated as needed, in one embodiment, automatically. Therefore, using process 300 for dynamic and comprehensive application development vulnerability management, scanner data is provided that represents a more comprehensive, dynamic, diverse, and individually tailored, scanning and testing capability than is available using any current vulnerability management methods and systems.

In one embodiment, once scanner data representing one or more vulnerability scanners and scanner tests capable of detecting and monitoring the vulnerabilities and vulnerability characteristics associated the vulnerability management data of OBTAIN VULNERABILITY MANAGEMENT DATA INDICATING A VULNERABILITY MANAGEMENT POLICY AND/OR VULNERABILITY CHARACTERISTICS TO BE MONITORED OPERATION 303 are generated or obtained at OBTAIN/GENERATE SCANNER DATA REPRESENTING ONE OR MORE SCANNERS AND SCANNER TESTS INCLUDED IN THE SCANNERS OPERATION 305, process flow proceeds to CLASSIFY THE ONE OR MORE SCANNERS AND DE-DUPLICATE SCANNER TESTS INCLUDED IN THE SCANNERS OPERATION 307.

In one embodiment, at CLASSIFY THE ONE OR MORE SCANNERS AND DE-DUPLICATE SCANNER TESTS INCLUDED IN THE SCANNERS OPERATION 307 the scanners and scanner tests represented in the scanner data of OBTAIN/GENERATE SCANNER DATA REPRESENTING ONE OR MORE SCANNERS AND SCANNER TESTS INCLUDED IN THE SCANNERS OPERATION 305 are classified according to the scanner classification parameters discussed above and are de-duplicated. In addition, at CLASSIFY THE ONE OR MORE SCANNERS AND DE-DUPLICATE SCANNER TESTS INCLUDED IN THE SCANNERS OPERATION 307 duplicate scanner tests are identified and analyzed to identify the scanner test in the set of duplicate scanner tests that is most compatible with the desired result.

In one embodiment, once the scanners and scanner tests represented in the scanner data of OBTAIN/GENERATE SCANNER DATA REPRESENTING ONE OR MORE SCANNERS AND SCANNER TESTS INCLUDED IN THE SCANNERS OPERATION 305 are classified and de-duplicated at CLASSIFY THE ONE OR MORE SCANNERS AND DE-DUPLICATE SCANNER TESTS INCLUDED IN THE SCANNERS OPERATION 307, process flow proceeds to PROVIDE A SCANNER DATABASE INCLUDING SCANNER DATA REPRESENTING THE ONE OR MORE SCANNERS AND SCANNER TESTS, THE CLASSIFICATION OF THE SELECTED SCANNERS, AND THE TESTS DESIRED FROM EACH SCANNER OPERATION 309.

In one embodiment, at PROVIDE A SCANNER DATABASE INCLUDING SCANNER DATA REPRESENTING THE ONE OR MORE SCANNERS AND SCANNER TESTS, THE CLASSIFICATION OF THE SELECTED SCANNERS, AND THE TESTS DESIRED FROM EACH SCANNER OPERATION 309 the scanner data representing the selected scanners, and selected de-duplicated scanner tests, of OBTAIN/GENERATE SCANNER DATA REPRESENTING ONE OR MORE SCANNERS AND SCANNER TESTS INCLUDED IN THE SCANNERS OPERATION 305 and the classification data associated with each of the selected scanners and scanner tests of CLASSIFY THE ONE OR MORE SCANNERS AND DE-DUPLICATE SCANNER TESTS INCLUDED IN THE SCANNERS OPERATION 307 is stored in a scanner database.

In one embodiment, once the scanner data representing the selected scanners, and selected de-duplicated scanner tests and the classification data associated with each of the selected scanners and scanner tests is stored in a scanner database at PROVIDE A SCANNER DATABASE INCLUDING SCANNER DATA REPRESENTING THE ONE OR MORE SCANNERS AND SCANNER TESTS, THE CLASSIFICATION OF THE SELECTED SCANNERS, AND THE TESTS DESIRED FROM EACH SCANNER OPERATION 309, process flow proceeds to OBTAIN/GENERATE REMEDY DATA REPRESENTING ONE OR MORE REMEDIES/REMEDY PROCEDURES ASSOCIATED WITH VULNERABILITIES MONITORED USING THE ONE OR MORE SCANNERS AND SCANNER TESTS OPERATION 311.

In one embodiment, at OBTAIN/GENERATE REMEDY DATA REPRESENTING ONE OR MORE REMEDIES/REMEDY PROCEDURES ASSOCIATED WITH VULNERABILITIES MONITORED USING THE ONE OR MORE SCANNERS AND SCANNER TESTS OPERATION 311 remedy data associated with the vulnerabilities and vulnerability characteristics of the vulnerability management data of OBTAIN VULNERABILITY MANAGEMENT DATA INDICATING A VULNERABILITY MANAGEMENT POLICY AND/OR VULNERABILITY CHARACTERISTICS TO BE MONITORED OPERATION 303, scanned for by the scanners and scanner tests represented in the scanner data of OBTAIN/GENERATE SCANNER DATA REPRESENTING ONE OR MORE SCANNERS AND SCANNER TESTS INCLUDED IN THE SCANNERS OPERATION 305 is obtained.

In various embodiments, each of the remedies or remedy procedures indicated in the remedy data of OBTAIN/GENERATE REMEDY DATA REPRESENTING ONE OR MORE REMEDIES/REMEDY PROCEDURES ASSOCIATED WITH VULNERABILITIES MONITORED USING THE ONE OR MORE SCANNERS AND SCANNER TESTS OPERATION 311 is correlated with an associated vulnerability or vulnerability characteristic of OBTAIN VULNERABILITY MANAGEMENT DATA INDICATING A VULNERABILITY MANAGEMENT POLICY AND/OR VULNERABILITY CHARACTERISTICS TO BE MONITORED OPERATION 303 to which the remedy or remedy procedure applies, and/or the scanner or scanner test of OBTAIN/GENERATE SCANNER DATA REPRESENTING ONE OR MORE SCANNERS AND SCANNER TESTS INCLUDED IN THE SCANNERS OPERATION 305 used to identify the associated vulnerability or vulnerability characteristic.

In various embodiments, the remedy data of OBTAIN/GENERATE REMEDY DATA REPRESENTING ONE OR MORE REMEDIES/REMEDY PROCEDURES ASSOCIATED WITH VULNERABILITIES MONITORED USING THE ONE OR MORE SCANNERS AND SCANNER TESTS OPERATION 311 includes remedies, i.e., mechanisms for actually correcting the identified vulnerability, and remedy procedures, i.e., procedures for ensuring that the vulnerability is corrected, i.e., is closed.

As discussed below, in one embodiment, when actual remedies are available and/or included in the remedy data of OBTAIN/GENERATE REMEDY DATA REPRESENTING ONE OR MORE REMEDIES/REMEDY PROCEDURES ASSOCIATED WITH VULNERABILITIES MONITORED USING THE ONE OR MORE SCANNERS AND SCANNER TESTS OPERATION 311, these remedies are automatically applied to the asset being vulnerability managed once the associated vulnerability, or vulnerability characteristic, is identified by a scanner or scanner test. Consequently, in these embodiments, the remedy is applied as part of a self-healing process through which assets associated with an application development process being vulnerability managed become self-healing assets and/or part of a self-healing application development process.

In other examples, the remedy associated with an identified vulnerability or vulnerability characteristic does not lend itself to being automatically corrected without some form of input and/or interaction with the owner, or other contact entity, of the asset being vulnerability managed. To address these cases, the remedy data of OBTAIN/GENERATE REMEDY DATA REPRESENTING ONE OR MORE REMEDIES/REMEDY PROCEDURES ASSOCIATED WITH VULNERABILITIES MONITORED USING THE ONE OR MORE SCANNERS AND SCANNER TESTS OPERATION 311 also includes remedy procedure data indicating a procedure to be implemented that includes input and/or interaction from the owner of the asset being vulnerability managed.

In one embodiment, the remedies or remedy procedures included in the remedy data of OBTAIN/GENERATE REMEDY DATA REPRESENTING ONE OR MORE REMEDIES/REMEDY PROCEDURES ASSOCIATED WITH VULNERABILITIES MONITORED USING THE ONE OR MORE SCANNERS AND SCANNER TESTS OPERATION 311 is open-ended to allow for updates and additions to the remedies or remedy procedures as needed.

As a result, using process 300 for dynamic and comprehensive application development vulnerability management, the vulnerability policies and vulnerability characteristics to be monitored, the scanners and scanner tests used, and the remedies and remedy procedures applied, are all open-endedly defined and dynamic to provide a level of flexibility, comprehensiveness, and diversity of application, unknown and unavailable through currently available vulnerability management systems.

In one embodiment, once remedy data associated with the vulnerabilities and vulnerability characteristics of the vulnerability management data scanned for by the scanners and scanner tests represented in the scanner data is obtained at OBTAIN/GENERATE REMEDY DATA REPRESENTING ONE OR MORE REMEDIES/REMEDY PROCEDURES ASSOCIATED WITH VULNERABILITIES MONITORED USING THE ONE OR MORE SCANNERS AND SCANNER TESTS OPERATION 311, process flow proceeds to CORRELATE REMEDIES/REMEDY PROCEDURES REPRESENTED BY THE REMEDY DATA TO THE SCANNERS AND SCANNER TESTS AND STORE THE CORRELATED DATA IN A REMEDY DATABASE OPERATION 313.

In one embodiment, at CORRELATE REMEDIES/REMEDY PROCEDURES REPRESENTED BY THE REMEDY DATA TO THE SCANNERS AND SCANNER TESTS AND STORE THE CORRELATED DATA IN A REMEDY DATABASE OPERATION 313 data representing the correlated remedies or remedy procedures indicated in the remedy data of OBTAIN/GENERATE REMEDY DATA REPRESENTING ONE OR MORE REMEDIES/REMEDY PROCEDURES ASSOCIATED WITH VULNERABILITIES MONITORED USING THE ONE OR MORE SCANNERS AND SCANNER TESTS OPERATION 311; the associated vulnerability or vulnerability characteristics addressed by the remedies or remedy procedures of OBTAIN VULNERABILITY MANAGEMENT DATA INDICATING A VULNERABILITY MANAGEMENT POLICY AND/OR VULNERABILITY CHARACTERISTICS TO BE MONITORED OPERATION 303; and/or the scanner or scanner tests used to identify the associated vulnerability or vulnerability characteristics included in the scanner data of OBTAIN/GENERATE SCANNER DATA REPRESENTING ONE OR MORE SCANNERS AND SCANNER TESTS INCLUDED IN THE SCANNERS OPERATION 305, is stored in a remedy database.

In one embodiment, once data representing the correlated remedies or remedy procedures indicated in the remedy data; the associated vulnerability or vulnerability characteristics addressed by the remedies or remedy procedures; and/or the scanner or scanner tests used to identify the associated vulnerability or vulnerability characteristics included in the scanner data, is stored in a remedy database at CORRELATE REMEDIES/REMEDY PROCEDURES REPRESENTED BY THE REMEDY DATA TO THE SCANNERS AND SCANNER TESTS AND STORE THE CORRELATED DATA IN A REMEDY DATABASE OPERATION 313, process flow proceeds to OBTAIN ASSET DATA ASSOCIATED WITH ONE OR MORE ASSETS USED BY AN APPLICATION DEVELOPMENT PROCESS INDICATING ASSET TYPES AND OPERATIONAL CHARACTERISTICS ASSOCIATED WITH THE ASSETS OPERATION 315.

As noted above, the term "asset" can refer to an entity or logical object that itself is composed of, and/or associated with, one or more assets. As a specific illustrative example, an application development process, and/or an application, would be considered an asset in accordance with the definition provided above, and as the term "asset" is commonly used in the art. However, the application development processes, and/or applications, themselves may include, and/or be associated with, various other assets such as, but not limited to, one or more instances of a virtual machine or virtual server in a cloud; one or more operating systems; one or more storage capabilities allocated to an instance in a cloud infrastructure; processing capability allocated to an instance in a cloud infrastructure; hardware allocated to an instance in a cloud infrastructure; software allocated to an instance in a cloud infrastructure; one or more services provided through a cloud infrastructure; one or more cloud infrastructure access systems; etc.

In one embodiment, at OBTAIN ASSET DATA ASSOCIATED WITH ONE OR MORE ASSETS USED BY AN APPLICATION DEVELOPMENT PROCESS INDICATING ASSET TYPES AND OPERATIONAL CHARACTERISTICS ASSOCIATED WITH THE ASSETS OPERATION 315 asset data indicating the asset types and various operational characteristics associated with the assets that are associated with the application development process that may represent vulnerabilities is obtained.

In one embodiment, the process for dynamic and comprehensive vulnerability management is a component of a larger asset verification system, such as an application, or application development, verification system. In these embodiments, the asset data is obtained from an asset management system associated with the asset verification system.

In one embodiment, once asset data indicating the asset types and various operational characteristics associated with the assets that are associated with the application development process that may represent vulnerabilities is obtained at OBTAIN ASSET DATA ASSOCIATED WITH ONE OR MORE ASSETS USED BY AN APPLICATION DEVELOPMENT PROCESS INDICATING ASSET TYPES AND OPERATIONAL CHARACTERISTICS ASSOCIATED WITH THE ASSETS OPERATION 315, process flow proceeds to ANALYZE THE ASSET DATA TO IDENTIFY ASSET VULNERABILITY CHARACTERISTICS ASSOCIATED WITH THE APPLICATION DEVELOPMENT PROCESS OPERATION 317.

In one embodiment, at ANALYZE THE ASSET DATA TO IDENTIFY ASSET VULNERABILITY CHARACTERISTICS ASSOCIATED WITH THE APPLICATION DEVELOPMENT PROCESS OPERATION 317 the asset data obtained at OBTAIN ASSET DATA ASSOCIATED WITH ONE OR MORE ASSETS USED BY AN APPLICATION DEVELOPMENT PROCESS INDICATING ASSET TYPES AND OPERATIONAL CHARACTERISTICS ASSOCIATED WITH THE ASSETS OPERATION 315 is analyzed to identify vulnerability characteristics associated with the application development process and, in particular, any vulnerability characteristics associated with the assets associated with the application development process which are also indicated in the vulnerability management policies and/or the vulnerability characteristics in the vulnerability management data of OBTAIN VULNERABILITY MANAGEMENT DATA INDICATING A VULNERABILITY MANAGEMENT POLICY AND/OR VULNERABILITY CHARACTERISTICS TO BE MONITORED OPERATION 303.

In one embodiment, once the asset data obtained at OBTAIN ASSET DATA ASSOCIATED WITH ONE OR MORE ASSETS USED BY AN APPLICATION DEVELOPMENT PROCESS INDICATING ASSET TYPES AND OPERATIONAL CHARACTERISTICS ASSOCIATED WITH THE ASSETS OPERATION 315 is analyzed to identify vulnerability characteristics associated with the application development process at ANALYZE THE ASSET DATA TO IDENTIFY ASSET VULNERABILITY CHARACTERISTICS ASSOCIATED WITH THE APPLICATION DEVELOPMENT PROCESS OPERATION 317, process flow proceeds to ANALYZE THE VULNERABILITY MANAGEMENT DATA AND THE IDENTIFIED ASSET VULNERABILITY CHARACTERISTICS TO SELECT ONE OR MORE RELEVANT SCANNERS AND SCANNER TESTS FROM THE SCANNER DATABASE TO BE APPLIED TO THE APPLICATION DEVELOPMENT PROCESS OPERATION 319.

In one embodiment, at ANALYZE THE VULNERABILITY MANAGEMENT DATA AND THE IDENTIFIED ASSET VULNERABILITY CHARACTERISTICS TO SELECT ONE OR MORE RELEVANT SCANNERS AND SCANNER TESTS FROM THE SCANNER DATABASE TO BE APPLIED TO THE APPLICATION DEVELOP- MENT PROCESS OPERATION 319 the vulnerability management data of OBTAIN VULNERABILITY MANAGEMENT DATA INDICATING A VULNERABILITY MANAGEMENT POLICY AND/OR VULNERABILITY CHARACTERISTICS TO BE MONITORED OPERATION 303 and the data indicating the asset vulnerability characteristics of ANALYZE THE ASSET DATA TO IDENTIFY ASSET VULNERABILITY CHARACTERISTICS ASSOCIATED WITH THE APPLICATION DEVELOPMENT PROCESS OPERATION 317 is analyzed to identify one or more relevant scanners and scanner tests from the scanner database of PROVIDE A SCANNER DATABASE INCLUDING SCANNER DATA REPRESENTING THE ONE OR MORE SCANNERS AND SCANNER TESTS, THE CLASSIFICATION OF THE SELECTED SCANNERS, AND THE TESTS DESIRED FROM EACH SCANNER OPERATION 309 to be applied to the assets associated with the application development process.

As noted above, in one embodiment, the scanner test data in the scanner database of PROVIDE A SCANNER DATABASE INCLUDING SCANNER DATA REPRESENTING THE ONE OR MORE SCANNERS AND SCANNER TESTS, THE CLASSIFICATION OF THE SELECTED SCANNERS, AND THE TESTS DESIRED FROM EACH SCANNER OPERATION 309 includes data representing scanner tests selected as the best scanner test for their associated vulnerability at CLASSIFY THE ONE OR MORE SCANNERS AND DE-DUPLICATE SCANNER TESTS INCLUDED IN THE SCANNERS OPERATION 307. Consequently, in one embodiment, based on the analysis of the vulnerability management data and the asset vulnerability characteristics data associated with a specific asset performed at ANALYZE THE VULNERABILITY MANAGEMENT DATA AND THE IDENTIFIED ASSET VULNERABILITY CHARACTERISTICS TO SELECT ONE OR MORE RELEVANT SCANNERS AND SCANNER TESTS FROM THE SCANNER DATABASE TO BE APPLIED TO THE APPLICATION DEVELOPMENT PROCESS OPERATION 319, data representing various scanners and scanner tests is transformed into scanner test profile set data specifically tailored to the application development process under consideration and including the identified best scanner tests for identifying the vulnerabilities and vulnerability characteristics indicated in the vulnerability management data.

Therefore, the result at ANALYZE THE VULNERABILITY MANAGEMENT DATA AND THE IDENTIFIED ASSET VULNERABILITY CHARACTERISTICS TO SELECT ONE OR MORE RELEVANT SCANNERS AND SCANNER TESTS FROM THE SCANNER DATABASE TO BE APPLIED TO THE APPLICATION DEVELOPMENT PROCESS OPERATION 319 is a scanner test profile set customized to both the needs of the user, as indicated in the vulnerability management data of OBTAIN VULNERABILITY MANAGEMENT DATA INDICATING A VULNERABILITY MANAGEMENT POLICY AND/OR VULNERABILITY CHARACTERISTICS TO BE MONITORED OPERATION 303, and the specific assets of the application development process being vulnerability managed, as indicated in the asset data of OBTAIN ASSET DATA ASSOCIATED WITH ONE OR MORE ASSETS USED BY AN APPLICATION DEVELOPMENT PROCESS INDICATING ASSET TYPES AND OPERATIONAL CHARACTERISTICS ASSOCIATED WITH THE ASSETS OPERATION 315 and the asset vulnerability characteristics data of ANALYZE THE ASSET DATA TO IDENTIFY ASSET VULNERABILITY CHARACTERISTICS ASSOCIATED WITH THE APPLICATION DEVELOPMENT PROCESS OPERATION 317.

In one embodiment, once the vulnerability management data and the data indicating the asset vulnerability characteristics is analyzed to identify one or more relevant scanners and scanner tests from the scanner database to be applied to the asset at ANALYZE THE VULNERABILITY MANAGEMENT DATA AND THE IDENTIFIED ASSET VULNERABILITY CHARACTERISTICS TO SELECT ONE OR MORE RELEVANT SCANNERS AND SCANNER TESTS FROM THE SCANNER DATABASE TO BE APPLIED TO THE APPLICATION DEVELOPMENT PROCESS OPERATION 319, process flow proceeds to GENERATE A SCANNER DEPLOYMENT PROCEDURE FOR THE APPLICATION DEVELOPMENT PROCESS INDICATING AT WHAT STAGE OF THE APPLICATION DEVELOPMENT PROCESS THE ONE OR MORE RELEVANT SCANNERS AND SCANNER TESTS ARE TO BE DEPLOYED OPERATION 321.

In one embodiment, at GENERATE A SCANNER DEPLOYMENT PROCEDURE FOR THE APPLICATION DEVELOPMENT PROCESS INDICATING AT WHAT STAGE OF THE APPLICATION DEVELOPMENT PROCESS THE ONE OR MORE RELEVANT SCANNERS AND SCANNER TESTS ARE TO BE DEPLOYED OPERATION 321 a scanner deployment procedure for the scanners and scanner tests included in the scanner test profile set of ANALYZE THE VULNERABILITY MANAGEMENT DATA AND THE IDENTIFIED ASSET VULNERABILITY CHARACTERISTICS TO SELECT ONE OR MORE RELEVANT SCANNERS AND SCANNER TESTS FROM THE SCANNER DATABASE TO BE APPLIED TO THE APPLICATION DEVELOPMENT PROCESS OPERATION 319 for the application process of OBTAIN ASSET DATA ASSOCIATED WITH ONE OR MORE ASSETS USED BY AN APPLICATION DEVELOPMENT PROCESS INDICATING ASSET TYPES AND OPERATIONAL CHARACTERISTICS ASSOCIATED WITH THE ASSETS OPERATION 315 is generated indicating an order, time, and/or stage in the application process, when the various scanners and scanner tests included in the scanner test profile set are to be deployed.

In various embodiments, the scanner deployment procedure is generated at GENERATE A SCANNER DEPLOYMENT PROCEDURE FOR THE APPLICATION DEVELOPMENT PROCESS INDICATING AT WHAT STAGE OF THE APPLICATION DEVELOPMENT PROCESS THE ONE OR MORE RELEVANT SCANNERS AND SCANNER TESTS ARE TO BE DEPLOYED OPERATION 321 to deploy the scanners and scanner tests in an indicated order, and at a time and/or stage where the vulnerabilities associated with each of the scanners and scanner tests can be corrected/closed using the minimal number of resources and at a point in the asset where there is minimal possibility of the vulnerabilities becoming embedded and/or chained in the application development process and/or affecting other components and/or parts of the infrastructure.

Herein, the stage where the vulnerabilities associated with the application development process can be corrected using the minimal number of resources, and where there is minimal possibility of the vulnerabilities becoming chained vulnerabilities, is referred to as the "ideal" stage.

In one embodiment, once a scanner deployment procedure for the scanners and scanner tests included in the scanner test profile set for the application development process is generated at GENERATE A SCANNER DEPLOYMENT PROCEDURE FOR THE APPLICATION DEVELOPMENT PROCESS INDICATING AT WHAT STAGE OF THE APPLICATION DEVELOPMENT PROCESS THE ONE OR MORE RELEVANT SCANNERS AND SCANNER TESTS ARE TO BE DEPLOYED OPERATION 321, process flow proceeds to DEPLOY THE SELECTED RELEVANT SCANNERS AND SCANNER TESTS ON THE APPLICATION DEVELOPMENT PROCESS IN ACCORDANCE WITH THE SCANNER DEPLOYMENT PROCEDURE OPERATION 323.

In one embodiment, at DEPLOY THE SELECTED RELEVANT SCANNERS AND SCANNER TESTS ON THE APPLICATION DEVELOPMENT PROCESS IN ACCORDANCE WITH THE SCANNER DEPLOYMENT PROCEDURE OPERATION 323 the scanners and scanner tests included in the scanner test profile set of ANALYZE THE VULNERABILITY MANAGEMENT DATA AND THE IDENTIFIED ASSET VULNERABILITY CHARACTERISTICS TO SELECT ONE OR MORE RELEVANT SCANNERS AND SCANNER TESTS FROM THE SCANNER DATABASE TO BE APPLIED TO THE APPLICATION DEVELOPMENT PROCESS OPERATION 319 are deployed on the application development process, and the assets associated with the application development process, of OBTAIN ASSET DATA ASSOCIATED WITH ONE OR MORE ASSETS USED BY AN APPLICATION DEVELOPMENT PROCESS INDICATING ASSET TYPES AND OPERATIONAL CHARACTERISTICS ASSOCIATED WITH THE ASSETS OPERATION 315 in accordance with the scanner deployment procedure of GENERATE A SCANNER DEPLOYMENT PROCEDURE FOR THE APPLICATION DEVELOPMENT PROCESS INDICATING AT WHAT STAGE OF THE APPLICATION DEVELOPMENT PROCESS THE ONE OR MORE RELEVANT SCANNERS AND SCANNER TESTS ARE TO BE DEPLOYED OPERATION 321.

In one embodiment, at DEPLOY THE SELECTED RELEVANT SCANNERS AND SCANNER TESTS ON THE APPLICATION DEVELOPMENT PROCESS IN ACCORDANCE WITH THE SCANNER DEPLOYMENT PROCEDURE OPERATION 323 the scanners and scanner tests included in the scanner test profile set are deployed on the application development process, and the assets associated with the application development process, in accordance with the scanner deployment procedure using a scanner deployment manager.

In one embodiment, once the scanners and scanner tests included in the scanner test profile set are deployed on the application development process, and the assets associated with the application development process, in accordance with the scanner deployment procedure at DEPLOY THE SELECTED RELEVANT SCANNERS AND SCANNER TESTS ON THE APPLICATION DEVELOPMENT PROCESS IN ACCORDANCE WITH THE SCANNER DEPLOYMENT PROCEDURE OPERATION 323, process flow proceeds to AT LEAST ONE VULNERABILITY FOUND? OPERATION 325.

In one embodiment, at AT LEAST ONE VULNERABILITY FOUND? OPERATION 325 results data is received from the scanners and scanner tests of DEPLOY THE SELECTED RELEVANT SCANNERS AND SCANNER TESTS ON THE APPLICATION DEVELOPMENT PROCESS IN ACCORDANCE WITH THE SCANNER DEPLOYMENT PROCEDURE OPERATION 323 indicating whether one or more vulnerabilities have been found.

In one embodiment, if at AT LEAST ONE VULNERABILITY FOUND? OPERATION 325 results data is received from the scanners and scanner tests of DEPLOY THE SELECTED RELEVANT SCANNERS AND SCANNER TESTS ON THE APPLICATION DEVELOPMENT PROCESS IN ACCORDANCE WITH THE SCANNER DEPLOYMENT PROCEDURE OPERATION 323 indicating no vulnerabilities have been found, i.e., a "NO" result is obtained, process flow proceeds to DEPLOY THE SELECTED RELEVANT SCANNERS AND SCANNER TESTS ON THE APPLICATION DEVELOPMENT PROCESS IN ACCORDANCE WITH THE SCANNER DEPLOYMENT PROCEDURE OPERATION 323 where the scanners and scanner tests included in the scanner test profile set of ANALYZE THE VULNERABILITY MANAGEMENT DATA AND THE IDENTIFIED ASSET VULNERABILITY CHARACTERISTICS TO SELECT ONE OR MORE RELEVANT SCANNERS AND SCANNER TESTS FROM THE SCANNER DATABASE TO BE APPLIED TO THE APPLICATION DEVELOPMENT PROCESS OPERATION 319 are deployed on the application development process of OBTAIN ASSET DATA ASSOCIATED WITH ONE OR MORE ASSETS USED BY AN APPLICATION DEVELOPMENT PROCESS INDICATING ASSET TYPES AND OPERATIONAL CHARACTERISTICS ASSOCIATED WITH THE ASSETS OPERATION 315 in accordance with the scanner deployment procedure of GENERATE A SCANNER DEPLOYMENT PROCEDURE FOR THE APPLICATION DEVELOPMENT PROCESS INDICATING AT WHAT STAGE OF THE APPLICATION DEVELOPMENT PROCESS THE ONE OR MORE RELEVANT SCANNERS AND SCANNER TESTS ARE TO BE DEPLOYED OPERATION 321 until one or more vulnerabilities are found.

On the other hand, in one embodiment, if at AT LEAST ONE VULNERABILITY FOUND? OPERATION 325 results data is received from the scanners and scanner tests of DEPLOY THE SELECTED RELEVANT SCANNERS AND SCANNER TESTS ON THE APPLICATION DEVELOPMENT PROCESS IN ACCORDANCE WITH THE SCANNER DEPLOYMENT PROCEDURE OPERATION 323 indicating one or more vulnerabilities have been found, i.e., a "YES" result is obtained, data indicating the vulnerability identified, and/or the scanner or scanner test discovering the vulnerability, is recorded along with, in one embodiment, the time at which the vulnerability was identified and process flow proceeds to GO TO 331 OF FIG. 3B OPERATION 327 and through FROM 327 OF FIG. 3A OPERATION 331, to ANALYZE RESULTS DATA FROM THE SELECTED RELEVANT SCANNERS AND SCANNER TESTS AND DE-DUPLICATE THE IDENTIFIED VULNERABILITIES IN THE RESULTS DATA OPERATION 333.

In one embodiment, various types of de-duplication processes are performed at ANALYZE RESULTS DATA FROM THE SELECTED RELEVANT SCANNERS AND SCANNER TESTS AND DE-DUPLICATE THE IDENTIFIED VULNERABILITIES IN THE RESULTS DATA OPERATION 333.

As an illustrative example, at ANALYZE RESULTS DATA FROM THE SELECTED RELEVANT SCANNERS AND SCANNER TESTS AND DE-DUPLICATE THE IDENTIFIED VULNERABILITIES IN THE RESULTS DATA OPERATION 333 all indications of a vulnerability associated with a specific asset within a defined timeframe are mapped into a single vulnerability report to be addressed with a single application of a remedy or remedy procedure.

In one embodiment once various types of de-duplication processes are performed at ANALYZE RESULTS DATA FROM THE SELECTED RELEVANT SCANNERS AND SCANNER TESTS AND DE-DUPLICATE THE IDENTIFIED VULNERABILITIES IN THE RESULTS DATA OPERATION 333, process flow proceeds to ANALYZE DE-DUPLICATED RESULTS DATA FROM THE SELECTED RELEVANT SCANNERS TO IDENTIFY THE ONE OR MORE REMEDIES/REMEDY PROCEDURES IN THE REMEDY DATABASE TO BE APPLIED OPERATION 335.

In one embodiment, at ANALYZE DE-DUPLICATED RESULTS DATA FROM THE SELECTED RELEVANT SCANNERS TO IDENTIFY THE ONE OR MORE REMEDIES/REMEDY PROCEDURES IN THE REMEDY DATABASE TO BE APPLIED OPERATION 335 the de-duplicated results data of ANALYZE RESULTS DATA FROM THE SELECTED RELEVANT SCANNERS AND SCANNER TESTS AND DE-DUPLICATE THE IDENTIFIED VULNERABILITIES IN THE RESULTS DATA OPERATION 333 is analyzed to determine the vulnerability/vulnerabilities indicated and the associated remedy(s) and/or remedy procedure(s) in the remedy database of CORRELATE REMEDIES/REMEDY PROCEDURES REPRESENTED BY THE REMEDY DATA TO THE SCANNERS AND SCANNER TESTS AND STORE THE CORRELATED DATA IN A REMEDY DATABASE OPERATION 313 associated with the indicated vulnerability/vulnerabilities.

In one embodiment, once the de-duplicated results data is analyzed to determine the vulnerability/vulnerabilities indicated and the associated remedy(s) and/or remedy procedure(s) in the remedy database associated with the indicated vulnerability/vulnerabilities at ANALYZE DE-DUPLICATED RESULTS DATA FROM THE SELECTED RELEVANT SCANNERS TO IDENTIFY THE ONE OR MORE REMEDIES/REMEDY PROCEDURES IN THE REMEDY DATABASE TO BE APPLIED OPERATION 335, process flow proceeds to IF NECESSARY, SCHEDULE THE APPLICATION OF THE IDENTIFIED ONE OR MORE REMEDIES/REMEDY PROCEDURES OPERATION 337.

In one embodiment, at IF NECESSARY, SCHEDULE THE APPLICATION OF THE IDENTIFIED ONE OR MORE REMEDIES/REMEDY PROCEDURES OPERATION 337 if the application of the associated remedy(s) and/or remedy procedure(s) in the remedy database associated with the indicated vulnerability/vulnerabilities of ANALYZE DE-DUPLICATED RESULTS DATA FROM THE SELECTED RELEVANT SCANNERS TO IDENTIFY THE ONE OR MORE REMEDIES/REMEDY PROCEDURES IN THE REMEDY DATABASE TO BE APPLIED OPERATION 335 require scheduling, the associated remedy(s) and/or remedy procedure(s) are scheduled. In one embodiment, the date and time of the scheduling request is recorded along with the estimated date and time of the application of the associated remedy(s) and/or remedy procedure(s), if known.

In one embodiment, once the application of the associated remedy(s) and/or remedy procedure(s) in the remedy database associated with the indicated vulnerability/vulnerabilities is scheduled, if necessary, at IF NECESSARY, SCHEDULE THE APPLICATION OF THE IDENTIFIED ONE OR MORE REMEDIES/REMEDY PROCEDURES OPERATION 337, process flow proceeds to APPLY THE IDENTIFIED ONE OR MORE REMEDIES/REMEDY PROCEDURES AT A STAGE IN THE APPLICATION DEVELOPMENT PROCESS CONSISTENT WITH THE SCANNER DEPLOYMENT PROCEDURE OPERATION 339.

In one embodiment, at APPLY THE IDENTIFIED ONE OR MORE REMEDIES/REMEDY PROCEDURES AT A STAGE IN THE APPLICATION DEVELOPMENT PROCESS CONSISTENT WITH THE SCANNER DEPLOYMENT PROCEDURE OPERATION 339 the associated remedy(s) and/or remedy procedure(s) identified and obtained at ANALYZE DE-DUPLICATED RESULTS DATA FROM THE SELECTED RELEVANT SCANNERS TO IDENTIFY THE ONE OR MORE REMEDIES/REMEDY PROCEDURES IN THE REMEDY DATABASE TO BE APPLIED OPERATION 335 are applied to the application development process of OBTAIN ASSET DATA ASSOCIATED WITH ONE OR MORE ASSETS USED BY AN APPLICATION DEVELOPMENT PROCESS INDICATING ASSET TYPES AND OPERATIONAL CHARACTERISTICS ASSOCIATED WITH THE ASSETS OPERATION 315, either immediately, or in accordance with the scheduling of IF NECESSARY, SCHEDULE THE APPLICATION OF THE IDENTIFIED ONE OR MORE REMEDIES/REMEDY PROCEDURES OPERATION 337.

In one embodiment, at APPLY THE IDENTIFIED ONE OR MORE REMEDIES/REMEDY PROCEDURES AT A STAGE IN THE APPLICATION DEVELOPMENT PROCESS CONSISTENT WITH THE SCANNER DEPLOYMENT PROCEDURE OPERATION 339 the associated remedy(s) and/or remedy procedure(s) are applied to the application development process at an ideal stage consistent with the scanner deployment procedure of GENERATE A SCANNER DEPLOYMENT PROCEDURE FOR THE APPLICATION DEVELOPMENT PROCESS INDICATING AT WHAT STAGE OF THE APPLICATION DEVELOPMENT PROCESS THE ONE OR MORE RELEVANT SCANNERS AND SCANNER TESTS ARE TO BE DEPLOYED OPERATION 321.

As noted above, in various embodiments, the remedy data of CORRELATE REMEDIES/REMEDY PROCEDURES REPRESENTED BY THE REMEDY DATA TO THE SCANNERS AND SCANNER TESTS AND STORE THE CORRELATED DATA IN A REMEDY DATABASE OPERATION 313 includes remedies, i.e., mechanisms for actually correcting the identified vulnerability, and remedy procedures, i.e., procedures for ensuring that the vulnerability is corrected, i.e., is closed.

In one embodiment, when actual remedies are available and/or included in the remedy data of CORRELATE REMEDIES/REMEDY PROCEDURES REPRESENTED BY THE REMEDY DATA TO THE SCANNERS AND SCANNER TESTS AND STORE THE CORRELATED DATA IN A REMEDY DATABASE OPERATION 313, these remedies are automatically applied at APPLY THE IDENTIFIED ONE OR MORE REMEDIES/REMEDY PROCEDURES AT A STAGE IN THE APPLICATION DEVELOPMENT PROCESS CONSISTENT WITH THE SCANNER DEPLOYMENT PROCEDURE OPERATION 339 to the application development process and/or assets associated with the application development process once the associated vulnerability, or vulnerability characteristic, is identified by a scanner or scanner test. Consequently, in these embodiments, the remedy is applied AT APPLY THE IDENTIFIED ONE OR MORE REMEDIES/REMEDY PROCEDURES AT A STAGE IN THE APPLICATION DEVELOPMENT PROCESS CONSISTENT WITH THE SCANNER DEPLOYMENT PROCEDURE OPERATION 339 as part of a self-healing process through which assets being vulnerability managed become self-healing assets as part of a self-healing application development process.

In other examples, the remedy in the remedy data of CORRELATE REMEDIES/REMEDY PROCEDURES REPRESENTED BY THE REMEDY DATA TO THE SCANNERS AND SCANNER TESTS AND STORE THE CORRELATED DATA IN A REMEDY DATABASE OPERATION 313 associated with an identified vulnerability or vulnerability characteristic does not lend itself to being automatically corrected without some form of input and/or interaction with the owner, or other contact entity, of the application development process being vulnerability managed.

To address these cases, the remedy data of CORRELATE REMEDIES/REMEDY PROCEDURES REPRESENTED BY THE REMEDY DATA TO THE SCANNERS AND SCANNER TESTS AND STORE THE CORRELATED DATA IN A REMEDY DATABASE OPERATION 313 also includes remedy procedure data indicating a procedure to be implemented that includes input and/or interaction from the owner of the application development process being vulnerability managed.

As a specific illustrative example, in one embodiment, if a vulnerability is discovered that needs to be addressed by the owner of the application development process having the vulnerability, the remedy procedure applied at APPLY THE IDENTIFIED ONE OR MORE REMEDIES/REMEDY PROCEDURES AT A STAGE IN THE APPLICATION DEVELOPMENT PROCESS CONSISTENT WITH THE SCANNER DEPLOYMENT PROCEDURE OPERATION 339 includes instructions and mechanisms for contacting a designated contact entity, e.g., the application development process owner, or any other authorized and/or designated party associated with the application development process, and informing the contact entity of the discovered vulnerability and the need to correct, or close, the discovered vulnerability.

In various embodiments, the remedy procedures applied at APPLY THE IDENTIFIED ONE OR MORE REMEDIES/REMEDY PROCEDURES AT A STAGE IN THE APPLICATION DEVELOPMENT PROCESS CONSISTENT WITH THE SCANNER DEPLOYMENT PROCEDURE OPERATION 339 include data indicating a vulnerability correction time period/timeframe in which the vulnerability must be addressed. In various embodiments, the vulnerability correction time period/timeframe is determined based on the perceived security risk associated with the identified vulnerability.

As discussed below, in one embodiment, if the vulnerability is not closed within the associated vulnerability correction period/timeframe, further protective action is automatically taken to isolate the asset and/or the entire application development process to protect the infrastructure, and to mitigate the vulnerability.

In one embodiment, as part of the remedy procedure applied at APPLY THE IDENTIFIED ONE OR MORE REMEDIES/REMEDY PROCEDURES AT A STAGE IN THE APPLICATION DEVELOPMENT PROCESS CONSISTENT WITH THE SCANNER DEPLOYMENT PROCEDURE OPERATION 339, the contact entity is informed of the vulnerability correction time period/timeframe, and the associated protective action that will be taken if the vulnerability is not addressed in the vulnerability correction time period/timeframe.

In one embodiment, once the associated remedy(s) and/or remedy procedure(s) are applied to the application development process at an ideal stage consistent with the scanner deployment procedure at APPLY THE IDENTIFIED ONE OR MORE REMEDIES/REMEDY PROCEDURES AT A STAGE IN THE APPLICATION DEVELOPMENT PROCESS CONSISTENT WITH THE SCANNER DEPLOYMENT PROCEDURE OPERATION 339, process flow proceeds to RE-DEPLOY THE SELECTED SCANNERS AND SCANNER TESTS ON THE APPLICATION DEVELOPMENT PROCESS IN ACCORDANCE WITH THE SCANNER DEPLOYMENT PROCEDURE TO DETERMINE IF THE ONE OR MORE VULNERABILITIES HAVE BEEN CORRECTED OPERATION 341.

In one embodiment, at RE-DEPLOY THE SELECTED SCANNERS AND SCANNER TESTS ON THE APPLICATION DEVELOPMENT PROCESS IN ACCORDANCE WITH THE SCANNER DEPLOYMENT PROCEDURE TO DETERMINE IF THE ONE OR MORE VULNERABILITIES HAVE BEEN CORRECTED OPERATION 341 at least the scanners and scanner tests that identified the vulnerability/vulnerabilities at AT LEAST ONE VULNERABILITY FOUND? OPERATION 325 are re-deployed to the asset to determine if the vulnerability/vulnerabilities have been corrected.

In one embodiment, once at least the scanners and scanner tests that identified the vulnerability/vulnerabilities are re-deployed to the asset to determine if the vulnerability/vulnerabilities have been corrected at RE-DEPLOY THE SELECTED SCANNERS AND SCANNER TESTS ON THE APPLICATION DEVELOPMENT PROCESS IN ACCORDANCE WITH THE SCANNER DEPLOYMENT PROCEDURE TO DETERMINE IF THE ONE OR MORE VULNERABILITIES HAVE BEEN CORRECTED OPERATION 341, process flow proceeds to VULNERABILITIES CORRECTED? OPERATION 343.

In one embodiment, at VULNERABILITIES CORRECTED? OPERATION 343 results data is received from the re-deployment of the scanners and scanner tests of RE-DEPLOY THE SELECTED SCANNERS AND SCANNER TESTS ON THE APPLICATION DEVELOPMENT PROCESS IN ACCORDANCE WITH THE SCANNER DEPLOYMENT PROCEDURE TO DETERMINE IF THE ONE OR MORE VULNERABILITIES HAVE BEEN CORRECTED OPERATION 341 indicating whether the one or more vulnerabilities have been found again or have been corrected/closed.

In one embodiment, if at VULNERABILITIES CORRECTED? OPERATION 343 results data is received from the scanners and scanner tests of RE-DEPLOY THE SELECTED SCANNERS AND SCANNER TESTS ON THE APPLICATION DEVELOPMENT PROCESS IN ACCORDANCE WITH THE SCANNER DEPLOYMENT PROCEDURE TO DETERMINE IF THE ONE OR MORE VULNERABILITIES HAVE BEEN CORRECTED OPERATION 341 indicating the one or more vulnerabilities have been corrected, i.e., a "YES" result is obtained, process flow proceeds to PROCEED TO 329 OF FIG. 3A OPERATION 349, through FROM 349 OF FIG. 3B OPERATION 329, to DEPLOY THE SELECTED RELEVANT SCANNERS AND SCANNER TESTS ON THE APPLICATION DEVELOPMENT PROCESS IN ACCORDANCE WITH THE SCANNER DEPLOYMENT PROCEDURE OPERATION 323 where the scanners and scanner tests included in the scanner test profile set of ANALYZE THE VULNERABILITY MANAGEMENT DATA AND THE IDENTIFIED ASSET VULNERABILITY CHARACTERISTICS TO SELECT ONE OR MORE RELEVANT SCANNERS AND SCANNER TESTS FROM THE SCANNER DATABASE TO BE APPLIED TO THE APPLICATION DEVELOPMENT PROCESS OPERATION 319 are deployed on the application development process of OBTAIN ASSET DATA ASSOCIATED WITH ONE OR MORE ASSETS USED BY AN APPLICATION DEVELOPMENT PROCESS INDICATING ASSET TYPES AND OPERATIONAL CHARACTERISTICS ASSOCIATED WITH THE ASSETS OPERATION 315 in accordance with the scanner deployment procedure of GENERATE A SCANNER DEPLOYMENT PROCEDURE FOR THE APPLICATION DEVELOPMENT PROCESS INDICATING AT WHAT STAGE OF THE APPLICATION DEVELOPMENT PROCESS THE ONE OR MORE RELEVANT SCANNERS AND SCANNER TESTS ARE TO BE DEPLOYED OPERATION 321 until one or more vulnerabilities are found.

On the other hand, in one embodiment, if at VULNERABILITIES CORRECTED? OPERATION 343 results data is received from the scanners and scanner tests of RE-DEPLOY THE SELECTED SCANNERS AND SCANNER TESTS ON THE APPLICATION DEVELOPMENT PROCESS IN ACCORDANCE WITH THE SCANNER DEPLOYMENT PROCEDURE TO DETERMINE IF THE ONE OR MORE VULNERABILITIES HAVE BEEN CORRECTED OPERATION 341 indicating one or more or the one or more vulnerabilities persist, i.e., a "NO" result is obtained, process flow proceeds IF A TIME INTERVAL IS ASSOCIATED WITH ONE OR MORE OF THE APPLIED REMEDIES/REMEDY PROCEDURES, HAS THE TIME INTERVAL LAPSED? OPERATION 345.

As noted above, in the time period between the identification of a vulnerability and the application of the associated remedy or remedy procedure, re-deployment of the scanners and scanner tests in the scanner test profile set associated with the application development process may occur. However, as noted above, in one embodiment, vulnerabilities indicated in the results data from these re-deployments are grouped together into a single vulnerability report for the application development process.

As also noted above, in some embodiments, particularly in cases where a remedy procedure is applied that grants the application development process owner a vulnerability correction timeframe in which to close a vulnerability, there may also be a delay between when the vulnerabilities are identified and when the vulnerability is corrected. As a result, there may be re-deployments of the scanners and scanner tests during this time period.

In either the case, when the scanners and scanner tests are re-deployed before the remedy or remedy procedure has been implemented and completed, if the scanner or scanner test results indicate the continued presence of the vulnerability, a determination is made as to whether any time intervals, such as a vulnerability correction timeframe or a remedy application scheduling timeframe, associated with the applied remedies or remedy procedures has elapsed at IF A TIME INTERVAL IS ASSOCIATED WITH ONE OR MORE OF THE APPLIED REMEDIES/REMEDY PROCEDURES, HAS THE TIME INTERVAL LAPSED? OPERATION 345.

In cases where the time interval associated with the one or more applied remedies or remedy procedures has not elapsed, i.e., a "NO" result is obtained at IF A TIME INTERVAL IS ASSOCIATED WITH ONE OR MORE OF THE APPLIED REMEDIES/REMEDY PROCEDURES, HAS THE TIME INTERVAL LAPSED? OPERATION 345, no further action is taken.

However, in one embodiment, if the scanners and scanner tests are re-deployed and data indicating the identified vulnerability/vulnerabilities is/are still present, and the time interval associated with the one or more applied remedies or remedy procedures has elapsed, i.e., a "YES" result is obtained at IF A TIME INTERVAL IS ASSOCIATED WITH ONE OR MORE OF THE APPLIED REMEDIES/REMEDY PROCEDURES, HAS THE TIME INTERVAL LAPSED? OPERATION 345, process flow proceeds to TAKE APPROPRIATE PROTECTIVE ACTION TO MITIGATE THE VULNERABILITY PENDING RESOLUTION OF THE VULNERABILITY OPERATION 347.

In one embodiment at TAKE APPROPRIATE PROTECTIVE ACTION TO MITIGATE THE VULNERABILITY PENDING RESOLUTION OF THE VULNERABILITY OPERATION 347 protective action is taken to mitigate the potential adverse effects of the vulnerability.

In one embodiment, once protective action is taken TAKE APPROPRIATE PROTECTIVE ACTION TO MITIGATE THE VULNERABILITY PENDING RESOLUTION OF THE VULNERABILITY OPERATION 347, the scanners and scanner tests included in the scanner test profile set associated with the asset of ANALYZE THE VULNERABILITY MANAGEMENT DATA AND THE IDENTIFIED ASSET VULNERABILITY CHARACTERISTICS TO SELECT ONE OR MORE RELEVANT SCANNERS AND SCANNER TESTS FROM THE SCANNER DATABASE TO BE APPLIED TO THE APPLICATION DEVELOPMENT PROCESS OPERATION 319 continue to be deployed in accordance with the scanner deployment procedure of GENERATE A SCANNER DEPLOYMENT PROCEDURE FOR THE APPLICATION DEVELOPMENT PROCESS INDICATING AT WHAT STAGE OF THE APPLICATION DEVELOPMENT PROCESS THE ONE OR MORE RELEVANT SCANNERS AND SCANNER TESTS ARE TO BE DEPLOYED OPERATION 321 until another vulnerability is found.

In various embodiments, process 300 for dynamic and comprehensive application development vulnerability management discussed above is continuously applied and/or repeated. In other embodiments, process for dynamic and comprehensive vulnerability management discussed above is applied at critical points and/or on-demand.

Using processes 200 and 300 for dynamic and comprehensive vulnerability management discussed above, the vulnerability policies and vulnerability characteristics to be monitored, the scanners and scanner tests used, and the remedies and remedy procedures applied, are all openendedly defined and dynamic to provide a level of flexibility, comprehensiveness, and diversity of application, unknown and unavailable through currently available vulnerability management systems.

In addition, using processes 200 and 300 for dynamic and comprehensive vulnerability management discussed above, scanner test data is obtained representing scanner tests selected as the best scanner tests for their associated vulnerability. Then data representing these best scanner tests is transformed into scanner test profile set data specifically tailored to the asset under consideration and including the identified best scanner tests for identifying the vulnerabilities and vulnerability characteristics indicated in the vulnerability management data. Therefore, the result is a scanner test profile set customized to both the needs of the user, as indicated in the vulnerability management data, and the specific asset being vulnerability managed, as indicated in the asset data and asset vulnerability characteristics data.

In addition, using processes 200 and 300 for dynamic and comprehensive vulnerability management discussed above, a scanner deployment procedure is generated to deploy the scanners and scanner tests in the scanner test profile set at a time and/or stage where the vulnerabilities associated with each of the scanners and scanner tests can be corrected/ closed using the minimal number of resources, and at a point in the asset where there is minimal possibility of the vulnerabilities becoming embedded and/or chained and/or affecting other components and/or parts of the infrastructure.

Finally, using processes 200 and 300 for dynamic and comprehensive vulnerability management discussed above, when actual remedies are available, these remedies are automatically applied to the asset being vulnerability managed once the associated vulnerability, or vulnerability characteristic, is identified by a scanner or scanner test. Consequently, in these instances, the remedy is applied as part of a self-healing process through which assets being vulnerability managed become self-healing assets and/or asset systems.

As a result of these and other features, processes 200 and 300 for dynamic and comprehensive vulnerability management provide a vulnerability management mechanism that is more flexible, comprehensive, and automated than any currently available vulnerability management system or method, and which operates to implement a proactive and anticipatory vulnerability management approach rather than the reactive and ad-hoc vulnerability management approaches that are currently available.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

As discussed in more detail above, using the above embodiments, with little or no modification and/or input, there is considerable flexibility, adaptability, and opportunity for customization to meet the specific needs of various parties under numerous circumstances.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, or protocols. Further, the system or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic or algorithm-like descriptions and representations are the means used by those of skill in the art to most effectively and efficiently convey the substance of their work to others of skill in the art. These operations, while described functionally or logically, are understood to be implemented by computer programs or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as, but not limited to, "activating", "accessing", "aggregating", "alerting", "applying", "analyzing", "associating", "calculating", "capturing", "categorizing", "classifying", "comparing", "creating", "defining", "detecting", "determining", "distributing", "encrypting", "extracting", "filtering", "forwarding", "generating", "identifying", "implementing", "informing", "monitoring", "obtaining", "posting", "processing", "providing", "receiving", "requesting", "saving", "sending", "storing", "transferring", "transforming", "transmitting", "using", etc., refer to the action and process of a computing system or similar electronic device that manipulates and operates on data represented as physical (electronic) quantities within the computing system memories, resisters, caches or other information storage, transmission or display devices.

The present invention also relates to an apparatus or system for performing the operations described herein. This apparatus or system may be specifically constructed for the required purposes, or the apparatus or system can comprise a general purpose system selectively activated or configured/reconfigured by a computer program stored on a computer program product as discussed herein that can be accessed by a computing system or other device.

Those of skill in the art will readily recognize that the algorithms and operations presented herein are not inherently related to any particular computing system, computer architecture, computer or industry standard, or any other specific apparatus. Various general purpose systems may also be used with programs in accordance with the teaching herein, or it may prove more convenient/efficient to construct more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only.

The present invention is well suited to a wide variety of computer network systems operating over numerous topologies. Within this field, the configuration and management of large networks comprise storage devices and computers that are communicatively coupled to similar or dissimilar computers and storage devices over a private network, a LAN, a WAN, a private network, or a public network, such as the Internet.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIG.s, or as discussed herein, are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. A system for dynamic and comprehensive vulnerability management comprising:
    at least one processor; and
    at least one memory unit coupled to the at least one processor, the at least one memory unit having stored therein instructions which when executed by any set of the one or more processors, perform a process for dynamic and comprehensive vulnerability management, the process for dynamic and comprehensive vulnerability management including:
    obtaining vulnerability management data, the vulnerability management data including one or more levels of security that must be associated with one or more accounts or assets;
    amending, following receiving modifications specified by one or more parties associated with an asset being managed by the vulnerability management data, the vulnerability management data;
    obtaining scanner data representing one or more scanners configured to detect and monitor vulnerabilities and vulnerability characteristics reflected in the vulnerability management data, at least one scanner of the scanner data including a plurality of scanner tests configured to detect a plurality of vulnerabilities;
    obtaining remedy data representing two or more remedies associated with vulnerabilities scanned for by the scanners, the two or more remedies including a first remedy of automatic re-sizing of buffers and buffer pools and a second remedy of automatic re-setting or changing a response time;
    correlating the remedy data with vulnerabilities discoverable by the scanner tests;
    obtaining asset data associated with an asset;
    analyzing the vulnerability management data and the asset data to automatically identify a relevant scanner test in the scanner data to be applied to the asset;
    determining an ideal time to deploy the relevant scanner test on the asset;
    automatically deploying the relevant scanner test on the asset at, or before, the ideal time;
    identifying, by the relevant scanner test, a vulnerability of the asset;
    identifying a remedy in the remedy data, the identified remedy being associated with the identified vulnerability;
    automatically applying the identified remedy to the asset;
    automatically re-deploying the relevant scanner on the asset to determine whether the identified vulnerability is still present; and
    upon a determination that the identified vulnerability is present after the identified remedy has been applied, taking protective action to mitigate the vulnerability.

2. The system for dynamic and comprehensive vulnerability management of claim 1 further wherein the one or more levels of security that must be associated with one or more accounts or assets include at least one characteristic selected from a group consisting of
    multifactor authentication;
    specific password lengths; and
    password content.

3. The system for dynamic and comprehensive vulnerability management of claim 1 further comprising
    classifying the one or more scanners according to one or more scanner characteristics;
    further wherein the one or more scanner characteristics are selected from a group of scanner characteristics consisting of
    a scanner type associated with the scanner;
    one or more vulnerabilities scanned for by the scanner;
    one or more scanner tests included in the scanner;
    desirable scanning tests included in the scanner;
    a deployment profile/time for the scanner;
    whether the scanner is a continuously deployed scanner; and
    whether the scanner is synchronous or asynchronous.

4. The system for dynamic and comprehensive vulnerability management of claim 1 further wherein
    obtaining scanner data representing one or more scanners configured to detect and monitor vulnerabilities and vulnerability characteristics reflected in the vulnerability management data, at least one scanner of the scanner data including a plurality of scanner tests configured to detect a plurality of different vulnerabilities further comprises
    obtaining, from a plurality of third party unrelated sources, scanner data representing one or more scanners configured to detect and monitor vulnerabilities and vulnerability characteristics reflected in the vulnerability management data, at least one scanner of the scanner data including a plurality of scanner tests configured to detect a plurality of different vulnerabilities;
    determining that two or more of the scanner tests obtained from a plurality of third party unrelated sources are directed to detecting a same vulnerability;
    selecting a single one of the two or more scanner tests directed to detecting the same vulnerability, the selected single scanner being a scanner test of the determined two or more scanner tests determined to yield a least number of false positive detections; and
    discarding nonselected tests of the two or more scanner tests directed to detecting the same vulnerability and employing the selected scanner test.

5. The system for dynamic and comprehensive vulnerability management of claim 1 wherein at least one of the vulnerabilities discoverable by the one or more scanner tests are vulnerabilities included in the group of vulnerabilities consisting of:
    the existence of a known weakness pattern in the asset;
    an incorrect buffer length;
    the inability of the asset to patch correctly;
    a lack of security requirements, or insufficient security requirements associated with the asset;
    the existence of a known vulnerable version of software or code;
    code written in a language, or version of a language, known to be vulnerable to attack;
    lack of encryption, or the proper level of encryption;
    no checks of buffer lengths;

no checks of the integrity of arguments; and
any combination thereof.

6. The system for dynamic and comprehensive vulnerability management of claim 1 wherein at least one of the remedies associated with vulnerabilities discoverable by the scanner tests is selected from the group of remedies consisting of:
  automatic application of a software patch;
  automatic installation of a software version update;
  automatic deletion of an asset component;
  automatic replacement of an asset component;
  automatic notification of a contact entity associated with the asset of the vulnerability and the need to correct the vulnerability;
  an automatic change to a configuration;
  automatic re-sizing of buffers and buffer pools;
  automatic re-setting or changing a response time; and
  any combination thereof.

7. The system for dynamic and comprehensive vulnerability management of claim 1 wherein at least one of the one or more assets is selected from the group of assets consisting of:
  a file;
  an application development process;
  an application;
  a virtual machine;
  an instance in a cloud infrastructure;
  storage capability allocated to an instance in a cloud infrastructure;
  processing capability allocated to an instance in a cloud infrastructure;
  hardware allocated to an instance in a cloud infrastructure;
  software allocated to an instance in a cloud infrastructure;
  a cloud infrastructure access system; and
  any combination thereof.

8. The system for dynamic and comprehensive vulnerability management of claim 1 wherein the ideal time to deploy the relevant scanner test on the asset is determined based on deploying the relevant scanner test at a time where minimum resources are required to correct the vulnerability the scanner test is configured to detect.

9. The system for dynamic and comprehensive vulnerability management of claim 1 wherein the protective action taken is selected from the group of protective actions consisting of:
  closing one or more accounts associated with the asset;
  closing down a service that is the asset or is associated with the asset;
  closing down an instance that is the asset or is associated with the asset;
  destroying a data store that is the asset or is associated with the asset;
  blocking Internet access to the asset;
  closing down any communication channels that are the asset or are associated with the asset;
  upgrading the asset;
  replacing the asset; and
  any combination thereof.

10. A system for dynamic and comprehensive vulnerability management comprising:
  at least one processor; and
  at least one memory coupled to the at least one processor, the at least one memory having stored therein instructions which when executed by any set of the one or more processors, perform a process for dynamic and comprehensive vulnerability management, the process for dynamic and comprehensive vulnerability management including:
  obtaining vulnerability management data representing one or more vulnerability management policies, vulnerabilities, and vulnerability characteristics to be monitored, the vulnerability management data including one or more levels of security that must be associated with one or more accounts or assets;
  amending, following receiving modifications specified by one or more parties associated with an asset being managed by the vulnerability management data, the vulnerability management data;
  obtaining scanner data representing one or more scanners configured to detect and monitor vulnerabilities and vulnerability characteristics reflected in the vulnerability management data, at least one scanner of the scanner data including a plurality of scanner tests configured to detect a plurality of vulnerabilities;
  classifying the one or more scanners and identifying duplicate scanner tests;
  storing the scanner data and scanner classification data in a scanner database;
  obtaining remedy data representing two or more remedies or remedy procedures associated with vulnerabilities scanned for by the one or more scanner tests, the two or more remedies including a first remedy of automatic re-sizing of buffers and buffer pools and a second remedy of automatic re-setting or changing a response time;
  correlating the remedy data with the scanner data and the vulnerabilities scanned for by the one or more scanner tests;
  obtaining asset data associated with an asset indicating an asset type and operational characteristics associated with the asset;
  analyzing the asset data to identify asset vulnerability characteristics data associated with the asset;
  analyzing the vulnerability management data and the vulnerability characteristics data associated with the asset to automatically select one or more relevant scanner tests represented in the scanner data to be applied to the asset;
  generating scanner deployment procedure data indicating when the one or more relevant scanner tests are to be applied to the asset;
  automatically applying the one or more relevant scanner tests to the asset in accordance with the scanner deployment procedure data;
  de-duplicating results data received from the one or more relevant scanner tests;
  determining whether a vulnerability is indicated in the de-duplicated results data from the one or more relevant scanner tests;
  upon a determination that a vulnerability is indicated in the de-duplicated results data from the one or more relevant scanner tests, automatically identifying the remedy or remedy procedure associated with the identified vulnerability in the remedy data;
  automatically implementing the identified remedy or remedy procedure;
  automatically re-deploying at least the scanner tests associated with the identified vulnerability to the asset to determine whether the identified vulnerability has been corrected; and
  upon a determination that the identified vulnerability is present after the remedy or remedy procedure associated with the identified vulnerability has been applied, or after a defined vulnerability correction time period has elapsed, automatically taking protective action to mitigate the vulnerability.

11. The system for dynamic and comprehensive vulnerability management of claim 10 further wherein the one or more levels of security that must be associated with one or more accounts or assets include at least one characteristic selected from a group consisting of
multifactor authentication;
specific password lengths; and
password content.

12. The system for dynamic and comprehensive vulnerability management of claim 10 wherein
the one or more scanners are classified according to one or more scanner characteristics;
further wherein the one or more scanner characteristics are selected from a group of scanner characteristics consisting of
a scanner type associated with the scanner;
one or more vulnerabilities scanned for by the scanner,
one or more scanner tests included in the scanner;
desirable scanning tests included in the scanner;
a deployment profile/time for the scanner;
whether the scanner is a continuously deployed scanner; and
whether the scanner is synchronous or asynchronous.

13. The system for dynamic and comprehensive vulnerability management of claim 10 wherein at least one of the vulnerabilities discoverable by the one or more scanner tests are vulnerabilities included in the group of vulnerabilities consisting of:
the existence of a known weakness pattern in the asset;
an incorrect buffer length;
the inability of the asset to patch correctly;
a lack of security requirements, or insufficient security requirements associated with the asset;
the existence of a known vulnerable version of software or code;
code written in a language, or version of a language, known to be vulnerable to attack;
lack of encryption, or the proper level of encryption;
no checks of buffer lengths;
no checks of the integrity of arguments; and
any combination thereof.

14. The system for dynamic and comprehensive vulnerability management of claim 10 wherein at least one of the one or more remedies associated with vulnerabilities scanned for by the one or more scanner tests is selected from the group of remedies consisting of:
automatic application of a software patch;
automatic installation of a software version update;
automatic deletion of an asset component;
automatic replacement of an asset component;
an automatic change to a configuration;
automatic re-sizing of buffers and buffer pools;
automatic re-setting or changing a response time; and
any combination thereof.

15. The system for dynamic and comprehensive vulnerability management of claim 10 wherein at least one of the one or more remedy procedures associated with vulnerabilities scanned for by the one or more scanner tests includes providing a contact entity associated with the asset information indicating the identified vulnerability, a vulnerability correction time period, and that once the vulnerability correction time period has elapsed, protective action will automatically be taken.

16. The system for dynamic and comprehensive vulnerability management of claim 10 wherein at least one of the one or more assets is selected from the group of assets consisting of:
an application development process;
a file;
an application;
a virtual machine;
an instance in a cloud infrastructure;
storage capability allocated to an instance in a cloud infrastructure;
processing capability allocated to an instance in a cloud infrastructure;
hardware allocated to an instance in a cloud infrastructure;
software allocated to an instance in a cloud infrastructure;
a cloud infrastructure access system;
and
any combination thereof.

17. The system for dynamic and comprehensive vulnerability management of claim 10 wherein the asset data is obtained from an asset management system associated with the asset.

18. The system for dynamic and comprehensive vulnerability management of claim 10 wherein generating scanner deployment procedure data includes generating scanner deployment pipeline data indicating the ideal stage or time to deploy each of the relevant scanner tests on the asset to minimize the resources required to correct the vulnerability being scanned for, and/or to minimize the chance of the vulnerability becoming a chained vulnerability.

19. The system for dynamic and comprehensive vulnerability management of claim 10 wherein the protective action taken is selected from the group of protective actions consisting of:
closing one or more accounts associated with the asset;
closing down a service that is the asset or is associated with the asset;
closing down an instance that is the asset or is associated with the asset;
destroying a data store that is the asset or is associated with the asset;
blocking Internet access to the asset;
closing down any communication channels that are the asset or are associated with the asset;
upgrading the asset;
replacing the asset; and
any combination thereof.

20. A system for dynamic and comprehensive application development process vulnerability management comprising:
at least one processor; and
at least one memory unit coupled to the at least one processor, the at least one memory unit having stored therein instructions which when executed by any set of the one or more processors, perform a process for dynamic and comprehensive vulnerability management, the process for dynamic and comprehensive vulnerability management including:
obtaining vulnerability management data representing one or more vulnerability management policies, vulnerabilities, and vulnerability characteristics to be monitored, the vulnerability management data including one or more levels of security that must be associated with one or more accounts or assets;
amending, following receiving modifications specified by one or more parties associated with an asset being managed by the vulnerability management data, the vulnerability management data;

obtaining scanner data representing one or more scanners, each of the scanners including one or more scanner tests for detecting a vulnerability in an asset associated with an application development process, at least one scanner of the scanner data including a plurality of scanner tests configured to detect a plurality of vulnerabilities;

classifying the one or more scanners and identifying duplicate scanner tests;

storing the scanner data and scanner classification data in a scanner database;

obtaining remedy data representing two or more remedies or remedy procedures associated with vulnerabilities scanned for by the one or more scanner tests, the two or more remedies including a first remedy of automatic re-sizing of buffers and buffer pools and a second remedy of automatic re-setting or changing a response time;

correlating the remedy data with the scanner data and the vulnerabilities scanned for by the one or more scanner tests;

obtaining asset data associated with one or more assets used by the application development process indicating asset types and operational characteristics associated with the assets;

analyzing the asset data to identify asset vulnerability characteristics data associated with the assets indicating potential vulnerabilities associated with application development process;

analyzing the vulnerability management data and the vulnerability characteristics data associated with the assets to select one or more relevant scanner tests in the scanner data to be applied to the application development process;

generating scanner deployment procedure data indicating what stage in the application development process the one or more relevant scanner tests are to be applied;

automatically applying the one or more relevant scanner tests to the assets associated with the application development process in accordance with the scanner deployment procedure data;

de-duplicating results data received from the one or more relevant scanner tests;

identifying, by the relevant scanner test, a vulnerability of the asset;

identifying a remedy in the remedy data, the identified remedy being associated with the identified vulnerability;

automatically implementing the identified remedy or remedy procedure;

automatically re-deploying at least one scanner test associated with the identified vulnerability to determine whether the identified vulnerability has been corrected; and upon a determination that the identified vulnerability is present after the remedy or remedy procedure associated with the identified vulnerability has been applied, or after a defined vulnerability correction time period has elapsed, automatically taking protective action to mitigate the vulnerability.

21. The system for dynamic and comprehensive vulnerability management of claim 20 further wherein the one or more levels of security that must be associated with one or more accounts or assets include at least one characteristic selected from a group consisting of multifactor authentication;
specific password lengths; and
password content.

22. The system for dynamic and comprehensive vulnerability management of claim 20 further wherein obtaining scanner data representing one or more scanners configured to detect and monitor vulnerabilities and vulnerability characteristics reflected in the vulnerability management data, at least one scanner of the scanner data including a plurality of scanner tests configured to detect a plurality of different vulnerabilities further comprises obtaining, from a plurality of third party unrelated sources, scanner data representing one or more scanners configured to detect and monitor vulnerabilities and vulnerability characteristics reflected in the vulnerability management data, at least one scanner of the scanner data including a plurality of scanner tests configured to detect a plurality of different vulnerabilities;

determining that two or more of the scanner tests obtained from a plurality of third party unrelated sources are directed to detecting a same vulnerability;

selecting a single one of the two or more scanner tests directed to detecting the same vulnerability, the selected single scanner being a scanner test of the determined two or more scanner tests determined to yield the least number of false positive detections; and discarding nonselected tests of the two or more scanner tests directed to detecting the same vulnerability and employing the selected scanner test.

23. The system for dynamic and comprehensive vulnerability management of claim 20 wherein the one or more scanners are classified according to at least one scanner classification parameter selected from the group of scanner classification parameters consisting of:

the scanner type;
the vulnerabilities scanned for by the scanner tests included in the scanner;
the desired scanning test included in the scanner;
the deployment profile/time for the scanner;
whether the scanner is a continuously deployed scanner or another type of scanner;
whether the scanner is synchronous or asynchronous; and
any combination thereof.

24. The system for dynamic and comprehensive vulnerability management of claim 20 wherein at least one of the vulnerabilities discoverable by the one or more scanner tests are vulnerabilities included in the group of vulnerabilities consisting of:

the existence of a known weakness pattern in the asset;
a non-existent or incorrect buffer length;
inserting the inability of the asset to patch correctly;
a lack of security requirements, or insufficient security requirements associated with the asset;
the existence of a known vulnerable version of software or code;
code written in a language, or version of a language, known to be vulnerable to attack;
lack of encryption, or the proper level of encryption;
no checks of buffer lengths;
no checks of the integrity of arguments; and
any combination thereof.

25. The system for dynamic and comprehensive vulnerability management of claim 20 wherein at least one of the one or more remedies associated with vulnerabilities scanned for by the one or more scanner tests is selected from the group of remedies consisting of:
- automatic application of a software patch;
- automatic installation of a software version update;
- automatic deletion of an asset component;
- automatic replacement of an asset component;
- an automatic change to a configuration;
- automatic re-sizing of buffers and buffer pools;
- automatic re-setting or changing a response time; and
- any combination thereof.

26. The system for dynamic and comprehensive vulnerability management of claim 20 wherein at least one of the one or more remedy procedures associated with vulnerabilities scanned for by the one or more scanner tests includes providing a contact entity associated with the application development process information indicating the identified vulnerability, a vulnerability correction time period, and that once the vulnerability correction time period has elapsed, protective action to mitigate the vulnerability will automatically be taken.

27. The system for dynamic and comprehensive vulnerability management of claim 20 wherein at least one of the one or more assets associated with the application development process is selected from the group of assets consisting of:
- a virtual machine;
- an instance in a cloud infrastructure;
- storage capability allocated to an instance in a cloud infrastructure;
- processing capability allocated to an instance in a cloud infrastructure;
- hardware allocated to an instance in a cloud infrastructure;
- software allocated to an instance in a cloud infrastructure;
- a cloud infrastructure access system; and
- any combination thereof.

28. The system for dynamic and comprehensive vulnerability management of claim 20 wherein the asset data is obtained from an asset management system associated with the application development process.

29. The system for dynamic and comprehensive vulnerability management of claim 20 wherein generating scanner deployment procedure data includes generating scanner deployment pipeline data indicating the ideal stage in the application development process to deploy each of the relevant scanner tests in order to minimize the resources required to correct the vulnerability being scanned for, and/or to minimize the chance of the vulnerability becoming a chained vulnerability.

30. The system for dynamic and comprehensive vulnerability management of claim 20 wherein the protective action is selected from the group of protective actions consisting of:
- closing one or more accounts associated with the asset and/or the application development process;
- closing down a service that is the asset or is associated with the application development process;
- closing down an instance that is the asset or is associated with the application development process;
- destroying a data store that is the asset or is associated with the application development process;
- blocking Internet access to an asset associated with the application development process;
- closing down any communication channels that are the asset or are associated with the application development process;
- upgrading an asset associated with the application development process;
- replacing an asset associated with the application development process; and
- any combination thereof.

* * * * *